United States Patent
Cao et al.

(10) Patent No.: US 11,546,937 B2
(45) Date of Patent: Jan. 3, 2023

(54) SYSTEM AND METHOD FOR RESERVATION AND RESOURCE SELECTION FOR SIDELINK COMMUNICATION

(71) Applicants: Yu Cao, Kanata (CA); Amine Maaref, Ottawa (CA)

(72) Inventors: Yu Cao, Kanata (CA); Amine Maaref, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 78 days.

(21) Appl. No.: 17/088,802

(22) Filed: Nov. 4, 2020

(65) Prior Publication Data

US 2021/0144750 A1  May 13, 2021

Related U.S. Application Data

(60) Provisional application No. 62/933,316, filed on Nov. 8, 2019.

(51) Int. Cl.
*H04W 4/00* (2018.01)
*H04W 72/14* (2009.01)
(Continued)

(52) U.S. Cl.
CPC ........... *H04W 72/14* (2013.01); *H04L 1/1819* (2013.01); *H04W 72/042* (2013.01);
(Continued)

(58) Field of Classification Search
CPC ............... H04W 72/14; H04W 72/042; H04W 72/0446; H04W 92/18; H04W 1/1819
See application file for complete search history.

(56) References Cited

U.S. PATENT DOCUMENTS

2017/0359835 A1* 12/2017 Seo ................. H04W 72/04
2018/0139724 A1*  5/2018 Loehr .............. H04W 72/02
(Continued)

FOREIGN PATENT DOCUMENTS

| CN | 109565853 A | 4/2019 |
|---|---|---|
| CN | 109640289 A | 4/2019 |
| WO | 2019069234 A1 | 4/2019 |

OTHER PUBLICATIONS

LG Electronics, "Discussion on NR sidelink resource allocation for Mode 1", 3GPP TSG RAN WG1 #98bis Meeting, Chongqing, China, Oct. 14-20, 2019, R1-1910778, 11 pages.

*Primary Examiner* — Abdelnabi O Musa

(57) ABSTRACT

Methods and systems are provided that facilitate sidelink (SL) retransmission scheduled by the network if a SL transmission of a transport block (TB) is unsuccessful. Signalling is used by the network to send a configured grant of transmission resources available for SL transmissions by the UE that repeat on a periodic basis within each of period. The UE makes SL transmissions during one of the periods by transmitting one or more SL transmissions of at least one transport block using the configured resources. The network can schedule a retransmission by transmitting a downlink control information (DCI) to schedule a SL retransmission of one of the transmitted TB. The UE transmits a SL transmission containing a retransmission of the transport block using resources specified in the DCI. The UE transmits a sidelink control information associated with each SL transmission, containing a HARQ process ID for the SL transmission.

22 Claims, 23 Drawing Sheets

(51) Int. Cl.
*H04W 72/04* (2009.01)
*H04L 1/18* (2006.01)
*H04W 92/18* (2009.01)

(52) U.S. Cl.
CPC ... *H04W 72/0446* (2013.01); *H04W 72/0453* (2013.01); *H04W 92/18* (2013.01)

(56) References Cited

U.S. PATENT DOCUMENTS

| | | | |
|---|---|---|---|
| 2018/0220481 A1* | 8/2018 | Seo | H04L 1/1816 |
| 2018/0263026 A1* | 9/2018 | Loehr | H04W 72/10 |
| 2019/0044667 A1* | 2/2019 | Guo | H04L 1/1816 |
| 2019/0045507 A1* | 2/2019 | Sorrentino | H04W 76/14 |
| 2019/0342910 A1* | 11/2019 | Cao | H04W 72/14 |
| 2020/0077434 A1* | 3/2020 | Kim | H04W 72/1278 |
| 2020/0112982 A1* | 4/2020 | Li | H04W 72/0406 |
| 2020/0146044 A1* | 5/2020 | Maaref | H04W 72/02 |
| 2021/0007096 A1* | 1/2021 | Huang | H04L 1/1896 |
| 2021/0105104 A1* | 4/2021 | Cao | H04L 1/1896 |
| 2021/0105728 A1* | 4/2021 | Nguyen | H04L 1/1819 |
| 2021/0127385 A1* | 4/2021 | Kung | H04L 1/1887 |
| 2021/0136742 A1* | 5/2021 | Huang | H04W 76/14 |
| 2021/0385822 A1* | 12/2021 | Chae | H04W 72/0453 |

* cited by examiner

SYSTEM AND METHOD FOR RESERVATION AND RESOURCE SELECTION FOR SIDELINK COMMUNICATION

CROSS REFERENCE TO RELATED APPLICATION

This application claims the benefit of prior U.S. provisional application No. 62/933,316, entitled "SYSTEM AND METHOD FOR RESERVATION AND RESOURCE SELECTION FOR SIDELINK COMMUNICATION" filed Nov. 8, 2019, which application is hereby incorporated by reference in its entirety.

TECHNICAL FIELD

The application relates generally to wireless telecommunications, and more specifically to resource reservation and selection for sidelink communications.

BACKGROUND

Vehicle to everything (V2X) refers to a category of communications scenarios (along with their corresponding technical challenges), including communication between a vehicle and another vehicle (V2V), vehicle to infrastructure (V2I), vehicle to pedestrian (V2P), and many other scenarios. In V2X, the transmission can be done through a link between the network and user equipment (UE), such as uplink (UL) and downlink (DL) or a sidelink (SL) between a UE and another UE.

In Long Term Evolution (LTE) networks, a V2X transmission scheme relies on the concept of a transmit resource pool (RP). The LTE V2X transmission scheme includes two transmission modes: mode 3 and mode 4. In mode 3, a base station (BS) schedules time-frequency resources (from the UE's RP) for SL transmission using downlink control information (DCI), either dynamically or semi-persistently. In mode 4, a UE selects resources within its transmit RP. The UE may also select resources based on previous measurement and sensing results.

In New Radio (NR), two resource allocation modes for SL V2X transmission are supported. In NR Mode 1, a BS schedules a UE to perform a SL transmission. NR SL Mode 1 includes dynamic scheduling and SL configured grant (CG) transmission. SL Configured grant transmission includes a Type 1 SL configured grant transmission where the configured grant is signaled in radio resource control (RRC) signaling and a Type 2 SL configured grant transmission where the resource for configured grant transmission is signaled in a combination of RRC and DCI signaling.

In NR Mode 2, a UE performs sensing and autonomously selects resources among a (pre)configured resource pool.

SUMMARY

Methods and systems are provided that facilitate sidelink (SL) retransmission scheduled by the network if a SL transmission of a transport block (TB) is unsuccessful. Signalling is used by the network to send a configured grant of transmission resources available for SL transmissions by the UE that repeat on a periodic basis within each of period. The UE makes SL transmissions during one of the periods by transmitting one or more SL transmissions of at least one transport block using the configured resources. The network can schedule a retransmission by transmitting a downlink control information (DCI) to schedule a SL retransmission of one of the transmitted TB. The UE transmits a SL transmission containing a retransmission of the transport block using resources specified in the DCI. The UE transmits a sidelink control information associated with each SL transmission, containing a HARQ process ID for the SL transmission.

According to one aspect of the present disclosure, there is provided a method comprising: a UE receiving a SL configured grant to configure one or more transmission resources available for SL transmissions by the UE that repeats on a periodic basis within each of a plurality of periods; during one of said periods, transmitting one or more SL transmissions of at least one TB using the one or more transmission resources configured by the SL configured grant; receiving a DCI to schedule a SL retransmission of a TB; wherein the TB to be retransmitted corresponds to a TB of the at least one TB transmitted by the UE using the configured transmission resources within the one of the periods; transmitting a SL transmission containing a retransmission of the transport block of the at least one TB using resources specified in the DCI, and transmitting a sidelink control information (SCI) associated with each SL transmission, the SCI containing a HARQ process ID for the SL transmission.

Advantageously, with this approach, both the UE making the SL retransmission, and the network are aware of the TB to be retransmitted without the need for specific signaling to indicate this. Once the UE receives the DCI, it can make the retransmission.

In some embodiments, the TB to be retransmitted corresponds to a last TB transmitted by the UE within the one of the periods.

This approach has the advantage that, in a situation where further TB cannot be transmitted until previous TB have been successfully transmitted, it can only be the last TB that is unsuccessful, and as such, this allows again for efficient signaling without the need to identify a specific TB.

In some embodiments, a maximum of one TB is transmitted by the UE in each period.

This approach has the advantage that any retransmission will necessarily be of the initially transmitted TB, and as such, again it is not necessary to identify the TB to be retransmitted.

In some embodiments, the DCI contains a HARQ process ID that is different from the HARQ process ID contained in the SCI.

This allows maximum flexibility in terms of HARQ process ID assignment for SL transmission.

In some embodiments, the DCI contains a HARQ process ID, and the HARQ process ID in the DCI is associated with the one of the periods based on a time location of a first SL transmission resource of the one of the periods, a configured maximum HARQ process number and a periodicity of the resources available for SL transmission.

This provides an efficient way to tie the HARQ process ID to one of the periods.

In some embodiments, the method further comprises retransmitting a TB of the at least one TB transmitted using resources configured for the configured grant in another period other than the one of the periods.

This provides increased flexibility in terms of the retransmission; for example, there may be no more resources for retransmission in the current set of period.

In some embodiments, the configured grant includes a physical uplink control channel (PUCCH) resource associated with each period; the method further comprising: for each period, transmitting HARQ feedback on the PUCCH resource associated with the period, wherein the PUCCH resource is only used for HARQ feedback associated with the last TB transmitted in the period.

This provides an efficient way of using PUCCH resources, where transmitting positive HARQ feedback for the last TB can be used, for example, to indicate success for all TBs transmitted in the period.

The advantages described above for the UE side method embodiments also apply to the network side method embodiments summarized below, and the UE and network apparatus embodiments summarized below.

According to another aspect of the present disclosure, there is provided a method comprising: transmitting a SL configured grant (CG) to a UE to configure one or more transmission resources available for SL transmissions by the UE that repeats on a periodic basis within each of a plurality of periods; transmitting a DCI to schedule a SL retransmission of a TB; wherein the TB to be retransmitted based on the DCI corresponds to a TB of the at least one TB transmitted by the UE using the configured transmission resources within the one of the periods.

In some embodiments, the TB to be retransmitted corresponds to a last TB transmitted by the UE within the one of the periods.

In some embodiments, a maximum of one TB is transmitted by the UE in each period.

In some embodiments, the DCI contains a HARQ process ID, and the HARQ process ID in the DCI is associated with the one of the periods based on a time location of a first SL transmission resource of the one of the periods, a configured maximum HARQ process number and a periodicity of the resources available for SL transmission.

In some embodiments, the configured grant includes a physical uplink control channel (PUCCH) resource associated with each period; the method further comprising: for each period, receiving HARQ feedback on the PUCCH resource associated with the period, wherein the PUCCH resource is only used for HARQ feedback associated with the last TB transmitted in the period.

According to another aspect of the present disclosure, there is provided an apparatus comprising a processor and memory, the apparatus configured to execute a method comprising: receiving a SL configured grant to configure one or more transmission resources available for SL transmissions by the apparatus that repeats on a periodic basis within each of a plurality of periods; during one of said periods, transmitting one or more transmissions of at least one TB using the one or more transmission resources configured by the SL configured grant; receiving a DCI to schedule a SL retransmission of a TB; wherein the TB to be retransmitted corresponds to a TB of the at least one TB transmitted by the apparatus using the configured transmission resources within the one of the periods; transmitting a SL transmission containing a retransmission of the transport block of the at least one TB using resources specified in the DCI; transmitting a SCI associated with each SL transmission, the SCI containing a HARQ process ID for the SL transmission.

In some embodiments, a maximum of one TB is transmitted by the UE in each period.

In some embodiments, the DCI contains a HARQ process ID that is different from the HARQ process ID contained in the SCI.

In some embodiments, the DCI contains a HARQ process ID, and the HARQ process ID in the DCI is associated with the one of the periods based on a time location of a first SL transmission resource of the one of the periods, a configured maximum HARQ process number and a periodicity of the resources available for SL transmission.

In some embodiments, the apparatus further comprises retransmitting a TB of the at least one TB transmitted using resources configured for the configured grant in another period other than the one of the periods.

In some embodiments, the configured grant includes a PUCCH resource associated with each period; the apparatus further comprising: for each period, transmitting HARQ feedback on the PUCCH resource associated with the period, wherein the PUCCH resource is only used for HARQ feedback associated with the last TB transmitted in the period.

According to another aspect of the present disclosure, there is provided a network device comprising a processor and memory, the network device configured to execute a method comprising: transmitting a SL configured grant (CG) to a UE to configure one or more transmission resources available for SL transmissions by the UE that repeats on a periodic basis within each of a plurality of periods; transmitting a DCI to schedule a SL retransmission of a TB; wherein the TB to be retransmitted based on the DCI corresponds to a TB of the at least one TB transmitted by the UE using the configured transmission resources within the one of the periods.

In some embodiments, a maximum of one TB is transmitted by the UE in each period.

In some embodiments, the DCI contains a HARQ process ID, and the HARQ process ID in the DCI is associated with the one of the periods based on a time location of a first SL transmission resource of the one of the periods, a configured maximum HARQ process number and a periodicity of the resources available for SL transmission.

In some embodiments, the configured grant includes a PUCCH resource associated with each period; the method further comprising: for each period, receiving HARQ feedback on the PUCCH resource associated with the period, wherein the PUCCH resource is only used for HARQ feedback associated with the last TB transmitted in the period.

According to one aspect of the present disclosure, there is provided a method comprising: transmitting a SL configured grant (CG) to a UE to configure a plurality of transmission resources available for SL transmission by the UE that repeats on a periodic basis within a plurality of periods; transmitting a DCI to schedule a SL retransmission; wherein a TB to be retransmitted based on the DCI corresponds to an nth TB transmitted by the UE using the configured transmission resources within the one of the periods, where n is fixed or preconfigured, and $1 \leq n \leq$ number of SL transmission resources within a period.

Optionally, the TB to be retransmitted corresponds to a last TB transmitted by the UE within the one of the periods.

Optionally, the DCI is associated with the one of the periods through a HARQ process ID or timing relationship.

Optionally, the configured grant includes a PUCCH resource associated with each period; the method further comprising: for each period, receiving HARQ feedback on the PUCCH resource associated with the period, wherein PUCCH resource is only used for HARQ feedback associated with the last TB transmitted in the period.

According to another aspect of the present disclosure, there is provided a method comprising: a UE receiving a SL configured grant to configure a plurality of transmission resources available for SL transmission by the UE that repeats on a periodic basis within a plurality of periods; during one of said periods, transmitting at least one TB using a transmission resource configured by the SL configured grant; receiving a DCI to schedule a SL retransmission; wherein a TB to be retransmitted corresponds to an nth TB transmitted by the UE using the configured transmission resources within the one of the periods, where n is fixed or preconfigured, and 1≤n≤number of SL transmission resources within a period; retransmitting the nth transport block using resources specified in the DCI.

Optionally, the TB to be retransmitted corresponds to a last TB transmitted by the UE within the one of the periods.

Optionally, the DCI is associated with the one of the periods through a HARQ process ID or timing relationship.

Optionally, the configured grant includes a PUCCH resource associated with each period; the method further comprising: for each period, transmitting HARQ feedback on the PUCCH resource associated with the period, wherein the PUCCH resource is only used for HARQ feedback associated with the last TB transmitted in the period.

Optionally, the method further comprises: the UE transmitting a new TB using one of the configured transmission resources available for SL transmission within a period only if all TBs previously transmitted within the period have been acknowledged.

Optionally, the method further comprises: within one of the plurality of periods, the UE transmitting a plurality TB transmissions using the plurality of transmission resources within that period; receiving HARQ feedback from a receive UE in respect of each TB transmitted; wherein the plurality of TB transmissions include: a first TB transmission of a first TB; at least one subsequent transmission, each subsequent transmission being a retransmission of the TB transmitted in the previous TB transmission in a case where HARQ feedback for the previous TB indicated failure, and being a transmission of a different TB than the TB transmitted in the previous TB transmission in a case where HARQ feedback for the previous TB transmission indicated success.

According to another aspect of the present disclosure, there is provided a method comprising: a UE receiving a SL configured grant specifying a plurality of transmission resources available for SL transmission by the UE that repeats on a periodic basis within a plurality of periods; within one of the plurality of periods, the UE transmitting a plurality TB transmissions using the plurality of transmission resources within that period; receiving HARQ feedback from a receive UE in respect of each TB transmitted; wherein the plurality of TB transmissions include: a first TB transmission of a first TB; at least one subsequent transmission, each subsequent transmission being a retransmission of the TB transmitted in the previous TB transmission in a case where HARQ feedback for the previous TB indicated failure, and being a transmission of a different TB than the TB transmitted in the previous TB transmission in a case where HARQ feedback for the previous TB transmission indicated success.

According to another aspect of the present disclosure, there is provide a method comprising: transmitting a SL configured grant to a UE to configure a plurality of transmission resources available for SL transmission by the UE that repeats on a periodic basis within a plurality of periods; transmitting a DCI to schedule a SL retransmission by the UE; wherein the DCI specifies retransmission resources that are available to the UE to retransmit any TB transmitted by the UE within one of the periods.

Optionally, the DCI is associated with the one of the periods through a HARQ process ID or timing relationship.

According to another aspect of the present disclosure, there is provided a method comprising: a UE receiving a SL configured grant specifying a plurality of transmission resources available for SL transmission by the UE that repeats on a periodic basis within a plurality of periods; during one of said periods, transmitting at least one TB using a transmission resource configured by the SL configured grant; receiving a DCI to schedule a SL retransmission; wherein the DCI specifies retransmission resources that are available to the UE to retransmit any unacknowledged TB transmitted by the UE within one of the periods; retransmitting an unacknowledged transport block using the transmission resources specified in the DCI.

Optionally, the DCI is associated with the one of the periods through a HARQ process ID or timing relationship.

According to another aspect of the present disclosure, there is provided a method comprising: transmitting a SL configured grant to a UE to configure a plurality of transmission resources available for SL transmission by the UE that repeats on a periodic basis within a plurality of periods; transmitting a DCI to schedule a SL retransmission; wherein the DCI contains a HARQ process ID that is associated with one of the periods, and the DCI specifies retransmission resources that are available to the UE to retransmit an unacknowledged TB transmitted by the UE within the one of the periods.

According to another aspect of the present disclosure, there is provided a method comprising: a UE receiving a SL configured grant configuring a plurality of transmission resources available for SL transmission by the UE that repeats on a periodic basis within a plurality of periods; during one of said periods, transmitting at least one TB using a transmission resource configured by the SL configured grant; receiving a DCI to schedule a SL retransmission; wherein the DCI contains a HARQ process ID that is associated with one of the periods, and the DCI specifies retransmission resources that are available to the UE to retransmit a TB transmitted by the UE within the one of the periods; retransmitting an unacknowledged transport block using the transmission resources specified in the DCI.

Optionally, retransmitting an unacknowledged transport block comprises retransmitting a last TB transmitted within the one of the periods.

Optionally, the HARQ process ID is associated with one of the period via a mapping relationship by deriving the HARQ process ID using the time location of the first resource within the period.

Optionally, the method further comprises: for each TB transmission transmitting an SCI containing a HARQ process ID, wherein for a TB and each retransmission of the TB the same HARQ process ID is used; for each TB transmission, receiving HARQ feedback from a receive UE.

Optionally, the HARQ process ID transmitted in the SCI for the retransmission following the scheduling grant is different than the HARQ process ID indicated in the DCI that schedule the retransmission.

Optionally, where more than 1 TB has been transmitted within the period of SL CG transmission, and each TB is associated with a different HARQ process ID that is indicated in the SCI associated with the transmission of the TB.

Optionally, where more than 1 TB has been transmitted within the period of SL CG transmission, and transmissions of all TBs within the period are associated with the same HARQ process ID that is indicated in the SCI associated with the transmission of the TB.

According to another aspect of the present disclosure, there is provided a method comprising: a UE transmitting a SCI to reserve transmission resources for an initial SL transmission and a plurality of subsequent SL transmissions;

wherein the SCI contains a first parameter indicating a first size of the transmission resource for the initial SL transmission and a second parameter indicating a second size of the transmission resource for each of the plurality of subsequent SL transmissions; the UE transmitting SL transmissions in accordance with the transmitted SCI.

Optionally, the first size is smaller than the second size.

According to another aspect of the present disclosure, there is provided a method comprising: a UE transmitting a SCI to reserve transmission resources for an initial SL transmission and a plurality of subsequent SL transmissions; for each subsequent SL transmission: within a respective preemption window, monitoring for a reservation by another UE that overlaps with the transmission resource reserved for the subsequent SL transmission that satisfies at least one preemption condition; when there is a reservation by another UE that overlaps with the transmission resource reserved for the subsequent SL transmission that satisfies at least one preemption condition, refraining from transmitting the subsequent SL transmission; wherein the respective preemption window is a time range that includes times later than ni-T0, and times earlier than n1-T1, where: ni is a time of transmission of the subsequent SL transmission; T0 is a processing delay in performing resource selection and processing for the initial transmission and the associated SCI; n1 is a time of transmission of the initial SL transmission; T1 is a processing delay in performing preemption sensing and reselection processing for the subsequent SL transmission.

According to another aspect of the present disclosure, there is provided a method comprising: a UE transmitting a sidelink control information (SCI) to reserve transmission resources for an initial SL transmission and a plurality of subsequent SL transmissions; for each subsequent SL transmission: within a respective preemption window, monitoring for a reservation by another UE that overlaps with the transmission resource reserved for the subsequent SL transmission that satisfies at least one preemption condition; when there is a reservation by another UE that overlaps with the transmission resource reserved for the subsequent SL transmission that satisfies at least one preemption condition, refraining from transmitting the subsequent SL transmission; wherein the respective preemption window is a time range that includes times later than ni-T2, and times earlier than ni-T1, where: ni is a time of transmission of the subsequent SL transmission; T1 is a processing delay in performing preemption sensing and reselection processing for the subsequent SL transmission; and T2 is a maximum gap between an initial transmission and a last transmission that the initial transmission reserves.

According to another aspect of the present disclosure, there is provided a user equipment comprising: a processor and memory; the apparatus configured to perform a method in accordance with any one or a combination of two or more methods as described herein.

According to another aspect of the present disclosure, there is provided a base station comprising: a processor and memory; the apparatus configured to perform a method in accordance with any one or a combination of two or more methods of as described herein.

BRIEF DESCRIPTION OF THE DRAWINGS

Embodiments of the disclosure will now be described with reference to the attached drawings in which.

DETAILED DESCRIPTION

Figure 1A:
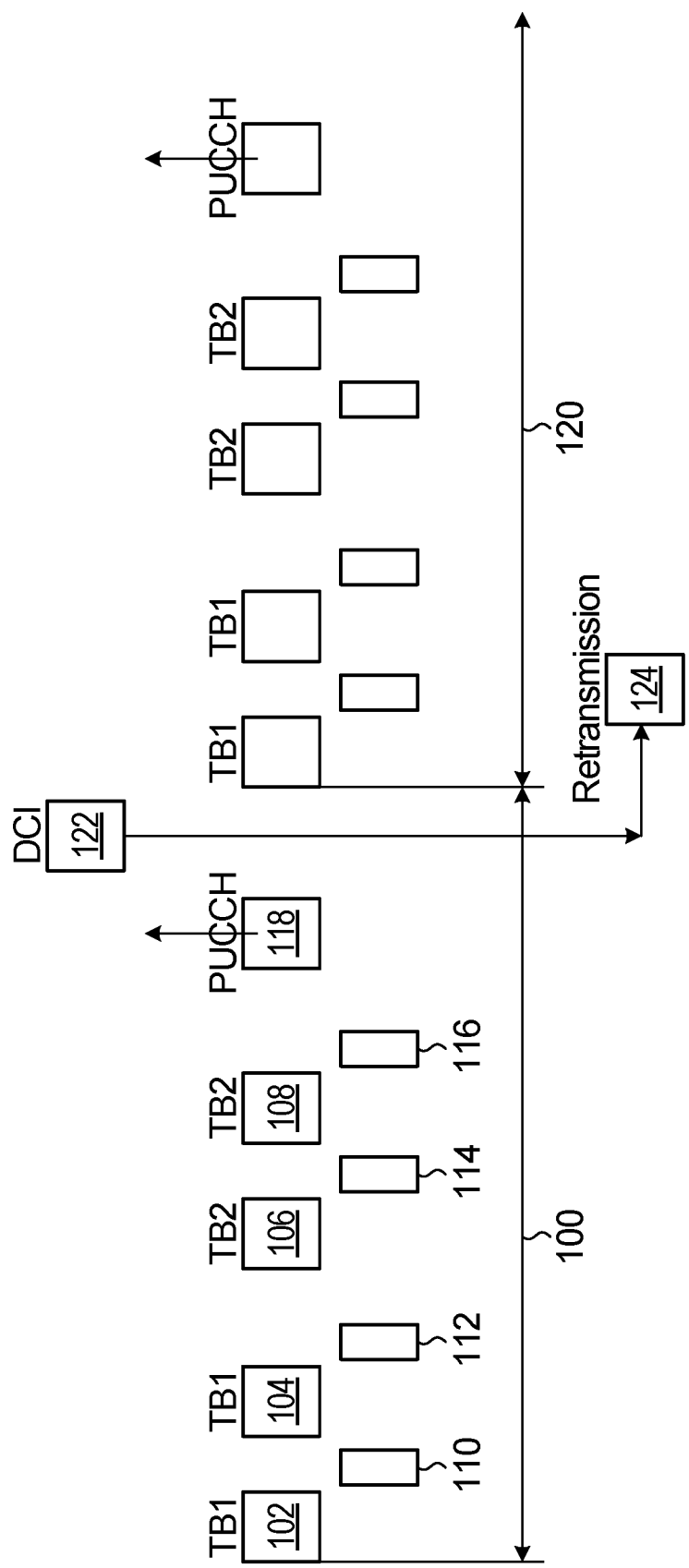
FIG. 1A shows an example of configured grant SL transmission resource configuration.

A sidelink transmission of a discrete amount of information (e.g., a transport block) may include a blind retransmission procedure performed by a transmit UE to improve the reliability of the sidelink transmission. A blind retransmission refers to a retransmission of an initial transmission that is not triggered by HARQ feedback or a new scheduling grant. A retransmission refers to a subsequent transmission that includes some or all of the content of the initial retransmission. Where a retransmission includes all of the content of the initial transmission, this can also be referred to as a repetition.

In NR, there are two SL transmission modes. In mode 1, the BS controls SL transmission. Mode 1 is most suitable for in coverage UE.

Mode 1—dynamic scheduling sub-mode—the network dynamically schedules SL transmissions. In this dynamic scheduling sub-mode, BS may send a DCI to the transmit UE to schedule the SL transmission. The transmit UE follows the scheduling grant in the DCI and sends a SL transmission to the receive UE or receive UEs.

Mode 1—SL CG Type 1—also known as grant-free transmission: the configured grant resource is semi-statically configured by RRC signaling (which may include a RRC configured grant). The UE uses the configured resource without dynamic signaling (e.g. DCI) to perform SL transmissions on the configured CG resources.

Mode 1—SL CG Type 2: The configured grant resource is configured by RRC signaling and DCI signaling. In type 2 CG, a transmit UE may receive some configuration in RRC signaling and then the transmit UE may further receive a DCI activation signal. The DCI activation signal further includes time frequency resource configuration for Type 2 CG. After receiving the DCI activation signal, the UE can use the configured grant resource for SL CG transmission. DCI may be also used to deactivate Type 2 CG.

In both Type 1 SL CG and Type 2 SL CG, the RRC signaling may include a periodicity indicating that the SL CG resources are in a periodic manner with the configured periodicity. There may be multiple SL CG PSSCH resources configured for a periodicity. For Type 1 SL CG, an offset may be further configured with respect to a reference time, which may indicate the time domain location of the first SL CG PSSCH resource within a period. For Type 2 SL CG, the time domain location of the first SL CG PSSCH resource within a period may be indicated by the timing of receiving the activation DCI as well as the time gap between the DCI and the PSSCH resource (which is indicated in the DCI). For example, in FIG. 1A, the time location of the first PSSCH resource in one period (e.g. 102) is indicated by the offset in Type 1 CG. If multiple PSSCH resources or transmission occasions are configured in one period for SL CG, the other transmission occasions or PSSCH resources other than the first one may be indicated by its relative time location with respect to the first transmission occasion or first PSSCH resource within the period. The relative location can be configured through a time domain transmission pattern or a bit map.

In Type 1 SL configured grant (CG) configuration, the resource is configured semi-statically or preconfigured without dynamic signaling in DCI. In one variant, the SL data transmission on PSSCH according to CG may have an associated SCI or PSCCH. The SL CG configuration may be configured within a RP or configured without a RP. Each SL CG configuration may be configured within a resource pool. Alternatively, a SL CG configuration resource may be configured and multiple CG configurations may be supported/configured within a resource pool.

Each SL CG configuration may include one or more of transmit resources or receive sources. The configuration can be semi-static or semi-persistently configured, the example of configuration signaling can include RRC, system information block (SIB), preconfigured, or a combination of RRC and SIB.

Each SL CG configuration may include parameters for one or multiple transmit SL CG configurations and/or parameters for one or multiple receive SL CG configurations. Parameters for each transmit SL CG configuration may include one or multiple sets of parameters, each set including one or a combination of:

Time and frequency resources, periodicity, pattern window length, frequency sub-channel definition, location of SCI, (initial) transmission pattern and/or transmission pattern pool, frequency hopping parameters, MCS or MCS pool, Demodulation Reference Signal (DMRS) or DMRS pool, repetition K, HARQ process related parameters, feedback channel parameters and optionally Destination ID or destination group ID.

Parameters for each receive SL CG configuration may include one or multiple sets of parameters, each set including one or a combination of: Time and frequency resources, periodicity, pattern window length, frequency sub-channel definition, location of SCI, (initial) transmission pattern and/or transmission pattern pool, frequency hopping parameters, MCS or MCS pool, DMRS or DMRS pool, repetition K, HARQ process related parameters, feedback channel parameters and optionally source ID or source group ID.

The time domain resource configuration may include optionally a periodicity, optionally an offset (also referred to as starting slot), transmission pattern, repetition number (K), RV sequence for repetition, and optionally length of the transmission pattern etc. Transmission pattern in the time domain may be indicated using a bitmap indicating which time slot can be used for the UE to transmit SL data.

The frequency domain resource configuration may include, for example, the active Bandwidth part (BWP) used for SL transmission and subchannels/Resource block group (RBG) of the BWP. In some embodiments, the frequency domain configuration may first indicate the starting RB of the first frequency sub-channel (RB_{start}), number of RBs per frequency subchannel (N_{RB_in_subchannel}), and the total number of frequency sub-channels (n_{subchannel}) available for the SL transmission. The above parameters can be used to determine the range and partition of frequency subchannels. For example, in a resource grid as shown in in FIG. 1B described in detail below, the above parameters (starting RB of F0, number of frequency sub-channels is 4 and the number of RBs per sub-channel is the number of RBs in F0) can define the frequency location and size for F0 to F4. The above parameters can be UE specifically indicated (e.g. in RRC) or can be broadcast in system information for multiple UEs. The frequency domain configuration may then indicate the index of the frequency subchannel m to be used for the transmission. A UE may then determine its frequency allocation corresponding to the RB that starts at RB index RB_{start}+m*N_{RB_in_subchannel} and with n_{subchannel} number of continuous RBs to be used. In the case, a transmission pattern bitmap is determined in the time domain and different subchannels may be used in the frequency domain for different repetitions of the TB, the frequency domain configuration may further indicate the frequency index for each transmission/repetition of the TB. For example, in case of the example shown in FIG. 1B, F0 to F3 may correspond with index m as 0, 1, 2, 3, respectively, and the frequency domain resource configuration may indicate a frequency channel index sequence corresponding to each transmission of the TB, which is {0, 2}, corresponding to F0 and F2 for first and second transmission of the TB. In some embodiments, the resource assigned to each PSSCH transmission may include more than 1 subchannel in the frequency domain. In this scenario, in addition to indicating the above definition of subchannel, the resource configuration may further include the starting subchannel index and the number of subchannels used for each PSSCH transmission. The starting subchannel index and the number of subchannels used can be individually defined for each repetition. Alternatively, the number of subchannels used for each repetition may be the same and only the starting subchannel index needs to be signaled for each repetition. In another embodiment, the starting subchannel index may be defined for just the initial transmission, the starting subchannel index for the rest of the repetition can be the same as the initial transmission or determined by the starting subchannel index along with frequency hopping parameters or through frequency domain pattern indication.

If a SL control channel is defined, the time and frequency domain resource configuration for the SL control channel PSCCH (or scheduling assignment (SA)) may share the same above configuration for SL data channel or have their own separate configuration.

Time frequency resources may include the number of sub-channels used for each SL data or physical sidelink shared channel (PSSCH) transmission (which may be referred to as a PSSCH partition). The definition of sub-channel may include size of subchannel (e.g. in resource blocks), and/or number of subchannels in frequency domain. The location of sidelink control channel (SCI) can be signaled in different methods. In some embodiments, the pool of all SCI locations (also named PSCCH pool) may be defined first in the resource pool and then the exact location of SCI can be further defined in the SL CG configuration. In one example, if PSCCH is not transmitted in adjacent RBs with PSSCH, the PSCCH pool is a separate region in frequency domain next to the frequency subchannels used for data transmission. Each SCI corresponding to each data frequency channel is equal size. Therefore, once the PSCCH pool is defined, e.g. through signaling the starting RB of PSCCH pool and the number of RBs used for SCI in frequency domain, the UE can derive the location of SCI. In some embodiments, the number of RBs used in SCI is predetermined without signaling. In another scenario, SCI is always at a fixed location with respect to the PSSCH transmission (e.g. 2 RBs for each slot transmission next to the PSSCH transmission). In both cases, the UE will be able to know where to detect SCI, either based on some default rule, or through configuration. Periodicity indicates the time duration between two neighboring GF resource or resource bundle that repeats over time. Here resource bundle refers to multiple PSSCH resources defined in a pattern. In some embodiments, the pattern is used for multiple repetitions of a TB. Some embodiments may allow the use of the resource pattern for transmission of different TBs. The pattern window length is the time domain length of which each transmission pattern is defined within.

Unicast, groupcast and broadcast

A sidelink transmission may be categorized as either a unicast, groupcast or broadcast. Unicast, groupcast, broadcast refers to the SL transmission that is intended for a single receive UE, a group of receive UEs and many receive UEs that may be unknown to the transmit UE in advance, respectively. For unicast and groupcast, HARQ feedback is supported, i.e., the receive UE or UEs may send a HARQ feedback (ACK or NACK) to the transmit UE to indicate whether the transmission is successfully or unsuccessfully received. There may be two type of groupcast: option 1 and option 2. In option 1 groupcast, the members of the group for receiving the groupcast transmission may not be known in advance by the transmit UE. Also, in option 1 groupcast, receive UE may only feedback NACK on a corresponding physical sidelink feedback channel (PSFCH) channel if it does not receive successfully, but does not feedback anything if it received it successfully. In option 2 groupcast, members of the group for receiving the transmission may be known by the transmit UE. Also in option 2 groupcast, a receive UE may feedback ACK or NACK depending whether it receives the SL transmission successfully. The description of this disclosure may apply to different cast scenario, e.g., for unicast and groupcast.

HARQ Feedback Reporting on PUCCH

For both dynamic and configured grant, a UE may be configured with a PUCCH resource to report HARQ feedback corresponding to the grant (dynamic grant or configured grant). The PUCCH is for use for the transmit UE in reporting hybrid automatic repeat request (HARQ) feedback it received from the receive UE on a corresponding PSFCH resource to the network in respect of sidelink transmissions. For dynamic grant, the dynamic scheduling DCI may schedule one or more PSSCH resources for transmission of a single TB in SL. DCI may further indicate the corresponding PUCCH resource for the UE to report HARQ feedback for the transmissions corresponding to the grant. In configured grant, a set of resources (e.g. PSSCH resources) are configured in a periodic manner. Each period may contain a set of PSSCH resources and a PUCCH resource is configured for each period.

The following rule may be used by the UE to report the SL HARQ feedback to the base station. For unicast, a transmit (Tx) UE may report contents received in PSFCH (i.e., ACK/NACK) to gNB. The TX UE reports NACK if PSFCH is not detected. When generating the HARQ-ACK report for the transmissions corresponding to a grant, the TX UE uses the most recent PSFCH occasion associated with the transmissions. For groupcast option 1, the TX UE reports ACK to the gNB if no PSFCH is detected. The TX UE reports NACK to the gNB if at least one PSFCH (i.e., NACK) is detected. When generating the HARQ-ACK report for the transmissions corresponding to a grant, the TX UE uses the most recent PSFCH occasion) associated with the transmissions. For groupcast option 2, the TX UE reports ACK if all expected PSFCH resources are received and carry ACK. The TX UE reports NACK if at least one received PSFCH resource carries NACK or if no PSFCH is detected.

If the transmit (Tx) UE does not transmit/receive due to prioritization, the UE may not feedback an ACK or NACK on the corresponding PUCCH resource. This way, if a base station does not detect an ACK or NACK on PUCCH resource, it may know that no transmission is done in the SL according to the grant and it may do nothing or schedule a retransmission of the TB based on the assumption that no transmission is performed on the SL according to the grant corresponding to the PUCCH resource. In another embodiment, if the Tx UE does not transmit/receive due to prioritization, the transmit UE may report NACK to the base station and expecting the base station to schedule a retransmission for the corresponding grant.

If no PSCCH/PSSCH is transmitted in a set of resources in a period for configured grant, in one embodiment, the transmit UE does not report ACK or NACK in the PUCCH resource corresponding to the period of the configured grant. This way, as the base station is aware of the fact that the transmit UE may not transmit anything on the SL configured grant resource if it has no data to transmit, if the base station does not detect an ACK or NACK on corresponding PUCCH resource, the base station may not schedule a corresponding retransmission.

If a maximum number of HARQ retransmissions for a TB is reached, a UE may do one of the following: In one embodiment, a UE does not report ACK or NACK on the corresponding PUCCH resource to the base station regardless of whether ACK or NACK is received for the TB. In another embodiment, a UE always report ACK regardless of whether ACK or NACK is received for the TB. For both embodiments, the UE does not expect the base station to schedule a retransmission of the TB as the maximum number of HARQ retransmissions for a TB is already reached.

In the case in which multiple TBs have been transmitted in the set of resources within a period of configured grant, there may be only one PUCCH resource configured that is corresponding to all resources in the period. In one embodiment, a UE reports the HARQ feedback corresponding to the HARQ feedback of the last or most recent PSFCH transmission corresponding to the grant.

In another embodiment, a UE may report ACK on the PUCCH resource if all TBs transmitted within the period using SL CG resource are successful (i.e. if all PSFCH detected that correspond to transmissions of each TB within the period of CG are ACKs), and a UE may report NACK if any TB transmitted within the period using SL CG resources is unsuccessful (i.e, if any PSFCH detected that is corresponding to one of the TB transmitted within the period of CG is NACK). This way, if any of the TB is unsuccessfully transmitted, the transmit UE can expect the base station to provide retransmission resource by sending a retransmission scheduling grant for the SL CG transmissions (e.g. in responds to the NACK reported on PUCCH).

In Mode 1 SL Configured Grant, a set of resources is configured in a periodic manner, with a configured periodicity. Within one period, a set of K data transmission resources are configured. The transmission resources are sometimes also called transmission occasions. The number K of data transmission resources may also be configured or implicitly indicated from configuring the set of resources. Here, the K resources may, for example, refer to time frequency resources of a physical shared sidelink channel (PSSCH) for data transmission. The resources may additionally include a physical sidelink control channel (PSCCH) resource for transmitting a SL control channel (for example a sidelink control information (SCI)) that is associated with each data transmission. Physical uplink control channel (PUCCH) resources may also be configured in respect of SL CG transmission, for use for the transmit UE in reporting hybrid automatic repeat request (HARQ) feedback it received from the receive UE to the network in respect of sidelink transmissions. The HARQ feedback may contain an ACK or NACK, indicating the SL transmission is successfully received or unsuccessfully received by the receive UE, respectively. In some embodiments, the PUCCH resource is also periodic, with a single PUCCH resource being configured for each period. The PUCCH resource may share the same periodicity as the CG data transmission resources.

Figure 1B:
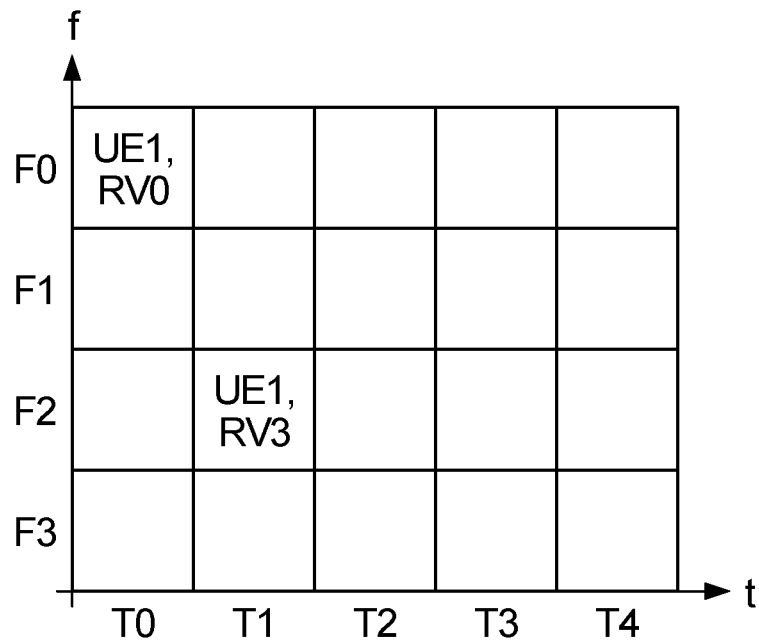
FIG. 1B shows an example of a resource grid.

An example is shown in FIG. 1A which shows an example of periodic data transmission resource configuration. Within a period 100, shown are K=4 SL data transmission resources 102, 104, 106, 108. Also shown are corresponding physical sidelink feedback channel (PSFCH) resources 110, 112, 114, 116 for receiving HARQ feedback from the receive UE in respect of transmission on the data transmission resources 102, 104, 106, 108. Also shown is a PUCCH resource 118 for transmitting HARQ feedback to the network. This structure (including the resources for data transmission, sidelink feedback, and feedback to the network) repeats with a configured periodicity, with a second period indicated at 120. Also shown at 122 is a DCI transmitted by the network to the UE to schedule a retransmission 124 with respect to a CG transmission.

In some other embodiments, there may be only one PSFCH resource corresponding to multiple PSSCH resources corresponding to a grant. This may apply to both multiple PSSCH resources configured in a period of configured grant or scheduled by a single DCI in dynamic grant. In some embodiments, the one PSFCH resource corresponds to the last PSSCH resource among the set of PSSCH resource configured in a period for configured grant or scheduled by a single DCI in dynamic grant. For example, in FIG. 1A, there may be only 1 PSFCH resource 116 that is used only to send HARQ feedback with regard to SL transmission in 108. In some embodiments, the transmit UE can dynamically decide whether it expects a HARQ feedback to be sent by the receiver in a corresponding PSFCH channel for each transmission on a PSSCH resource. The transmit UE may indicate whether HARQ feedback is expected in the SCI associated with each PSSCH transmission.

Although many embodiments in this disclosure are discussed under the assumption of a set of PSSCH resources in a period of configured grant, it may be similarly applicable to a set of PSSCH resources scheduled by a single DCI in dynamic grant.

In some embodiments, the PUCCH resource can carry a single HARQ feedback element, for example, a single bit, in respect of the period associated with the PUCCH resource. In the example of FIG. 1A, the PUCCH 118 carries a single HARQ feedback bit that the transmit UE is transmitting to the base station in respect of period 100.

The periodic configured resource in configured grant (or the multiple resource scheduled by a single DCI in dynamic grant) can be used to transmit one or multiple transport blocks, or retransmissions thereof, within a given period. A UE may transmit a new transport block (TB) or a retransmission of a TB using each of the data transmission resources. A TB is a block of data that is encoded and transmitted using a transmission resource, e.g., using a PSSCH resource in case of SL transmission. A UE may retransmit the same data in another PSSCH resource, which may be encoded in the same or different way (e.g. using a different redundancy version). In case of retransmission of the same data, the initial transmission and the retransmission or repetition is considered as transmission of the same TB. For each data transmission resource, also referred to as a transmit occasion, a UE may select which TB to transmit or following some rules to decide whether it can transmit a new TB. In the illustrated example, resource 102 is used for an initial transmission of a first transport block TB1, resource 104 is used for a retransmission in respect of the first transport block TB1, resource 106 is used for an initial transmission of a second transport block TB2, and resource 108 is used for a retransmission in respect of the second transport block TB2. More generally, for a CG resource having K data transmission resources, possibly as many as K different transport blocks may be transmitted, or as few as one transport block and up to K−1 repetitions thereof.

In some scenarios, the number of HARQ feedback received on the PSFCH can match that of the SL data transmission resources within a period, so that the receive UE can transmit feedback on a per transmission basis to the transmit UE. However, there is only one PUCCH resource that can carry one HARQ feedback bit to be reported to the base station by the transmit UE for all the SL data transmission resources within a period, and therefore it is not possible to report all HARQ feedback to the network for each SL data transmission resource.

DCI and the Scheduled Retransmission Correspond to the Last TB Transmitted in the Period In an embodiment, network can send a DCI that is used to dynamically schedule a SL retransmission of data that is initially transmitted using a SL CG transmission by the UE according to the resources configured in SL CG. The DCI may be associated with a period and it is intended to schedule a retransmission of an nth TB transmitted within the period, where 1≤n≤number of SL transmission resources within a period, and n is fixed or configured and known to the transmitter and receiver. For example, the DCI may always be for scheduling the last TB transmitted within the period. Based on the received DCI, the transmit UE retransmits the corresponding TB (for example, the last TB transmitted in the period) according to the resource and parameters specified in the scheduling grant contained in the DCI.

An advantage of this approach is that because a specific TB in a period is scheduled by a DCI, it is not necessary to include information in the DCI that identifies the specific TB. Both the network and the transmit UE understand that a DCI associated with a period will schedule the retransmission of a specific TB transmitted within the period. In addition, the network may be unaware of how many TB the UE has transmitted as it does not detect the SL transmission or the corresponding DCI, having a common understanding that a DCI associated with a period will help a UE identify which TB to be retransmit based on the DCI.

Figure 7:
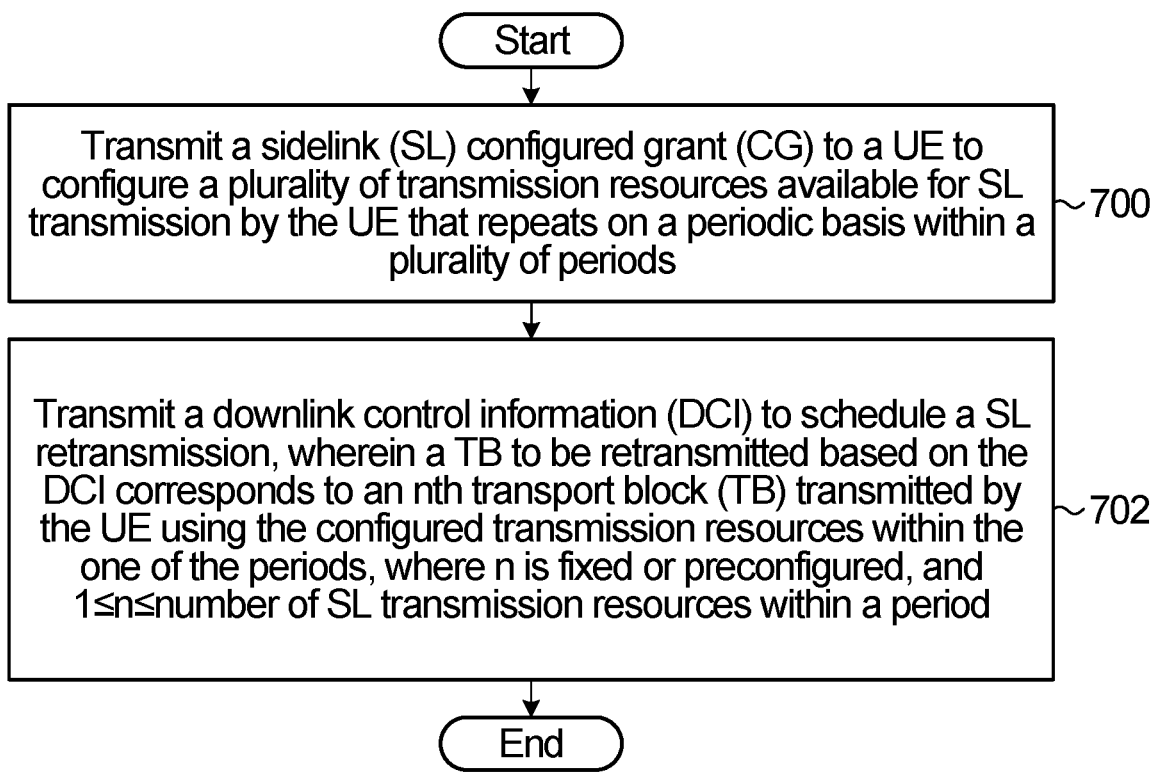
FIGS. 7 to 16 are flowcharts of methods provided by embodiments of the application.

A flowchart of a method based on this approach is depicted in FIG. 7 and includes the following blocks:

700: transmitting a SL configured grant (CG) to a UE to configure a plurality of transmission resources available for SL transmission by the UE that repeats on a periodic basis within a plurality of periods; and

702: transmitting a downlink control information (DCI) to schedule a SL retransmission.

A TB to be retransmitted based on the DCI corresponds to an nth TB transmitted by the UE using the configured transmission resources within the one of the periods, where n is fixed or preconfigured, and $1 \leq n \leq$ number of SL transmission resources within a period. In some embodiments, the TB to be retransmitted corresponds to a last TB transmitted by the UE within the one of the periods. In another embodiment, the DCI is associated with the one of the periods through a HARQ process ID or timing relationship. More generally, the TB to be retransmitted corresponds to a TB of the at least one TB transmitted by the UE using the configured transmission resources within the one of the periods. In a specific case, a maximum of one TB is transmitted within each period.

The configuration of SL configured grant resources can be performed using RRC signaling for Type 1 CG, and a combination of RRC signaling and activation DCI for Type 2 CG.

An example of the DCI association with one of the periods through a timing relationship may be as follows: If the time location of the DCI received is within a time gap T11 with respect to a reference time location of a period, the DCI can be considered to be associated with the period or any of the transmissions in the period. The reference time location can be the first PSSCH resource of the period, the last PSSCH resource of the period, the PUCCH resource of the period etc. DCI is associated with one of the periods through a HARQ process ID is further described in more detail in other parts of this disclosure. Note that the above may be applicable to all embodiments and methods described in the disclosure, not just the flowchart of FIG. 7.

Figure 8:
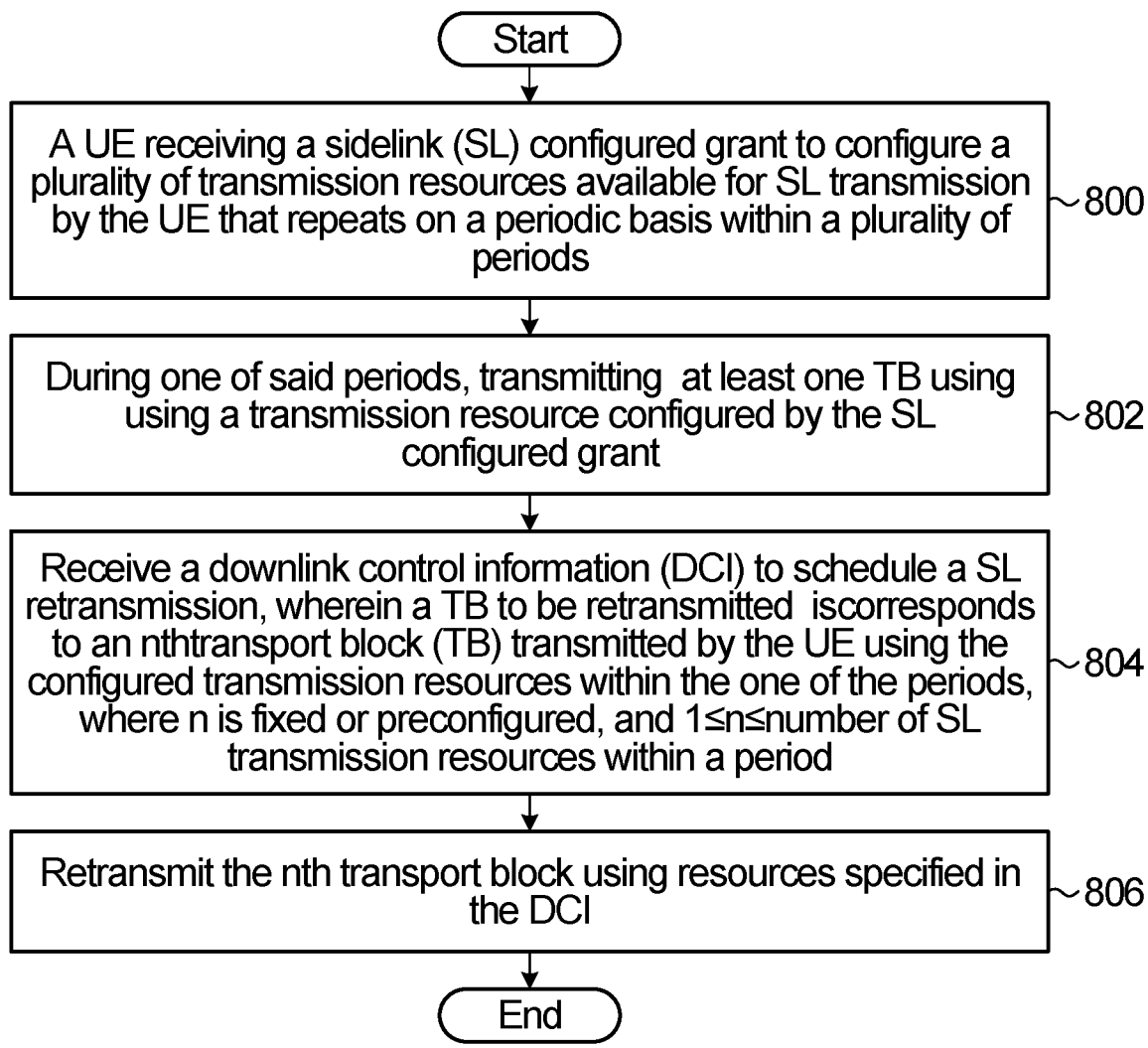

A flowchart of another method based on this approach is depicted in FIG. 8 and includes the following blocks:

800: a UE receiving a SL configured grant to configure a plurality of transmission resources available for SL transmission by the UE that repeats on a periodic basis within a plurality of periods;

802: during one of said periods, transmitting at least one TB using a transmission resource configured by the SL configured grant; and

804: receiving a DCI to schedule a SL retransmission.

A TB to be retransmitted corresponds to an nth TB transmitted by the UE using the configured transmission resources within the one of the periods, where n is fixed or preconfigured, and $1 \leq n \leq$ number of SL transmission resources within a period. The method further includes:

806: retransmitting the nth transport block using resources specified in the DCI.

In some embodiments, a configured grant may include the configuration of a PUCCH resource (for example resource 118 in FIG. 1A) for use in reporting HARQ feedback received by the transmit UE from the receive UE, in respect of a SL transmission from the transmit UE to the receive UE, back to the BS (or gNB). There may be one PUCCH resource configured for each period. The one PUCCH resource may be able to only report one HARQ feedback bit (e.g. ACK or NACK) to the base station. In some embodiments, in the case where multiple TBs are transmitted in the same period, the PUCCH resource is used only to report the HARQ feedback associated with the last TB transmission within the period. In this case, where a DCI scheduling retransmission corresponds to the last TB transmitted in the period, this is consistent with the HARQ feedback received via the PUCCH resource.

Optionally, for the method of the flowchart of FIG. 7, the configured grant includes a physical uplink control channel (PUCCH) resource associated with each period, and the method further involves, for each period, receiving HARQ feedback on the PUCCH resource associated with the period, wherein PUCCH resource is only used for reporting HARQ feedback associated with the last TB transmitted in the period.

Optionally, for the method of the flowchart of FIG. 8, the configured grant includes a PUCCH resource associated with each period, and the method further involves, for each period, transmitting HARQ feedback on the PUCCH resource associated with the period, wherein the PUCCH resource is only used for HARQ feedback associated with the last TB transmitted in the period.

In some embodiments, for SL configured grant, a UE is permitted to transmit a new TB within a period only if all TBs previously transmitted within the period have been acknowledged by the receive UE. In this case, the last TB transmitted in a period is the only TB that can possibly still be in error at the end of the period, and as such, transmitting feedback via the PUCCH in respect of the last TB, and receiving a DCI scheduling retransmission corresponding to the last TB are all consistent. A reason that a UE reports the HARQ feedback via PUCCH to the base station is that in the case of a NACK is reported, i.e a SL transmission was not successfully received by the receive UE, the base station can choose to schedule a retransmission of the TB corresponding to that SL transmission by sending a DCI and provide a resource for that retransmission so that the transmit UE can use the resources provided by the base station to retransmit the TB that is not successfully received by the receive UE. With the provided method, in which a new TB can be transmitted only if all previously transmitted TBs have been acknowledged, a UE only needs to report the HARQ feedback of the last TB for potential retransmission. If the last TB is transmitted successfully, the UE reports an ACK to the base station and the base station knows all TBs within the period have been received successfully. If the last TB is transmitted unsuccessfully and the transmit UE receives a NACK for that TB, the transmit UE reports a NACK to the base station and the base station knows the last TB is not successfully transmitted, therefore, the base station may choose to send a scheduling grant to schedule a retransmission of that TB. As all previous TB transmitted within the period have been acknowledged, i.e., the UE received an ACK for all previous TBs, the UE does not need a retransmission resource for them. In one embodiment, the last TB corresponds to the TB associated with the last transmission resource configured by SL CG for the period. In another embodiment, the last TB may not necessarily mean the last transmission resource configured by SL CG for the period. For example, a UE may not transmit anything on a SL CG resource if it does not have any data to be transmitted. In the case that some of the SL CG resources are not used to transmit any data, the last TB corresponds to the transmission in the last SL CG resource that is actually used for SL data transmission. In other words, the UE reports the HARQ feedback corresponding to the most recent SL transmissions within the set of resources corresponding to the period on the PUCCH resource.

Figure 9:
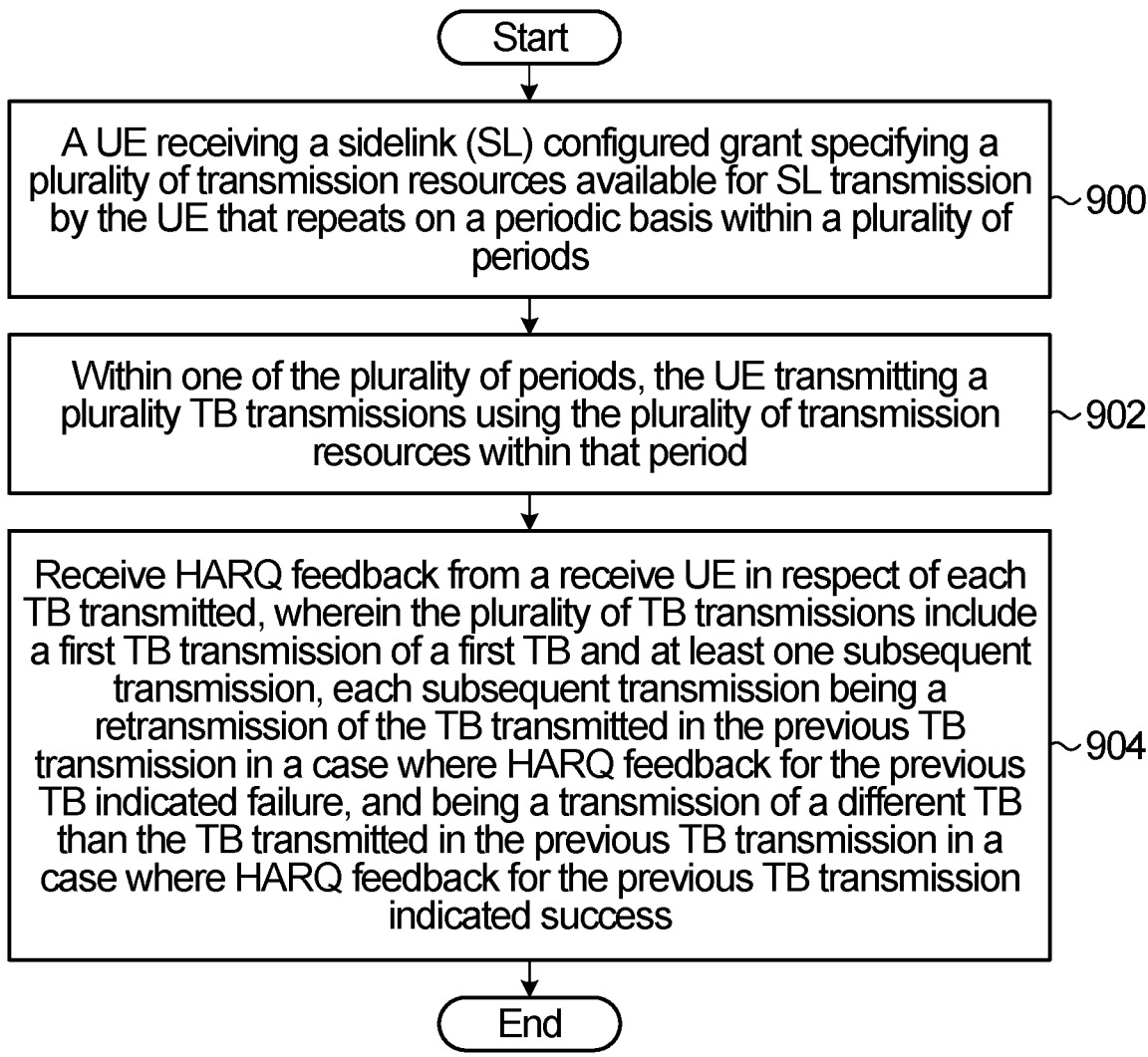

A flowchart of a method based on this approach is depicted in FIG. 9 and includes the following blocks:

900: a UE receiving a SL configured grant specifying a plurality of transmission resources available for SL transmission by the UE that repeats on a periodic basis within a plurality of periods;

902: within one of the plurality of periods, the UE transmitting a plurality TB transmissions using the plurality of transmission resources within that period;

904: receiving HARQ feedback from a receive UE in respect of each TB transmitted.

The plurality of TB transmissions include a first TB transmission of a first TB and at least one subsequent transmission, each subsequent transmission being a retransmission of the TB transmitted in the previous TB transmission in a case where HARQ feedback for the previous TB transmission indicated failure (or if no HARQ feedback is expected or received for the previous TB transmission), and being a transmission of a different TB than the TB transmitted in the previous TB transmission in a case where HARQ feedback for the previous TB transmission indicated success.

Referring to FIG. 1A, in the example shown, the transmit UE transmits the first TB (TB1) in the first two resources and TB2 in the last two resources within period 100. For the purpose of this example, the sidelink feedback 116 in respect of the second transmission of TB2 is a negative acknowledgement (NACK), and the UE transmits feedback on PUCCH 118 indicating a NACK. When the UE receives a DCI 122 for retransmission that corresponds to this period 100, the UE associates this DCI with the last TB transmitted in the period, namely TB2 in the illustrated example, and the UE proceeds to make a retransmission in respect of TB2 using the scheduled retransmission resources.

With this embodiment, in the absence of the above introduced constraint that a UE is permitted to transmit a new TB within a period only if all TBs transmitted within the period have been acknowledged by the receive UE, if a TB other than the last TB is not transmitted successfully, this unsuccessful TB transmission is not reported to the network and the UE may take its own steps to retransmit the TB or the UE may not be able to find resource to retransmit that TB. For the example of FIG. 1A, if the second transmission of TB1 was not successful, this is not reported to the network, and the UE may take its own steps to retransmit TB1, for example using a resource during a subsequent period.

As mentioned above, in some embodiments, for configured grant, a UE is configured to only transmit a new TB within a period if all TBs transmitted within the period have been positively acknowledged by the receive UE. So in the example of FIG. 1A, the UE can only begin transmitting TB2 using resource 106 if an acknowledgement (ACK) has been received in respect of the transmission of TB1 using resource 104. In this embodiment, by the time the last transmission resource within a period is used (e.g. resource 108 within period 100), the only TB that can possibly not have been successfully transmitted is the TB transmitted using that last transmission resource.

Retransmission Resource Scheduled by a DCI can be Used to Retransmit any Unacknowledged TB In another embodiment, a retransmission resource scheduled by a DCI can be used to retransmit any unacknowledged TB. In this embodiment, when there is at least one TB that is unsuccessfully transmitted by the end of the period, the UE transmits a NACK to the network using the PUCCH resource for the period. The network responds with a DCI to allocate a resource for a retransmission. The UE can use this resource to retransmit any TB that remains unsuccessfully transmitted within the period. Referring again to FIG. 1A, if any one of TB1, TB2 remains unsuccessfully transmitted (as determined by the PSFCH transmissions), the UE transmits a NACK to the network on PUCCH 118. The network responds with DCI 122 allocating a retransmission resource. The UE can then use the resource to transmit the unsuccessfully transmitted TB. For example, if only TB1 was unsuccessful, the UE retransmits TB1. If only TB2 was unsuccessful, the UE retransmits TB2. If both TB1 and TB2 were unsuccessful, the UE retransmits either one of TB1 and TB2. In some embodiments, where multiple TBs were unsuccessful, one or more rules may be defined that indicate which TB to retransmit; for example a rule may dictate that the oldest TB be retransmitted.

Figure 10:
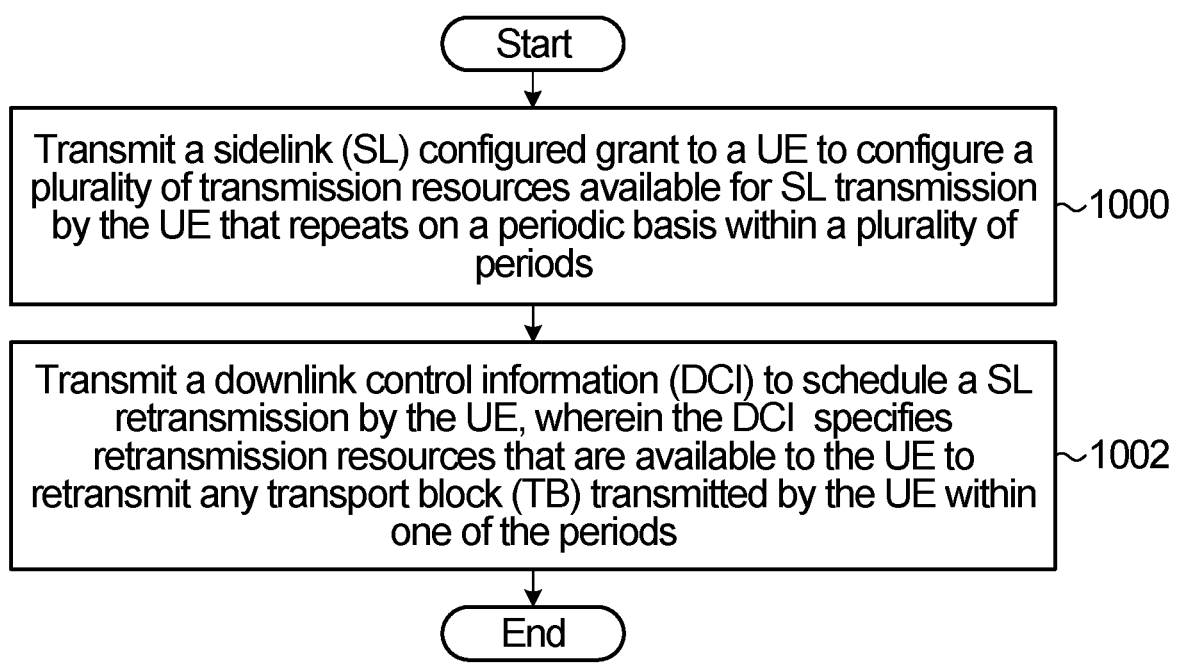

A flowchart of a method based on this approach is depicted in FIG. 10 and includes the following blocks:

1000: transmitting a SL configured grant to a UE to configure a plurality of transmission resources available for SL transmission by the UE that repeats on a periodic basis within a plurality of periods;

1002: transmitting a DCI to schedule a SL retransmission by the UE. The DCI specifies retransmission resources that are available to the UE to retransmit any TB transmitted by the UE within one of the periods.

Figure 11:
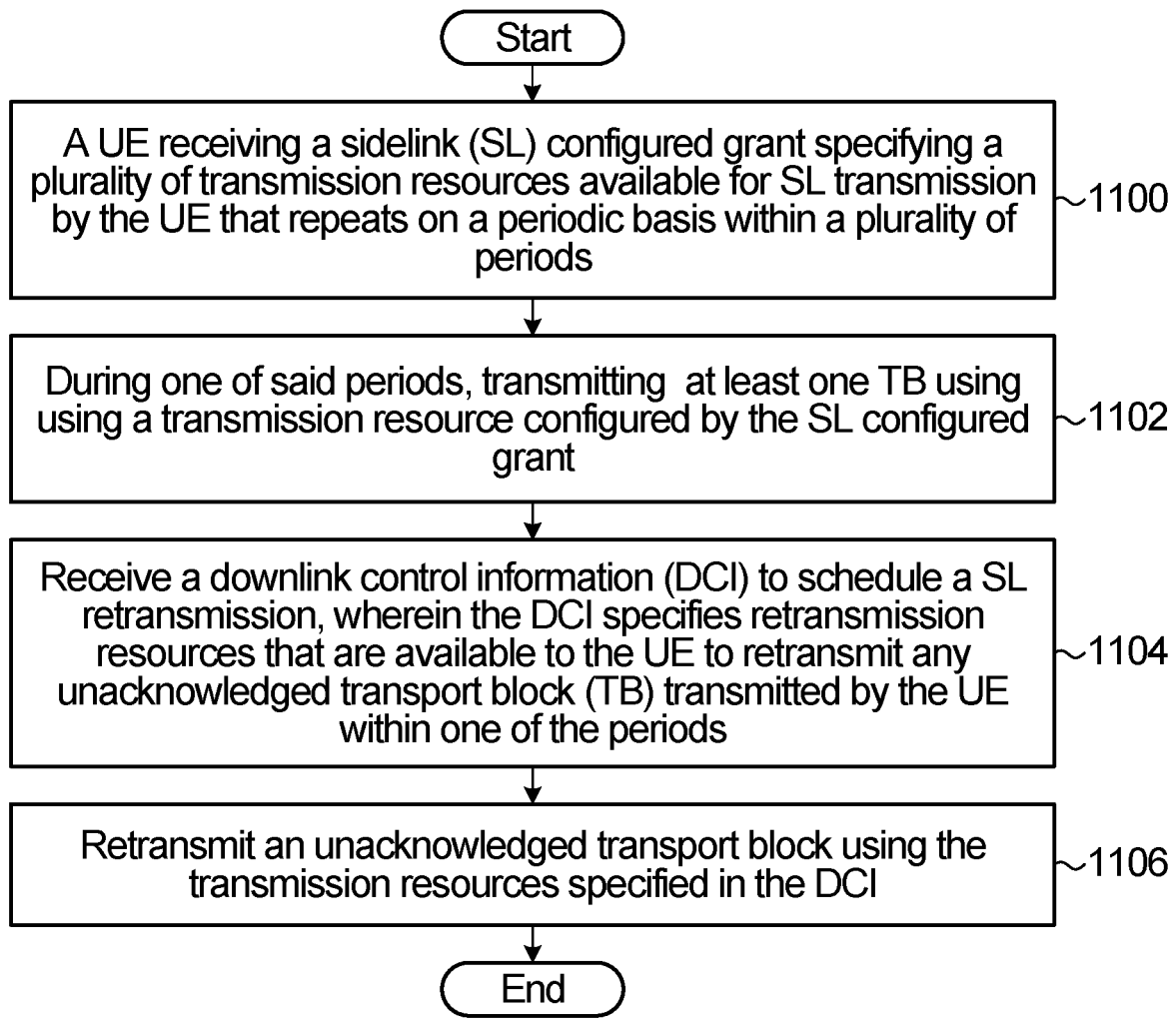

A flowchart of another method based on this approach is depicted in FIG. 11 and includes the following blocks:

1102: a UE receiving a SL configured grant specifying a plurality of transmission resources available for SL transmission by the UE that repeats on a periodic basis within a plurality of periods;

1104: during one of said periods, transmitting at least one TB using using a transmission resource configured by the SL configured grant;

1106: receiving a DCI to schedule a SL retransmission. The DCI specifies retransmission resources that are available to the UE to retransmit any unacknowledged TB transmitted by the UE within one of the periods. The method continues with:

1108: retransmitting an unacknowledged transport block using the transmission resources specified in the DCI.

HARQ Process ID in DCI

In some embodiments, a DCI may include a HARQ process ID. In case of a DCI being used to schedule a retransmission of a TB that is initially transmitted based on SL dynamic grant, as dynamic grant based transmission is dynamically scheduled by the network or base station using a DCI, a UE may interpret the retransmission is with regard to the TB that is transmitted initially based on a scheduling grant transmitted in a DCI that includes the same HARQ process ID.

In case of SL Configured grant transmission, a base station may also use a DCI to dynamically schedule a retransmission of a TB transmitted using SL transmission resources configured in a SL configured grant However, as SL configured grant is not dynamically scheduled, i.e., either semi-statically configured in RRC (Type 1 SL CG) or semi-persistently scheduled (Type 2 SL CG), there is no HARQ process ID indicated for each SL CG transmission that the base station is aware of. Therefore, a UE cannot simply map the HARQ process ID received from the retransmission DCI to the HARQ process ID of a TB transmission (which is not scheduled dynamically). In order to identify which TB the retransmission DCI associated with, the DCI may be associated with a specific period or a specific TB of the period of the SL CG transmission as described earlier. In some embodiments, in order to associate the DCI with a specific period, a retransmission DCI includes a HARQ process ID (referred to herein as DCI HARQ process ID for convenience) that has a fixed mapping relationship with CG transmission resources. In a specific example, all CG resources in one period correspond to one DCI HARQ process ID. In the example of FIG. 1A, there would be a first DCI HARQ process ID associated with period 100 and a second DCI HARQ process ID associated with period 120. A UE identifies the period to which a received DCI corresponds based on the mapping between the DCI HARQ process ID indicated in the DCI and the CG transmission resources.

Then the UE determines which TB transmitted within the period indicated by the DCI HARQ process ID should be retransmitted. In one embodiment, the retransmission DCI corresponds to the last TB transmitted during the period (more generally the nth TB as described previously) that corresponds to the DCI HARQ process ID indicated in the DCI, and the UE retransmits that TB.

When a PUCCH resource is configured and HARQ feedback is supported for the CG transmission, this embodiment may be combined with the previously described embodiment in which the PUCCH is used to report the HARQ feedback of the last TB transmitted within the period. In another embodiment, the UE will retransmit one of the unacknowledged TBs of the period that corresponds to the DCI HARQ process ID indicated in the DCI. When a PUCCH resource is configured and HARQ feedback is supported for the CG transmission, this embodiment may be combined with the previously described embodiment in which the PUCCH is used to report NACK if any of the TB transmitted within the period is unsuccessful (e.g. indicated by NACK from receive UE in the corresponding PSFCH resource) and report ACK only if all TBs transmitted successfully within the period (e.g. indicated by ACK from the receive UE in the corresponding PSFCH resource). This way, PUCCH is only used to indicate whether there is an unsuccessful TB transmission within the period and the BS can schedule a retransmission with respect to the period if a NACK is reported.

The DCI HARQ process ID used in the DCI transmitted from the network to the UE may be distinct from HARQ process IDs indicated by SL communications, e.g., the transmit UE may send a SCI associated with each SL data transmission where SCI may include a HARQ process ID, referred to here as SCI HARQ process ID for convenience. Note that the DCI HARQ process ID and the SCI HARQ process ID are both simply HARQ process IDs, but are so named for ease of differentiation in this description. Another name for the DCI HARQ process ID is gNB HARQ process ID. Another name for the SCI HARQ process ID is UE HARQ process ID. In another embodiment, the UE may always use the same DCI HARQ process ID in SCI for the SL transmission.

The HARQ process ID may be mapped to the time domain location of CG resources. In one example, the HARQ process ID is mapped to the time domain location of CG resources, it can be derived based on CG resources as follows:

HARQ process ID=floor (current slot number/periodicity) mod (maximum number of SL HARQ processes).

Where:

Current slot number: current slot number is the time location of the SL resources, e.g, the slot index of SL data transmission, e.g. current slot number=(SFN×numberOfSlotsPerFrame)+slot number in the frame. SFN is the frame number, numberOfSlotsPerFrame is the number of consecutive slots per frame. In some embodiments, current slot number refers to the location of the first SL data resource (PSSCH resource) among the set of SL data resources within a period. And the rest of the SL data resources within a period is assumed to be associated with the same HARQ process ID of the first SL data resources in the same period. The location of the first SL data resource of each period is indicated by an offset as well as offset plus an integer number times periodicity. The offset can be also configured for SL CG, and may be based on unit of slot. In some embodiments, the offset is indicated as offset with respect to frame or subframe number 0. The rest of the SL data resources (PSSCH resources) may be indicated based on their relative location with the first SL data resource.

Periodicity: is the periodicity of SL CG resources, the SL CG resource will repeat periodically based on the periodicity. Periodicity may be configured in RRC signaling for SL CG. An example of unit for periodicity is slot.

Maximum number of SL HARQ processes: Maximum number of SL HARQ process is the maximum number of supported HARQ process for the SL CG transmission. This number may be configured for each SL CG. For example, if the maximum number of SL HARQ process is 4, UE may be permitted to use 4 HARQ process for SL CG transmission with HARQ process ID 0, 1, 2 and 3. In the above definitions:

Mod: Mod is the modular function

Floor: Floor is the floor function, where floor(x) gives the closet integer to x that is smaller than x.

Note the HARQ process ID mapping is based on the current slot number of the first SL transmission resource within a period. All the subsequent resources within the period are assumed to have the same HARQ process ID as the first SL transmission resource within a period.

In another embodiment, instead of deriving HARQ process ID from the time location of the first SL transmission resource within a period for SL CG, the HARQ process ID may be derived based on or mapped to the time location of the last SL transmission resources within the period that is used for any SL transmission within a period. This is consistent with the case when PUCCH resource is used to report the HARQ feedback associated with the last TB of the period. As an example, HARQ process ID is derived according to HARQ process ID=floor (current slot number/periodicity) mod (maximum number of SL HARQ processes). Current slot number may refer to the slot number of last transmission resource within a period.

In another embodiment, the HARQ process ID may be derived as follows:

HARQ process ID=floor ((current slot number−offset)/periodicity) mod (maximum number of SL HARQ processes)

Where:

the current slot number now can refer to any SL data transmission resources configured within a period and all the SL data transmission resources are mapped to the same HARQ process ID based on this formulation.

With either formulation, the SL transmission resources within a period are mapped to the same HARQ process ID, i.e., there is a mapping relationship between the HARQ process ID and each period (or the SL transmission resources of that period). And this mapping relationship can be used to associate a DCI with a HARQ process ID to a period of CG transmissions. As discussed earlier, a UE can then identify that the retransmission DCI is to schedule a retransmission of the last TB of a period that maps to the HARQ process ID indicated in the DCI (or the DCI HARQ process ID).

The maximum number of SL HARQ processes and the periodicity may be configured for the configured grant communication, for example, in RRC signaling. In some embodiments, a UE may be able select a HARQ process ID for each SL transmission and indicate the HARQ process ID in the SCI associated with each SL transmission. For example, referring again to the example of FIG. 1A, a UE may choose HARQ process ID m1=1 for TB1 and HARQ process ID m2=2 for TB2. Then, the UE derives a corresponding gNB HARQ process ID n for any CG resource in the period (referred to simply as gNB HARQ process ID for simplicity) using the predefined mapping relationship (e.g. gNB HARQ process ID=floor (current slot number/periodicity) mod (maximum number of HARQ process). In the example, assume the mapping relationship yields gNB HARQ process ID n=0. For embodiments where the feedback is in respect of the last TB transmitted during the period that is mapped to the gNB HARQ process ID n=0, the UE maintains a one to one map between the gNB HARQ process ID n (=0 in the example) and UE HARQ process ID that is chosen for the last TB of the period (i.e., m2 (=2 in the example)). When a UE receives a DCI retransmission grant of a CG transmission and a HARQ process ID n=0, the UE finds the corresponding UE HARQ process ID m2=2 based on the maintained mapping. Alternatively, the UE directly maintains a mapping between gNB HARQ process ID n=0 and the last TB of the CG transmission in the period that is mapped/associated with HARQ process ID 0 based on the formulation. Then the UE retransmits TB2 using UE HARQ process ID m2=2 at the resource specified in the DCI retransmission grant and indicates UE HARQ process ID=2 in a corresponding SCI.

Figure 12:
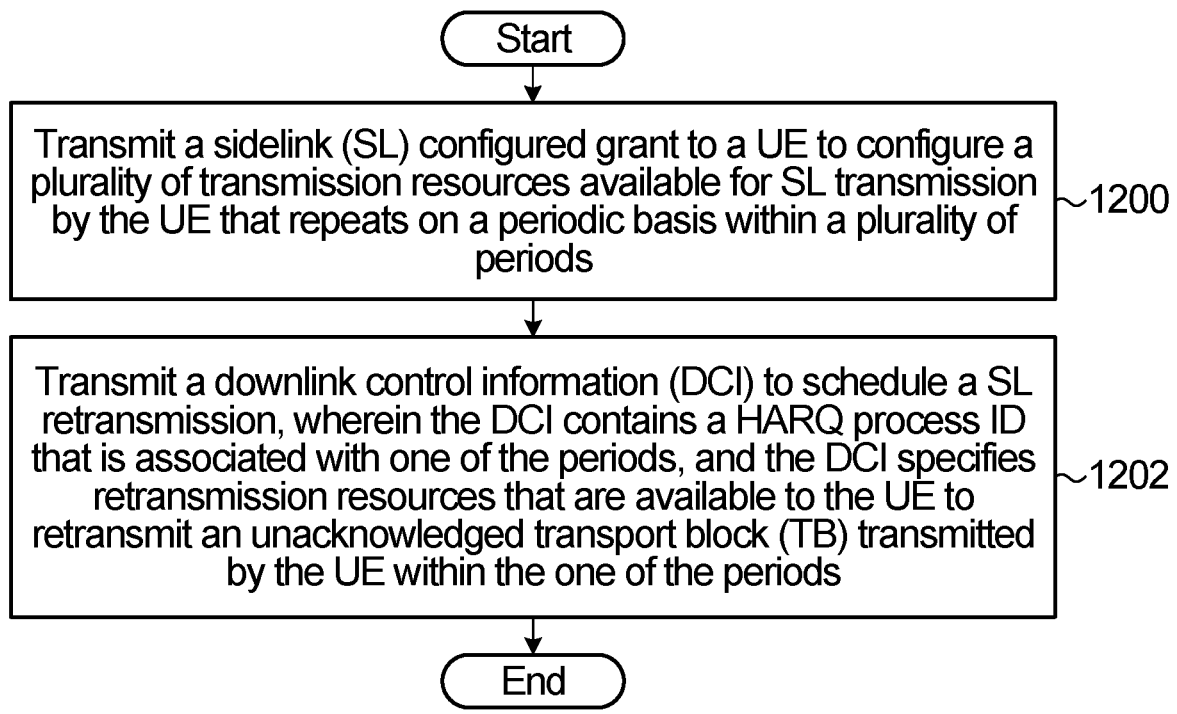

A flowchart of a method based on this approach is depicted in FIG. 12 and includes the following blocks:

1200: transmitting a SL configured grant to a UE to configure a plurality of transmission resources available for SL transmission by the UE that repeats on a periodic basis within a plurality of periods;

1202: transmitting a DCI to schedule a SL retransmission. The DCI contains a HARQ process ID that is associated with one of the periods, and the DCI specifies retransmission resources that are available to the UE to retransmit an unacknowledged TB transmitted by the UE within the one of the periods. In another embodiment for 1202: transmitting a DCI to schedule a SL retransmission. The DCI contains a HARQ process ID that is associated with one of the periods, and the DCI specifies retransmission resources that are available to the UE to retransmit the last TB transmitted by the UE within the one of the periods.

Figure 13:
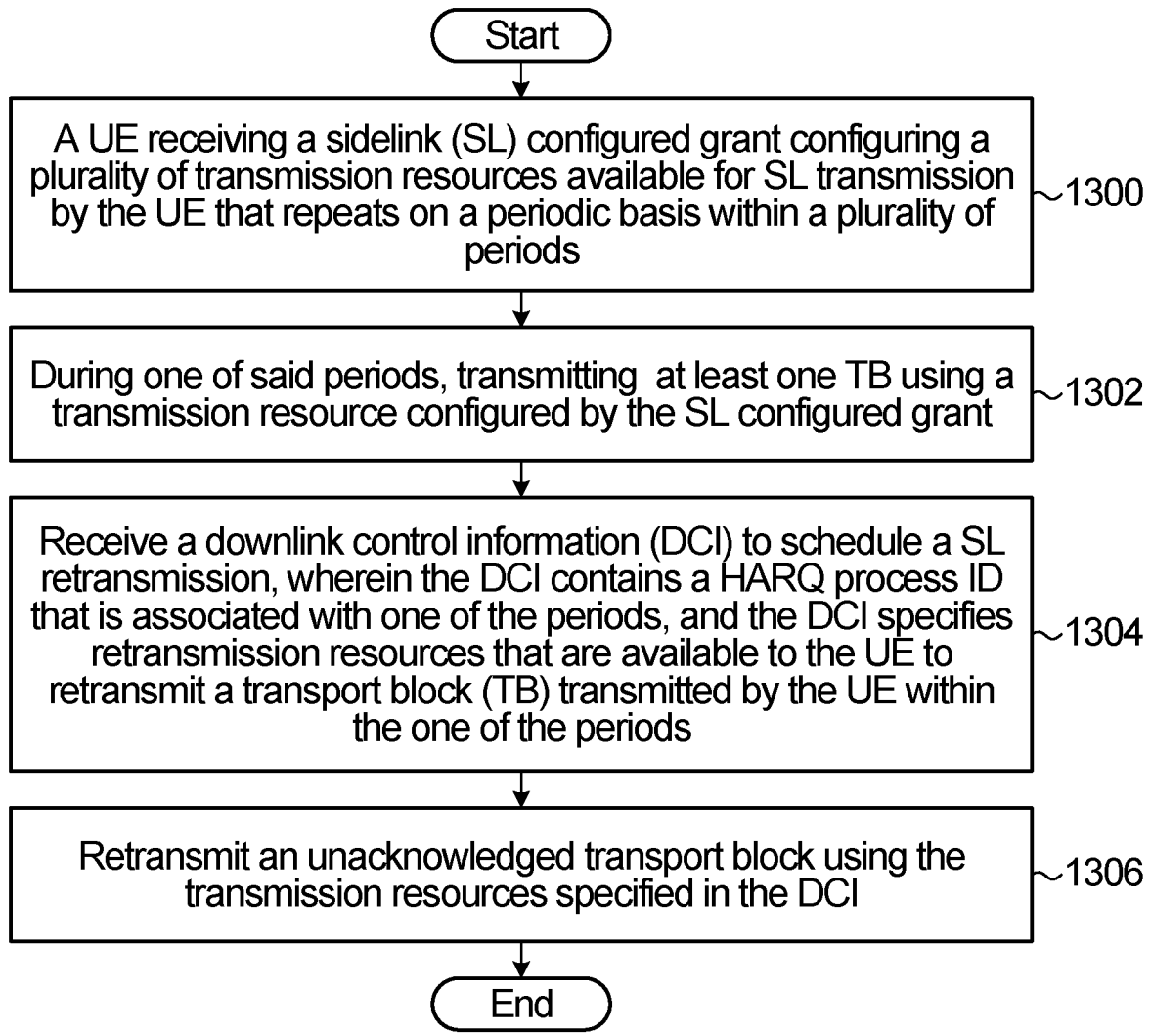

A flowchart of another method based on this approach is depicted in FIG. 13 and includes the following blocks:

1300: a UE receiving a SL configured grant configuring a plurality of transmission resources available for SL transmission by the UE that repeats on a periodic basis within a plurality of periods;

1302: during one of said periods, transmitting at least one TB using a transmission resource configured by the SL configured grant;

1304: receiving a DCI to schedule a SL retransmission; The DCI contains a HARQ process ID that is associated with one of the periods, and the DCI specifies retransmission resources that are available to the UE to retransmit a TB transmitted by the UE within the one of the periods.

1306: retransmitting an unacknowledged transport block within the one of the periods using the transmission resources specified in the DCI.

In another embodiment for 1306: retransmitting a transport block within the one of the periods using the transmission resources specified in the DCI.

In some embodiments, retransmitting a transport block comprises retransmitting a last TB transmitted within the one of the periods.

In some embodiments, retransmitting an unacknowledged transport block comprises retransmitting a last unacknowledged TB transmitted within the one of the periods.

In some embodiments, the HARQ process ID is associated with one of the period via a mapping relationship by deriving the HARQ process ID using the time location of the first resource within the period.

Note that the UE may identify the retransmission grant as being a retransmission grant of a CG transmission in the following way: if the UE determines that the CRC of the DCI grant is scrambled with SL CS-RNTI (by using SL CS-RNTI to decode the DCI), which is a RNTI configured for SL configured grant and is different from the SL RNTI configured for dynamic grant, the UE can determine that the DCI grant is for SL CG transmission. In addition, if the UE finds the DCI contains an NDI field set to 1, UE knows it is for retransmission. Then the UE can check the HARQ process ID field contained in the DCI.

Content of SCI and HARQ Process ID in SCI

The UE may indicate a HARQ process ID in an SCI associated with each SL transmission. The SCI may include new data indicator (NDI), HARQ process ID, and redundancy version (RV) information. The receive UE can use the NDI, HARQ process ID, and RV to determine how to combine signals from different transmissions to decode the TB. NDI can indicate whether this is new transmission or retransmission. The HARQ process ID indicated in SCI (for convince, named SCI HARQ process ID) may be different than the HARQ process ID that is mapped to the period (namely the DCI HARQ process ID). However, the receive UE can still do resource combining based on the HARQ process ID and NDI received from the SCI. When a UE receives a DCI for scheduling retransmission of a CG transmission, the UE retransmits the corresponding TB and uses the SL HARQ process ID corresponding to that TB in the SCI (which may be different from the indicated HARQ process ID in DCI or DCI HARQ process ID mapped to the period).

Referring to FIG. 1A, in an example, the first period 100 is mapped to DCI HARQ process ID 0, and the second period is mapped to DCI HARQ process ID 1. The UE uses SCI HARQ process ID 0 for the TB1, and then SCI HARQ process ID 1 for TB2. When the UE receives a retransmission DCI with a DCI HARQ process ID 0, the UE knows this corresponds to period 100. For an embodiment where each DCI corresponds to the last TB transmitted during the period, the DCI transmitted with DCI HARQ process ID 0 corresponding to period 100 will correspond to the second transmission of TB2 of this period (which corresponds to SCI HARQ process ID 1). Therefore, the UE retransmits TB2 and indicates the SCI HARQ process ID as 1 in an SCI sent so the receive UE so that the receive UE can know to combine the retransmission with the transmissions of TB2 sent earlier (also with HARQ process ID 1 in SCI).

In some embodiments, the method of FIG. 13 also includes:

for each TB transmission transmitting an SCI containing a HARQ process ID, wherein for a TB and each retransmission of the TB the same HARQ process ID is used; and for each TB transmission, receiving HARQ feedback from a receive UE.

Optionally, the HARQ process ID transmitted in the SCI for the retransmission following the scheduling grant is different than the HARQ process ID indicated in the DCI that schedule the retransmission.

Optionally, more than 1 TB has been transmitted within the period of SL CG transmission, and each TB is associated with a different HARQ process ID that is indicated in the SCI associated with the transmission of the TB.

Optionally, more than 1 TB has been transmitted within the period of SL CG transmission, and transmissions of all TBs within the period are associated with the same HARQ process ID that is indicated in the SCI associated with the transmission of the TB.

In some embodiments, a DCI for configured grant retransmission contains a CRC scrambled with a SL configured scheduling-RNTI (CS-RNTI), and the SL CS-RNTI is configured for the SL CG transmission that is different than the RNTI used for SL dynamic grant. Therefore, when the UE receives a DCI with CRC scrambled with SL CG-RNTI, the UE can determine that this is for retransmission of a CG transmission and not for retransmission of a TB that is previously scheduled by a dynamic grant.

Constraint on New TB Transmission

As noted above, in some embodiments, for configured grant, a UE is permitted to transmit a new TB within a period only if all TBs transmitted within the period have been acknowledged by the receive UE. Note that this feature can be provided in combination with the previously described embodiments as detailed above, or as a standalone embodiment.

In the example of FIG. 1A, a UE may transmit TB1 in the first two resources and receive an ACK after the second transmission. Note that in the absence of an ACK for TB1 in the first resource, the UE does not have the freedom to transmit a different TB during the second resource. After receiving the ACK for the second transmission, the UE starts transmitting TB2 on the third resource. The UE may choose to use the same or different HARQ process IDs in SCI transmitted in association with the SL transmission for TB1 and TB2. In the case of the same HARQ process ID is used, UE may use the HARQ process ID that is mapped to the period or the first SL CG resource of the period using the mapping described earlier or UE may select its own HARQ process ID. In the case different HARQ process ID is used, UE may have to select its own HARQ process ID, at least for the new TB, the first TB can be either selected by the UE or follow the HARQ process ID mapping relationship. There is no ambiguity because the transmit UE does not expect any retransmission for TB1 anymore as it is acknowledged. And the receive UE will know that TB2 is a new transmission because it can use the NDI field from the SCI associated with the initial transmission of TB2 that this is for transmission of a new TB.

MCS Selection by Tx UE

In Mode-1, for a UE, for each of the configured MCS tables (for both dynamic grant and configured grant), if no MCS is configured, UE autonomously selects MCS from the full range of values. If a single MCS is configured, the MCS is used by the UE. If a range of two or more MCSs are configured, UE autonomously selects the MCS from the configured values.

For both dynamic and configured grant, if a single MCS is configured, the MCS is used by the UE; while if no MCS or more than 1 MCSs are configured, a UE autonomously selects the MCS from the full range of values or the configured values. Note that for configured grant Type 1, MCS is likely to be conservative since there is a need to maintain high reliability in order to meet the latency/reliability requirements of advanced V2X use cases. Besides, on the SL, interference rather than accurate adaptation to channel variations constitutes the main mitigating factor, thus a semi-static selection of MCS by the transmit UE is enough, especially for the case of SL CG Type 1. Therefore, for CG Type 1, transmit UE can select the MCS and send the selected MCS to Rx UE via PC5-RRC in case of unicast and group cast and periodic SCI in case of broadcast.

In Type 1 CG, if no MCS or more than one MCS is configured, Tx UE selects a single MCS among the full range of MCS values or the configured MCS values and informs the Rx UE the selected MCS via PC5-RRC (for unicast and groupcast) or periodic SCI (for broadcast).

Mode 2 Resource Reservation Signalling

For reservation in Mode 2, a UE may reserve up to Nmax resources (including an initial transmission) for transmission of the same TB. Note that in some embodiments, this can be extended to different TBs. The reservation resources are indicated in an SCI associated with an initial transmission. In some embodiments, the SCI is transmitted using resources collocated with the resource of the initial data transmission (e.g. in the same slot).

In accordance with an embodiment of the application, the initial transmission which contains the SCI which reserves the resources for the initial transmission and later transmissions may reserve resources that have a different frequency size (for example defined as a number of subchannels) for the initial transmission, as compared to later transmissions. Note that if all the transmissions are the same frequency size, e.g. n subchannels, then only one frequency size (number of subchannels) n needs to be indicated in the SCI, along with a starting frequency location or starting subchannel index for frequency resource indication. But in order to support a different frequency size of the initial transmission and later transmissions that is reserved by the SCI of the initial transmission, the UE can indicate a first number of subchannels m for the initial transmission, and a second number of subchannels n that applies for the second and subsequent transmissions. m and n may not be equal. In other words, the SCI contains two parameters m and n. This approach provides the flexibility of allowing the initial transmission resource to be reserved with a different size than other transmission resources, without needing to indicate a respective size for each subsequent transmission resource, since subsequent transmissions have the same size as each other. This is more efficient from an overhead perspective than transmitting a respective size for each transmission resource.

In some embodiments, the reservation for the initial transmission is smaller than the reservation for the subsequent transmissions. A reason for this is that transmitting an SCI to indicate the resources for the initial transmission and subsequent transmission occurs within the resources for the initial transmission. As such, other UEs which may be monitoring the SCI in order to reserve resources for their own SL transmission that do not overlap with those indicated in the SCI will not have received the SCI in time to avoid overlap with the initial transmission. However, they may be able to avoid overlap with subsequent transmissions. In this sense, subsequent transmissions have a higher degree of protection from interference than the initial transmission, and as such, it is more efficient to dedicate more resources to the subsequent transmissions, recognizing there may be a high probability that the initial transmission will not be successful. A TB can be transmitted using resources that have different sizes, for example, by adjusting the modulation and coding scheme (MSC) employed for each transmission. Note that the SCI transmitted during the initial transmission should still be transmitted in a manner that has high reliability.

Figure 2:
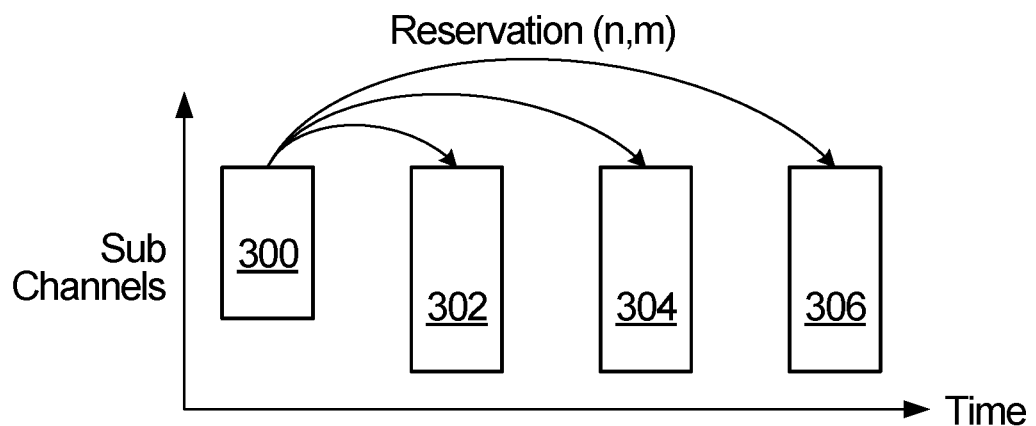
FIG. 2 shows an example of SL transmission resource reservation where a first size of resource is reserved for a first reservation, and a second size of resource is reserved for all remaining reservation.

An example is shown in FIG. 2, which shows time on the horizontal axis, and frequency allocation size, in units of subchannels on the vertical axis. Shown is a resource 200 that has a first size for an initial transmission, and resources 204, 206, 208 that have a second size for three subsequent transmissions. The second size is larger than the first size. The first size can be indicated by parameter n, and the second size by parameter m, both parameters included in the SCI used to reserve the entire set of resources.

Figure 14:
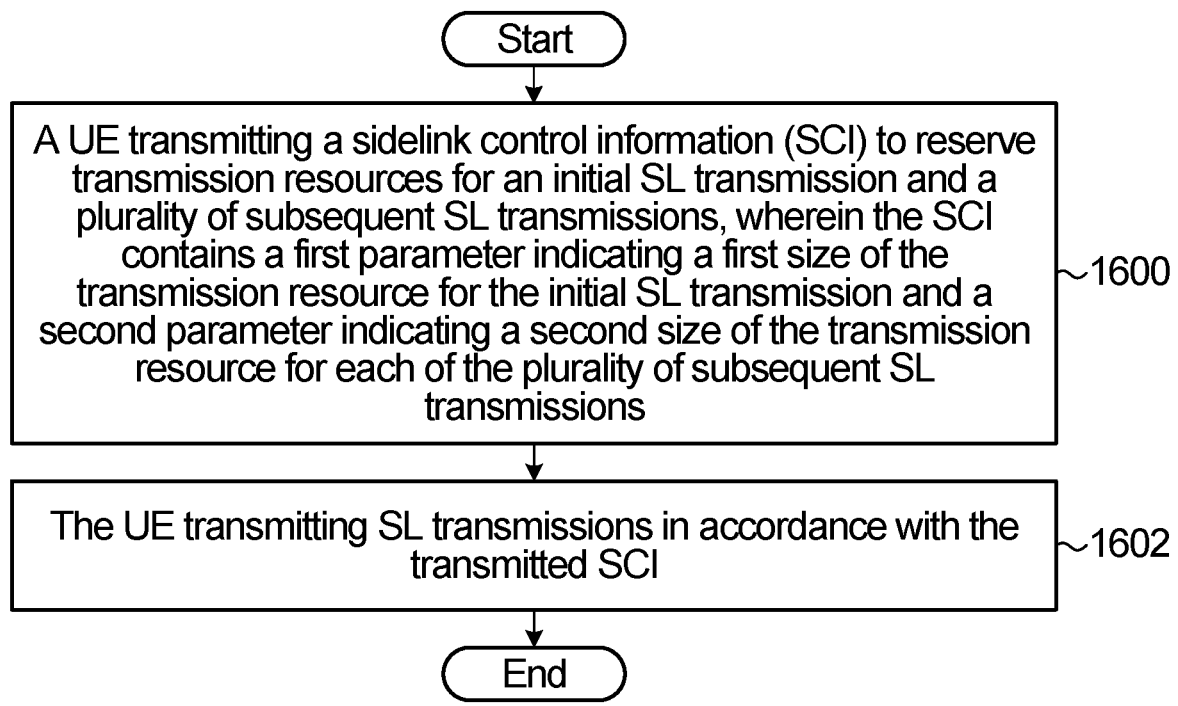

A flowchart of a method based on this approach is depicted in FIG. 14 and includes the following blocks:
1600: a UE transmitting a SCI to reserve transmission resources for an initial SL transmission and a plurality of subsequent SL transmissions. The SCI contains a first parameter indicating a first size of the transmission resource for the initial SL transmission and a second parameter indicating a second size of the transmission resource for each of the plurality of subsequent SL transmissions. The method continues with:
1602: the UE transmitting SL transmissions in accordance with the transmitted SCI. Optionally, the first size is smaller than the second size.

Preemption Window

In Mode 2 SL, after a UE sends a reservation signal which indicates the transmission resources it intends to use for SL transmissions of the same or different TB, the UE may reselect or cancel one or more of the resources in case they overlap with resource(s) of a higher priority reservation from a different UE. This is sometimes called preemption. A UE may trigger reselection of an already reserved resource based on the following conditions both being satisfied:

if the resource overlaps with resource(s) of a higher priority reservation from a different UE; and a SL-RSRP (SL-reference signal receive power) measurement associated with the resource reserved by that different UE is larger than an associated SL-RSRP threshold.

The resource reservation is typically indicated in SCI.

There may be a preemption sensing window, within which UE collects information to decide whether to trigger reselection. During the preemption window, the UE monitors for SCIs transmitted by other UEs, and upon detection of such an SCI, determines what resources are being reserved, and the priority of the reservation. The priority may, for example, be a priority value indicated in SCI that is used to indicate the QoS priority of the data packet that is transmitting or to be transmitted on the reserved resources. UE use the priority value indicated in the reservation SCI as well as the priority value of its own data packet to be transmitted on the select resource to determine a (pre)configured initial RSRP threshold. Finally, the UE determines if the UE's own reserved resource(s) overlaps with the resource being reserved by another UE.

In addition, the UE measures the SL-RSRP associated with the resource reserved by the other UE, and determines whether the measured SL-RSRP is above the SL-RSRP threshold. The SL-RSRP can be measured based on the PSSCH data transmission associated with and transmitted along with the SCI or based on SCI itself.

If both conditions are satisfied, then the UE will trigger reselection of the resource(s) that overlap with the resource being reserved by another UE. More generally, the most immediate effect is the UE refrains from using the resource(s) or reselects a different resource for the overlapped transmission. More generally, one or more preemption conditions can be established that need to be satisfied before the UE refrains from transmitting using an already reserved resource.

In a first embodiment, prior to reserving the set of resources with the SCI in the initial transmission, the UE monitors sidelink resources reserved by other UEs, and avoids reserving these in the SCI. For this reason, it is unnecessary to consider SCI transmissions of other UEs that occur prior to the initial transmission by more than the processing delay in performing sensing and resource selection for the initial transmission and the associated SCI and the preemption windows are defined accordingly. If the initial transmission occurs at time n1, and there is a reservation for a subsequent SL transmission to occur at time ni, then a respective preemption window for the subsequent SL transmission is defined as a time range that includes times later than n1−T0, and times earlier than ni-T1, where T0 is the processing delay in performing resource selection and processing for the initial transmission, and where T1 is the processing delay to perform preemption sensing and reselection processing for the subsequent transmission. In this embodiment, the preemption windows have different durations for the various reserved resources.

Figure 3:
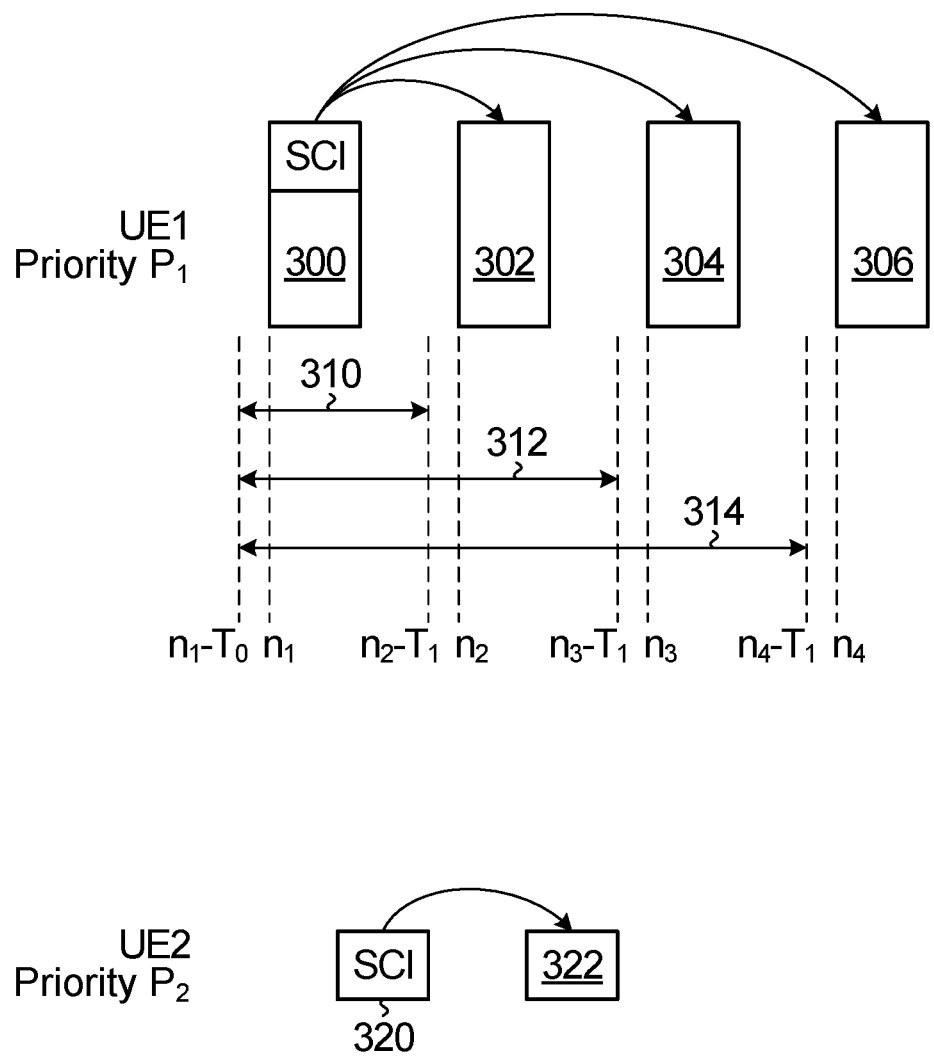
FIG. 3 shows an example of SL transmission resource reservation where a preemption window is defined based on the time of an initial resource, and a time of a current resource.

An example is shown in FIG. 3 which shows a set of resources 300, 302, 304, 306 reserved by an SCI contained in the initial resource 300. The preemption window associated with resource 302 is indicated at 310; The preemption window associated with resource 304 is indicated at 312; The preemption window associated with resource 306 is indicated at 314. Each preemption window extends from a time that precedes the associated resource by the processing delay T1 back to a time earlier than the initial resource 300 by T0. A UE monitoring for SCIs transmitted by other UEs in these preemption windows will be able to determine whether there is an overlap, and determine whether or not to refrain from using the resource.

In a second embodiment, the preemption window is defined as a function of a maximum gap between an initial transmission and a last transmission that the initial transmission reserves. Where a reservation takes place with the initial transmission, this gap represents how far in advance a resource could be reserved.

If there is a reservation for a SL transmission to occur at time ni, then the preemption window is defined as a time range that includes times later than ni-T2, and times earlier than ni-T1, where T2 is the maximum gap between an initial transmission and the last transmission the initial transmission reserves, and T1 is a sensing and resource reselection processing time for the subsequent SL transmission. For this embodiment, the preemption window has the same duration for all of the reserved resources.

Figure 4:
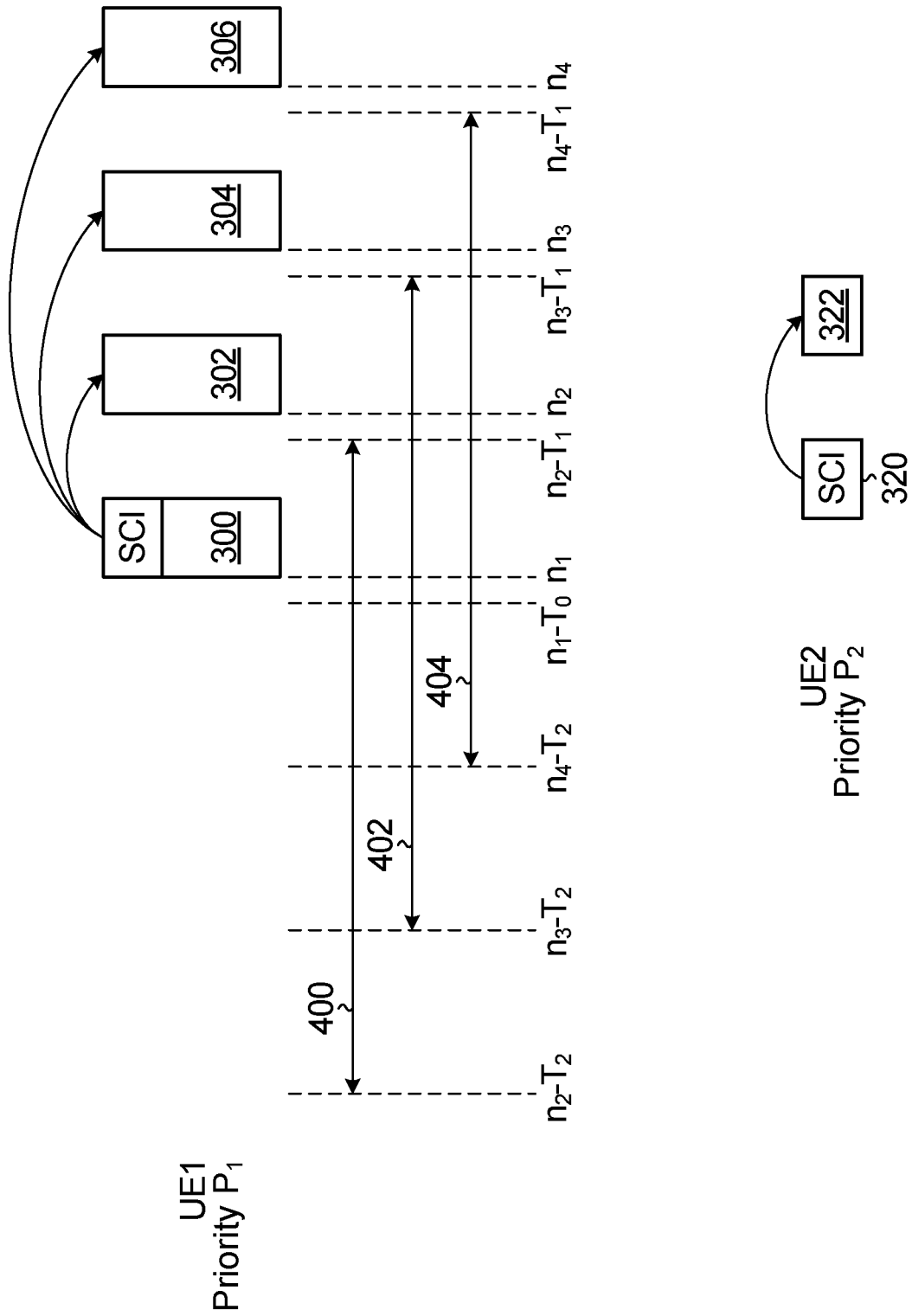
FIG. 4 shows an example of SL transmission resource reservation where a preemption window is defined based a time of a current resource and a maximum duration between a first resource and a last resource reserved in the SL transmission resource reservation.

An example is shown in FIG. 4 which again shows a set of resources 300, 302, 304, 306 reserved by an SCI contained in the initial resource 300. The preemption window associated with resource 302 is indicated at 400; the preemption window associated with resource 304 is indicated at 402; the preemption window associated with resource 306 is indicated at 404. A UE monitoring for SCIs transmitted by other UEs in these preemption windows will be able to determine whether there is an overlap, and determine whether or not to refrain from using the resource.

Figure 15:
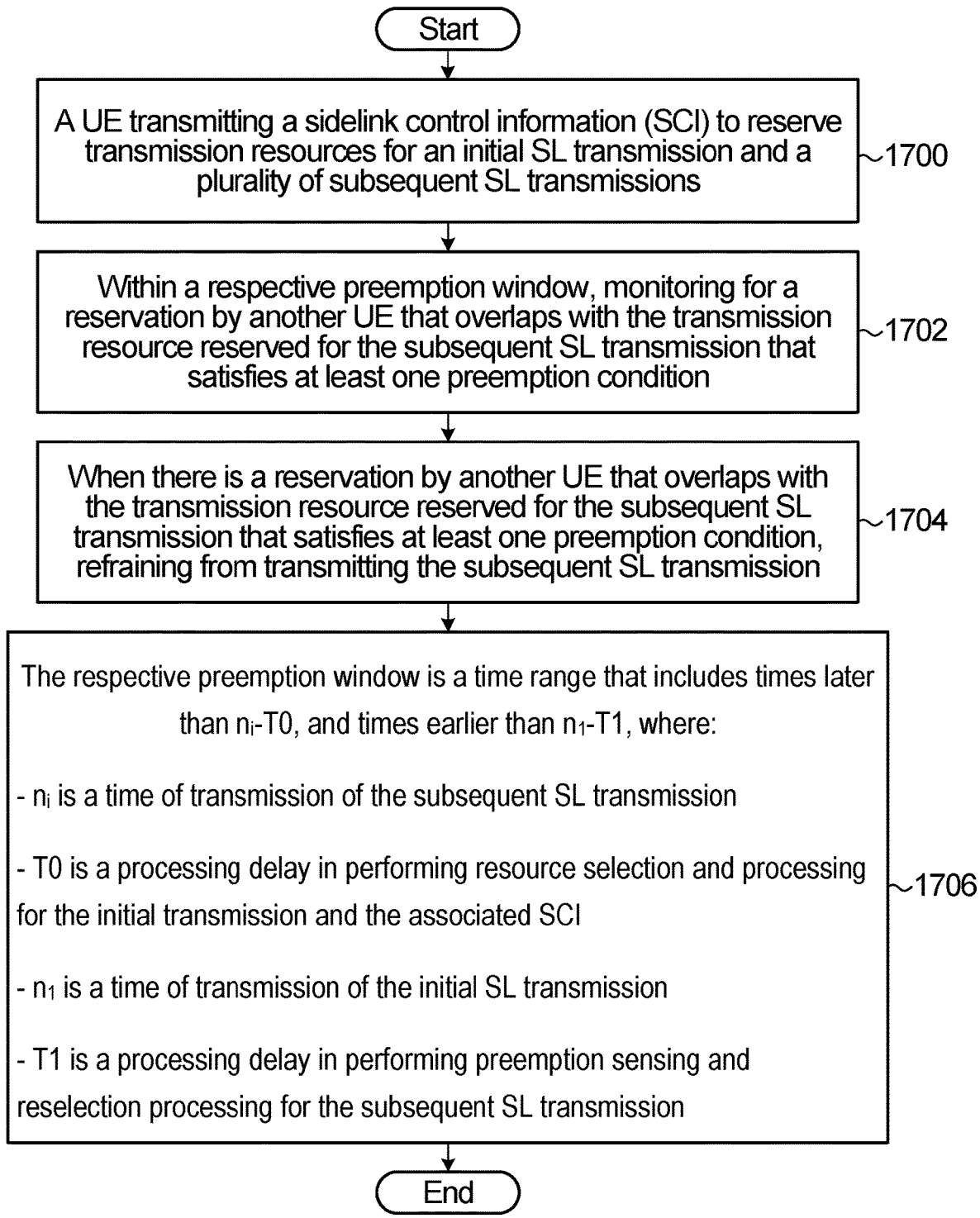

A flowchart of a method based on this approach is depicted in FIG. 15 and includes the following blocks:

1700: a UE transmitting a SCI to reserve transmission resources for an initial SL transmission and a plurality of subsequent SL transmissions;

for each subsequent SL transmission:

1702: within a respective preemption window, monitoring for a reservation by another UE that overlaps with the transmission resource reserved for the subsequent SL transmission that satisfies at least one preemption condition;

1704: when there is a reservation by another UE that overlaps with the transmission resource reserved for the subsequent SL transmission that satisfies at least one preemption condition, refraining from transmitting the subsequent SL transmission.

The preemption window is defined at 1706 as follows:

The respective preemption window is a time range that includes times later than ni-T0, and times earlier than n1-T1, where:

ni is a time of transmission of the subsequent SL transmission;

T0 is a processing delay in performing resource selection and processing for the initial transmission and the associated SCI;

n1 is a time of transmission of the initial SL transmission;

T1 is a processing delay in performing preemption sensing and reselection processing for the subsequent SL transmission.

Figure 16:
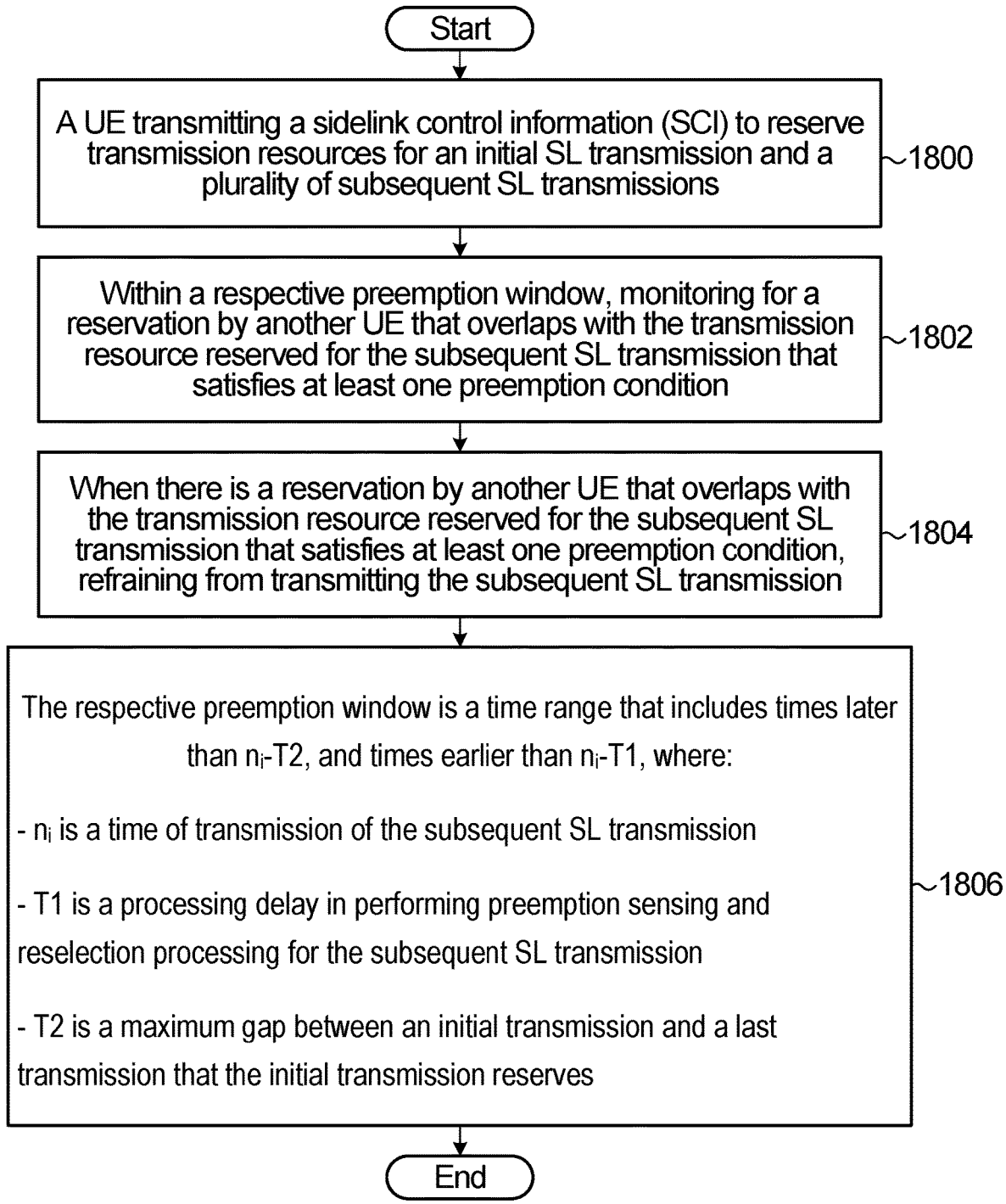

A flowchart of a method based on this approach is depicted in FIG. 16 and includes the following blocks:

1800: a UE transmitting a SCI to reserve transmission resources for an initial SL transmission and a plurality of subsequent SL transmissions;

for each subsequent SL transmission:

1802: within a respective preemption window, monitoring for a reservation by another UE that overlaps with the transmission resource reserved for the subsequent SL transmission that satisfies at least one preemption condition;

1804: when there is a reservation by another UE that overlaps with the transmission resource reserved for the subsequent SL transmission that satisfies at least one preemption condition, refraining from transmitting the subsequent SL transmission.

The preemption window is defined at 1806 as follows:

the respective preemption window is a time range that includes times later than ni-T2, and times earlier than ni-T1, where:

ni is a time of transmission of the subsequent SL transmission;

T1 is a processing delay in performing preemption sensing and reselection processing for the subsequent SL transmission; and T2 is a maximum gap between an initial transmission and a last transmission that the initial transmission reserves.

The maximum number of SL resources reserved by one transmission including current transmission is $N_{MAX}=3$, irrespective of whether HARQ feedback is enabled or disabled, when reservation of a sidelink resource for an initial transmission of a TB at least by an SCI associated with a different TB is disabled. The value of 2 or 3 is (pre)configured per resource pool.

The window size W is maximum time gap between the first SCI transmission and the last transmission resources reserved by the SCI (can be for the same TB or no such constraint). The window size should be (pre)configured in a resource pool within a set of values. The set of value may be $2^n$ times the other values, where n is an integer. This is to be consistent with the numerology. The window size W should be reasonable to balance the delay requirement, reservation performance and overhead of the SCI. In LTE networks, the maximum gap between the two transmissions of the same TB is 15 sub-frames, which can be translated to a window size of 16 ms. In NR, the considered slot is the minimum granularity for SL transmissions and a similar window size value can be considered. However, due to different numerologies, the same number of slots may mean different length in time. For this reason, more than 1 window size may be considered. For instance, if windows size is 16 slots, the total number of choices for time domain is $$\binom{15}{2}+\binom{15}{1}+1=105+15+1=121,$$

which is less than 7 bits. Similarly, if window size is 32, the total number of choices in time domain is 497, which is less than 9 bits. To support potentially different applications and different numerologies, the value between 16 and 32 can be (pre)configured per resource pool.

In frequency domain, if full flexibility is supported (other than same subchannel size), the starting frequency location of each transmission needs to be indicated separately. This may imply significant SCI overhead and the number of bits required for frequency allocation depends on the number of transmissions reserved. An alternative method is to indicate only one frequency location and use frequency offset with respect to this location in order to indicate the frequency location of the remaining reservations. Frequency hopping can be achieved by indicating a hopping offset in the granularity of sub-channels. This way, the size of frequency allocation can also be the same, independently of whether the number of reserved transmissions is 2 or 3.

When reservation of a sidelink resource for an initial transmission of a TB at least by an SCI associated with a different TB is disabled: SCI Provides full flexibility in time domain by indicating a bitmap or index of all potential time-domain resource pattern within the given window size W; frequency domain resources are indicated using subchannel based frequency hopping. The size of the window W is (pre)configured per resource pool within a choice of [16, 32] slots Moreover, NR V2X mode 1 sidelink resource allocation/configuration is provided in embodiments of the present disclosure. NR SL mode-1 scheduled and configured grant (type-1 and type-2) resource allocations and HARQ feedback report to gNB are discussed. LTE Uu being used to control NR sidelink are discussed as well. Details on NR mode 1-Type 1 configured grant configuration by LTE Uu and how eNB configures the resources for NR mode 2 are also provided.

NR SL Mode 1 Resource Allocation—Dynamic Scheduling

Figure 17:
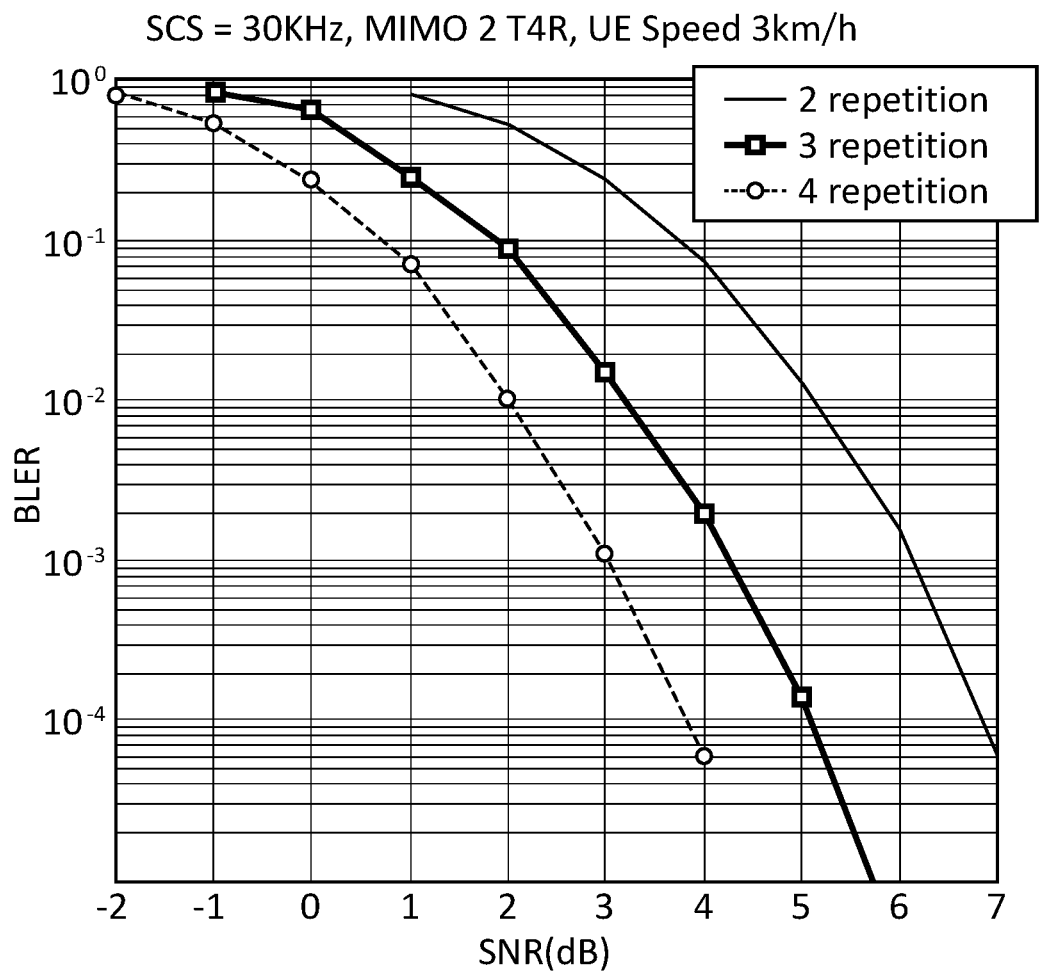
FIG. 17 is a graph illustrating the reliability of data transmission with different numbers of repetitions for a TB size of 2000 bytes and 16QAM.

A dynamic grant may provide resources for one or multiple sidelink transmissions of a single TB. LTE V2X mode 3 supports up to two transmissions scheduled by one DCI, where the gap between the two transmissions is signaled in DCI and SCI. Due to the higher reliability and lower latency requirements of NR V2X, more than two transmissions signaled by DCI may be supported. One of the performance requirements for advanced driving such as emergency trajectory alignment between UEs supporting V2X application is to achieve 10-5 reliability and 3 ms latency for packet sizes of 2000 bytes. In an example, FIG. 17 shows the BLER performance of different numbers of repetitions using a TBS of 2000 bytes and 16QAM using 48RB. FIG. 17 further shows that in order to achieve the 10-5 reliability requirement at SNR of 5 dB, 4 TB repetitions are needed. Considering that in mode 2 SCI signaling can be designed to allow to indicate 1 or 2 or 3 resources at least of the same number of sub-channels with full flexibility in time and frequency position in a window W of a resource pool, one DCI/SCI may be able to signal at least 3 (re)transmissions of a single TB with full flexibility in time and frequency domains. Similarly, it can be possible to signal 4 (re)transmissions of a single TB in the same DCI/SCI with either full or reduced flexibility in both time and frequency domains. In an example, to meet latency and reliability requirements, NR V2X mode 1 dynamic grant may support at least 4 transmissions of a single TB.

Indicating the time frequency resources for each repetition separately can be very costly in terms of signaling overhead. In order to efficiently schedule at least 4 transmissions of a single TB in one DCI/SCI, a time-frequency resource index scheduling all (re)-transmissions of a single TB may be included in the DCI/SCI. This can be achieved by a predefined or (pre)configured TFRP pool, which provides all the potential choices of time frequency resource combinations of all transmissions of a TB. It is also possible to indicate time and frequency resources separately. In this case, time domain repetition pattern can be indicated using a bitmap or an index of all potential combinations of time domain patterns within a given window size. Frequency domain repetition pattern of all transmissions can be further simplified by indicating a frequency hopping offset, which can be in the granularity of sub-channels. The frequency hopping offset can reduce DCI/SCI overhead while keeping the number of bits for the frequency domain indication independent on the number of resources indicated in DCI/SCI.

DCI/SCI may include a time-frequency index indicating resources for all repetitions of a single TB. Time domain repetition pattern can be indicated using a bitmap or an index of all potential time domain patterns within a given time window. Frequency domain repetition pattern can be indicated using a sub-channel based frequency pattern.

In mode 1, whether HARQ ACK/NACK feedback from Rx UE to Tx UE is supported is implicitly indicated by whether the resource for reporting sidelink HARQ ACK/NACK from Tx UE to gNB is allocated in the DCI.

For HARQ based retransmission, when both mode 1 and mode 2 resource allocation are configured simultaneously for a UE, a mapping relationship of HARQ process IDs is needed between gNB and Tx UE. Since the Tx UE's HARQ buffer is shared by both mode 1 and mode 2, the HARQ process ID in DCI from gNB has to be mapped correcting into SCI by the Tx UE.

For HARQ based (re-)transmission, when both mode 1 and mode 2 resource allocation are configured simultaneously for a UE, HARQ process usage needs to have a common understanding between gNB and Tx UE for each resource allocation mode.

Considering that UE-specific BWP is configured for sidelink communication, different resource pools within the SL BWP for a Tx UE can target different Rx UEs. If only one Tx resource pool is configured by RRC signaling, RRC reconfiguration is needed to support flexible communication between Tx UE and Rx UE. In order to avoid the transmission delay caused by RRC reconfiguration, flexible Tx resource pool selection within a SL BWP may be supported. A possible scheme is that multiple Tx resource pools are configured by RRC signaling, and one Tx resource pool is indicated in DCI. For example, if four Tx resource pools are configured in the SL BWP for a UE, Tx resource pool ID field with 2 bits can be designed in DCI to indicate the Tx resource pool for sidelink transmission.

In an example, tx resource pool ID is indicated in DCI to support flexible Tx resource pool selection within a SL BWP.

For the time interval between receiving a dynamic grant and transmitting PSCCH and PSSCH, the following procedure is used in LTE-V2X. If the UE receives in subframe n DCI format 5A with the CRC scrambled by the SL-V-RNTI, one transmission of PSCCH is in the PSCCH resource $L_{init}$ in the first subframe that is included in $(t_0^{SL}, t_1^{SL}, \ldots, t_{Tmax}^{SL})$ and that starts not earlier than $T_{DL}-N_{TA}/2 \times T_S+(4+m) \times 10^{31}$ $^3$. The set of subframes that may belong to a PSSCH resource pool for sidelink transmission mode 3 or 4 is denoted by $(t_0^{SL}, t_1^{SL}, \ldots, t_{Tmax}^{SL})$ where $0 \leq t_i^{SL} < 10240$. The subframe index is relative to subframe #0 of the radio frame corresponding to SFN 0 of the serving cell or DFN 0. The set includes all the subframes except for, subframes in which SLSS resource is configured, downlink subframes and special subframes if the sidelink transmission occurs in a TDD cell reserved subframes. The subframes are arranged in increasing order of subframe index. The value m is indicated by 'Subframe offset' field in the corresponding DCI format 5A according to Table 1. Table 1 provides information regarding mapping of DCI format 5A offset field to indicated value m. If this field is present and m=0 otherwise.

TABLE 1

Mapping of DCI format 5A offset field to indicated value m

| SL index field in DCI format 5A | Indicated value m |
|---|---|
| 00 | 0 |
| 01 | 1 |
| 10 | 2 |
| 11 | 3 |

For NR-V2X, since the flexible sub-carrier spacing is supported, the set of slots for PSCCH resource pool would be according to a definition such as the set of slots $(t_0^{SL}, t_1^{SL}, \ldots, t_{Tmax}^{SL})$ that may belong to a PSSCH resource pool for sidelink transmission mode 1 or 2 wherein $0 < t_i^{SL} < 10240 \times N_{slot}$, and $N_{slot}$ means the number of slots per millisecond under different SCS. The set includes all the slots except for downlink slots if the sidelink transmission occurs in a TDD cell and reserved slots. The remaining slots are arranged in increasing order of slot index.

The duration $T_{DL}-N_{TA}/2 \times T_S+(4+m) \times 10^{31}$ $^3$ in LTE-V2X contains TA adjustment, decoding DCI and preparing time at Tx UE before transmission. The parameter '4' in the equation is determined due the UE processing capability in LTE-V2X, however, the configuration can be more flexible for NR. Considering the signaling overhead, a compact interval is needed in DCI to indicate configuration '4+m'. Therefore, considering the flexible numerology and UE capability in NR-V2X, the duration $T_{DL}-T_A/2 \times T_C+(K \times 10^{-3})/2^\mu$ may be supported, where $T_C=1/(\Delta f_{max} \cdot N_f)$ denotes the time unit in NR, µ is subcarrier spacing index, and K denotes the processing time.

In one example, the duration between receiving a dynamic grant and transmitting PSCCH and PSSCH may consider the flexible numerology and UE capability in NR-V2X.

A dynamic grant may provide resources for one or multiple sidelink transmissions of a single TB. In case of multiple sidelink transmissions, it is natural to allow the transmission to occur in non-consecutive slots to mitigate the half-duplex constraint. In this case, each transmission may be associated with its own PSFCH channel for feedback transmission if enabled. Similar to Mode 2 operation, if an ACK is received before the last transmission, UE can terminate the transmission early and not use the remaining resource for the retransmission, which can be saved for scheduling other UEs.

When dynamic grant provides multiple sidelink transmission resources for a single TB and HARQ feedback is enabled, early termination based on HARQ-ACK may be supported.

When NR Uu schedules NR SL mode 1, both type 1 and type 2 configured grants are supported for NR SL. Therefore, both configured grant type 1 and type 2 are supported for NR V2X mode 1 SL resource allocation. Importantly, the above agreement stipulates that both type 1 and type 2 configured grants, as specified in NR Uu, are supported for NR sidelink. This is so because configured grant type 1 and type 2 terminology has been recently introduced in NR Release 15 and did not exist in either LTE or LTE V2X. This may imply that the main principles/features of NR Uu configured grant type 1 and type 2 are to be applied to NR SL. At least for type 1, the main principle of NR configured grant is that the Tx UE is configured for data transmission through semi-static RRC signaling and that no resources for additional dynamic scheduling of data transmissions are included in the configured grant. This fundamental principle of CG type 1 resource allocation may be preserved when applying type 1 CG to NR SL, otherwise the previous agreement would not be respected. Moreover, in Uu, a CG by the gNB provides resources for transmission of PUSCH. Similarly, a configured grant for NR SL by the gNB shall provide resources for transmission of PSSCH.

A configured grant for NR SL by the gNB provides resources exclusively for data transmission by the UE on PSSCH wherein the assumption that each transmission in a resource provided by a configured grant contains PSCCH and PSSCH may not be confirmed.

For MCS selection, both dynamic and configured grant, if a single MCS is configured, the MCS is used by the UE while if no MCS or more than 1 MCSs are configured, UE autonomously selects the MCS from the full range of values or the configured values. For configured grant Type 1, MCS is likely to be conservative since there is a need to maintain high reliability in order to meet the latency/reliability requirements of advanced V2X use cases. Besides, on the SL, interference rather than accurate adaptation to channel variations constitutes the main mitigating factor. Thus a semi-static selection of MCS by the Tx UE is enough, especially for the case of CG Type 1 where no SCI is needed.

Therefore, for CG Type 1, Tx UE can select the MCS and send the selected MCS to Rx UE via PC5-RRC in case of unicast and group cast and periodic SCI in case of broadcast.

In Type 1 CG, if no MCS or more than one MCS is configured, Tx UE selects a single MCS among the full range of MCS values or the configured MCS values and informs the Rx UE the selected MCS via PC5-RRC (for unicast and groupcast) or periodic SCI (for broadcast).

TB repetition not triggered by feedback, as well as frequency hopping are defined for NR Uu CG. Therefore, configured grant resource configurations may include at least time-frequency resource related information. For NR UL CG, the repetition is done in slots which are logically consecutive, that is a transmission is dropped if it is conflict with the UL/DL transmission direction configurations. Since in shared carriers the Uu transmissions may affect the available REs per slot, and the sidelink slot format indication may in general be in non-consecutive slots (whether flexible and/or uplink), this Uu constraint cannot apply to the sidelink. In sidelink, this has the added benefit of helping resolve persistent collisions and improving the reliability.

For NR SL mode 1, repetition or blind retransmission in non-consecutive slots is supported. In order for the gNB to optimize the mode 1 configured grant resource allocation while taking into consideration the sidelink half-duplex constraint, UE-specific TFRPs can be configured or indicated to the UEs for configured grant type 1 and type 2, respectively. TFRPs are configured via RRC for type 1 configured grant and indicated in DCI for configured grant type 2.

Latency, reliability and resource efficiency also need to be taken into account for the time-frequency resource pattern (TFRP) configuration. Each TB repetition can use the redundancy version according to (pre)configuration. As all transmission parameters including scheduling information for configured grant type 1 resource allocation, and some information such as periodicity for configured grant type 2 resource allocation, are signaled to the Tx UE via semi-static RRC signaling, there is the opportunity to configure the Rx UE also via higher layer signaling instead of repeatedly indicating the same information in SCI for each TB, thereby saving non-negligible signaling overhead. This is relevant because SCI can represent more than 50% overhead for certain vehicle platooning scenarios with relatively small packet sizes (50 bytes) including cooperative driving information exchange between a group of UEs supporting V2X application and reporting needed for platooning between UEs supporting V2X application and between a UE supporting V2X application and RSU.

In addition, for some advanced driving applications, such as emergency trajectory alignment between UEs supporting V2X application, it is required to deliver relatively large packet sizes (For example 2000 bytes) within 3 ms latency and with very high reliability of 99.999%. For other applications such as sensor information sharing between UEs supporting V2X applications, the same stringent latency and reliability requirements are expected to be met to deliver SL data rates as high as 50 Mbps. The primary target of configured grant schemes is to achieve high reliability within a small latency budget. Thus, by saving the SCI overhead more repetitions or retransmissions can be allowed for configured grant transmissions compared with LTE V2X SPS solution (which uses SCI for each TB) when UE processing time latencies are taken into account. More repetitions or retransmissions within the small latency budget automatically translate into higher reliability. Also, for packet sizes of 2000 bytes and 50 Mbps data rates, too many radio resources would be wasted on SCI that would otherwise be used for data transmission in order to achieve the stringent latency and reliability requirements for the above referenced applications.

Figure 18:
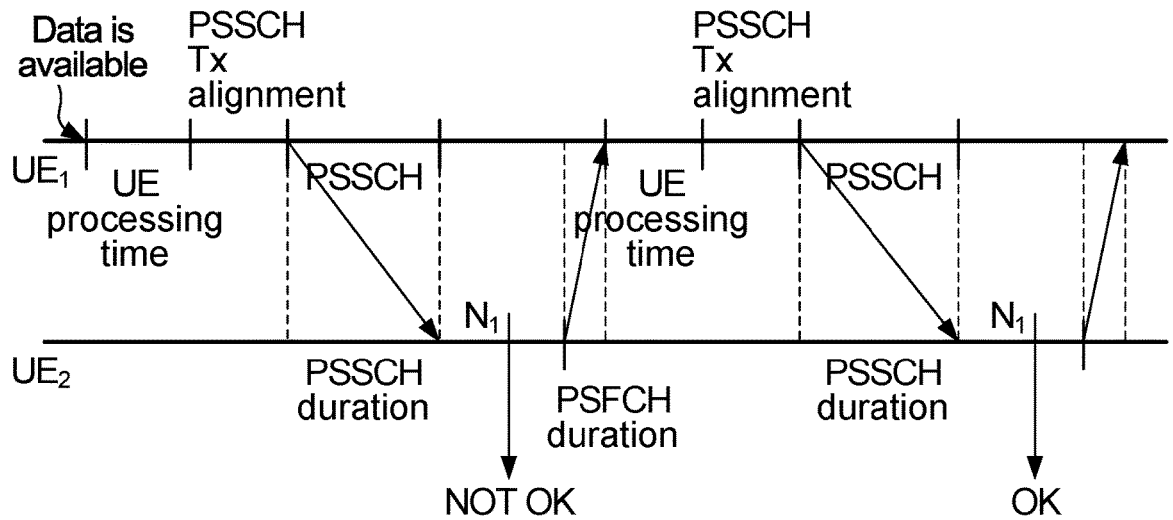
FIG. 18 illustrates a CG transmission scheme with stand-alone PSSCH.
Figure 19:
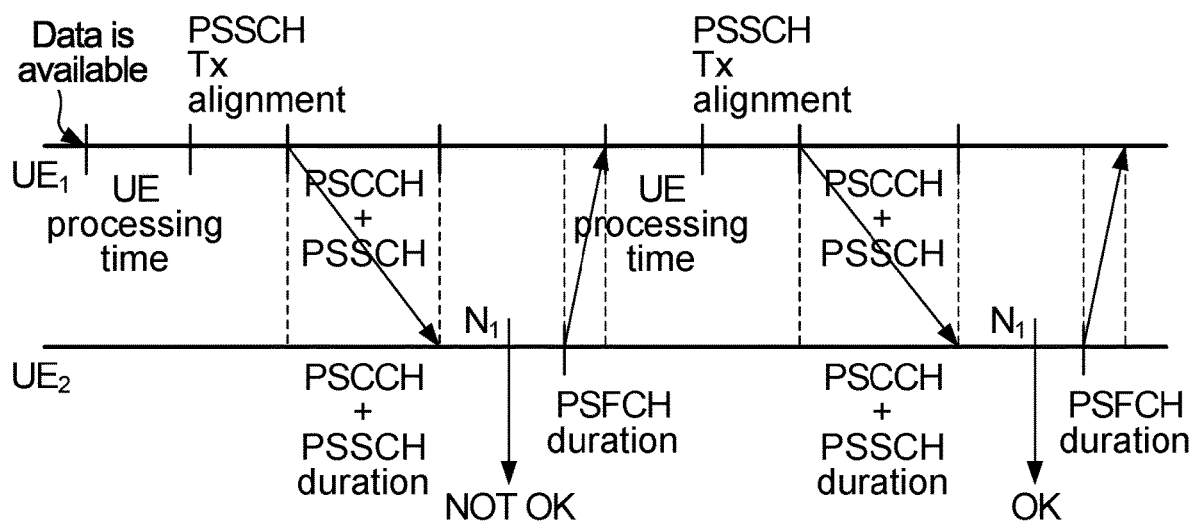
FIG. 19 illustrates a CG transmission scheme with associated SCI for each PSSCH.

As an example, two CG transmission schemes namely scheme 1 (with standalone PSSCH) and scheme 2 (with associated SCI for each PSSCH) are respectively illustrated in FIG. 18 and FIG. 19. These two schemes are compared in terms of meeting the requirements for emergency trajectory alignment between UEs supporting V2X application, i.e. TB size of 2000 bytes, 3 ms latency and 99.999% reliability. A 30 kHz SCS and 48 RBs (~20 MHz) bandwidth are used by both schemes. In the case of slot based transmission, some symbols of a slot are not used for control or data transmission (i.e. 1 symbol for automatic gain control (AGC), 2 DMRS symbols and 1 symbol for Tx/Rx switch). In the case of Scheme 2, it is assumed that PSCCH and PSSCH are TDMed, and that SCI occupies two OFDM symbols of a slot. Accordingly, link level simulations show that fewer repetitions are needed to achieve 10-5 reliability for PSSCH for Scheme 1 than for Scheme 2. Thus, Scheme 1 is able to meet the 3 ms latency requirement with 4 blind retransmissions, whereas Scheme 2, which requires at least 5 repetitions to achieve the same level of reliability, is not.

In order to meet the latency/reliability requirements of advanced NR V2X use cases, at least for SL configured grant type 1, no PSCCH is associated with PSSCH.

In order to configure Rx UEs for the reception of standalone PSSCH in the case of mode 1 CG, both RRC signaling conveyed from gNB through Uu interface or from Tx UE through PC5 interface can be considered, the latter option having the advantage of allowing to accommodate Rx UEs that are outside of gNB coverage. For Rx UEs which are under gNB coverage, either options or both can be supported, however, for the sake of unified design, configuring Rx UE through PC5 RRC is preferred.

PC5 RRC can be used to configure Rx UE(s) for unicast and groupcast scenarios. However, it is currently not an option for configuring Rx UEs in the case of broadcast scenario, as broadcast PC5 RRC is not supported in release 16. In this case, it is proposed that Tx UE sends a periodic SCI to configure Rx UEs for the broadcast scenario. Note that such periodic SCI need not be associated with any PSSCH. The configuration SCI needs to be periodic rather than being a one-shot SCI in order to allow for Rx UE(s) configuration update in situations where the Rx UEs within the Tx UE broadcast coverage change, as likely to be the case in a vehicular environment.

For SL configured grant, Rx UE(s) are configured through PC5-RRC signaling for unicast and groupcast scenarios. A periodic SCI is used to configure Rx UEs in the case of broadcast scenario.

Configured grant (type 1, type 2) provides a set of resources in a periodic manner for multiple sidelink transmissions. The set of resources correspond to a TFRP and which can be configured in a periodic manner. Therefore, the resource configuration may include the periodicity and starting time offset of the TFRP, and the size and locations of the time-frequency resources. Since repetition or blind retransmission has been agreed for NR V2X SL, a RV sequence to be used for repetitions may also be configured to the UE for SL CG transmissions. In addition, similar to NR UL CG, DMRS configuration and MCS may also configured to the UE for NR SL configured grant.

A mode-1 UE is allowed to continue using the configured SL grant type 1 when beam failure or physical layer problem in NR Uu occur. The configuration for SL configured grant Type 1 needs to include a threshold as a form of indication to UEs on how long the configured grant can be used in case of NR Uu interruption.

For SL configured grant Type 1 in Mode 1, the configuration includes at least an offset, periodicity, length, RV sequence, indication of time-frequency resources, DMRS configuration, retransmission configuration, MCS, and a threshold defining the validity of the grant in case of NR Uu interruption.

Multiple active sidelink configured grants may be supported. Multiple active configured grants are supported per SL BWP per cell, rather than for example having to be split among multiple cells. Furthermore, given that a resource pool (RP) may be used for dynamic scheduling, it can be assumed that CG resources are also configured within RPs, where RPs are configured within the SL BWP. As multiple active configured grants can be used to support diverse packet sizes, QoS requirements, etc., multiple CGs per resource pool may be supported. SL configured grant is configured within a resource pool. Multiple configured grant configurations per resource pool is supported.

In NR UL configured grant, multiple HARQ processes are supported and HARQ process ID is derived from the physical resources. A similar mechanism for determining HARQ process ID can be adopted for SL configured grant. The RV can be determined based on the RV sequence for repetitions that is configured to the UE. In this case, an associated SCI to indicate the HARQ process ID and RV is not needed for SL CG transmissions. Similar to NR UL configured grant, HARQ process ID of SL configured grant may be determined as a function of the physical resources. If the Rx UE successfully receives a SL CG transmission (either the initial transmission or one of the retransmissions) of the TB before all the retransmissions have taken place, it would be efficient from a resource utilization perspective to inform the Tx UE so that retransmissions can be terminated.

Unlike NR UL configured grant transmission, the repetition resources for SL CG may not take place in consecutive slots, due to HD issue. Given the potential time gap between different repetitions of the same TB, there is a strong motivation for the Tx UE to terminate the blind retransmission early in the event of receiving an ACK. Therefore, Rx UE may send an ACK to the Tx UE if it successfully decodes the TB before the last blind retransmission. In cases where all the blind retransmissions are needed, the Rx UE may send ACK/NACK after the last of them, as usual. For groupcast transmission, the blind retransmission may be terminated if ACKs from all Rx UEs in the group are received by Tx UE.

For a UE configured/scheduled with repetitions of a TB, early termination based on ACK received from Rx UE may be supported. If NACK is received after the last repetition, then Tx UE can retransmit the same TB using the CG resources. Configured grant (type 1, type 2) may provide a set of resources in a periodic manner for multiple sidelink transmissions. UE decides which TB to transmit in each of the occasions indicated by a given configured grant. For a configured grant in Mode 1 when using SL HARQ feedback there is only one HARQ-ACK bit for the configured grant; or there is one PUCCH transmission occasion after the last resource in the set of resources provided by a configured grant. Note that for dynamic grant, the multiple resources scheduled by a DCI is for multiple transmissions of a single TB. As only 1 PUCCH occasion is available for transmissions within a periodicity of configured grant, if multiple TBs are transmitted within one period of the configured grant, it is not clear to which TB the PUCCH may correspond. Since the PUCCH resource is configured to report sidelink HARQ feedback, which means if the Tx UE receives a NACK for the TB, it can report to the gNB such that gNB may schedule a retransmission for the TB. If UE receives multiple NACKs for multiple TBs in a periodicity of a configured grant, then it is not clear which TB the PUCCH is associated with. Even if assign a specific TB (e.g. the last TB of the period) for PUCCH reporting, there is no mechanism to let gNB know there are NACKs received for other TBs transmitted in the period. Therefore, there may be some constraints on how UE can decide which TB to transmit within a periodicity of configured grant to make the current agreements work. If UE only transmits one TB within a periodicity, which is the case in Uu UL CG, then UE can report the HARQ feedback of that TB in the associated PUCCH resource. On the other hand, if UE transmits multiple TBs within a periodicity, but all the TBs transmitted other than the last one have been acknowledged, then UE can just use the PUCCH resource to report NACK for the last TB of the transmissions within the periodicity.

Configured grant provides K resources within one periodicity, there are two options that clarify how "UE decides which TB to transmit in each of the occasions indicated by a given configured grant". In the first option, UE can only transmit one TB on transmission occasions within one period, but UE can choose to retransmit the same TB on transmission occasions in a different period. In the second option, UE can choose to transmit a new TB on transmission occasions in one period only if it receives ACKs on all previous TBs transmitted within the period.

Two different UE-specific SL RNTIs are introduced for Mode-1 scheduling: One for CRC scrambling in DCI for a dynamic grant and the other one for CRC scrambling in DCI for a configured grant type-2. However, considering that PUCCH resource for reporting SL HARQ feedback may be supported in CG, it is reasonable to assume UE reports NACK so that it can be scheduled by the gNB for retransmission. Similar to the NR Uu case, retransmission scheduling by gNB for SL CG transmission can be supported after reporting the HARQ feedback to gNB. In order to differentiate the retransmission for dynamic grant and configured grant for SL, the SL RNTI for CG (e.g. SL CS-RNTI) can also be used for retransmission scheduling. For Type 2 CG, UE differentiates whether the DCI addressed to SL CS-RNTI is an activation/deactivation DCI or a retransmission DCI through NDI value. In addition, similarly to NR Uu, Type 1 and Type 2 CG can share the same RNTI.

A UE specific SL CS-RNTI that is different than the RNTI used for SL dynamic grant is configured in RRC for CG in SL Mode 1. The same SL CS-RNTI is used for both Type 1 and Type 2 CG. For Type 1 CG, SL CS-RNTI is used for CRC scrambling of retransmission DCI, and for Type 2 CG, SL CS-RNTI is used for CRC scrambling of activation, deactivation and retransmission DCI.

When UE receive a retransmission grant for CG transmission from the gNB, UE needs to be able to identify which TB the retransmission grant is targeting. This can be done by using the HARQ process ID provided in the retransmission DCI, where UE can assume the retransmission is for the last TB of the period that is mapped to the HARQ process ID indicated in DCI. However, it is possible the UE may choose to use a different HARQ process ID in SCI as long as the same HARQ process ID is used for the same TB. When UE receives a retransmission grant addressed by SL CS-RNTI, UE assumes the retransmission grant is for the TB associated with the last CG transmission of the period that is mapped to the HARQ process ID indicated in the DCI.

As shown in Table 2, in LTE-V2X, DCI format 5A is used for scheduling PSSCH and PSCCH transmission.

TABLE 2

LTE DCI format 5A contents.

| Field | Size |
|---|---|
| Carrier indicator | 3 bits |
| Lowest index of the subchannel allocation to the initial transmission | $\lceil \log_2(N_{subchannel}^{SL}) \rceil$ < 5 bits (for up to 20 sub-channels) |
| SCI format 1 field - Frequency resource location of initial transmission and retransmission | $\lceil \log_2(N_{subchannel}^{SL}(N_{subchannel}^{SL} + 1)/2) \rceil$ < 8 bits (for up to 20 sub-channels) |
| SCI format 1 field - Time gap between initial transmission and retransmission | 4 bits |
| SL index (for TDD configuration 0-6) | 2 bits |
| SL SPS configuration index (for SPS only) | 3 bits |
| Activation/release indication (for SPS only) | 1 bit |

In NR-Uu, two formats DCI 0-0 and DCI 0-1 as shown in Table 3 are defined for scheduling of PUSCH.

TABLE 3

NR DCI contents for formats 0-0 and 0-1.

| Field | | Format 0-0 | Format 0-1 |
|---|---|---|---|
| Identifier | | 1 bit | 1 bit |
| Resource information | CFI | — | 0 or 3 bits |
| | UL/SUL | 0 or 1 bit | 0 or 1 bit |
| | BWP indicator | — | 0-2 bits |
| | Freq.-domain allocation | Variable (only type 1) | variable |
| | Time-domain allocation | 0-4 bits | 0-4 bits |
| | Frequency hopping | 0 or 1 bit | 0 or 1 bit |
| TB-related | MCS | 5 bits | 5 bits |
| | NDI | 1 bit | 1 bit |
| | RV | 2 bis | 2 bis |
| HARQ-related | Process number | 4 bits | 4 bits |
| | DAI | — | 1-4 bits |
| | CBGTI | — | 0, 2, 4, or 6 bits |
| Multi-antenna related | DMRS sequence initialization | — | 1 bit |
| | Antenna ports | — | 2-5 bits |
| | SRI | — | Variable |
| | Precoding information | — | 0-6 bits |
| | PTRS-DMRS assoc. | — | 0 or 2 bits |
| | SRS request | — | 2 bits |
| | CSI request | — | 0-6 bits |
| Power control | PUSCH power control | 2 bits | 2 bits |
| | Beta offset | — | 0 or 2 bits |

In NR-V2X, the sidelink scheduling DCI may need to have additional fields compared to LTE-V2X due to the new features such as multiple transmission of a single TB or sidelink HARQ reporting from Tx UE to gNB. Since neither the current NR-Uu DCI formats nor LTE DCI format 5A can provide complete information for scheduling NR-V2X, a new DCI format is needed to convey dynamic grants and configured grant type-2. The dynamic grant and configured grant type-2 DCIs are conveniently distinguished by different RNTIs. The detailed DCI contents are resource pool indicator (indicates a dedicated Tx resource pool); resource indicator (indicates the time and frequency resource); PUCCH resource for reporting sidelink HARQ ACK/NACK feedback that is PSFCH-to-HARQ feedback timing indicator (indicates the time interval between receiving the HARQ feedback from Rx UE and reporting the sidelink HARQ feedback to gNB) and PUCCH-SL resource indicator (indicates sidelink HARQ feedback frequency resource on PUCCH); HARQ related information (HARQ process number, NDI, RV, or DAI); SL CG configuration index (for configured-grant type 2 only); and Activation/release indication (for configured-grant type 2 only). A new DCI format is needed to convey dynamic grants and configured grant type-2.

In order to ensure low interference in NR SL transmission mode 1, gNB can exploit the knowledge of UE geographic location (e.g., obtained via GPS and reported periodically by the UE to the network). Reuse of a time-frequency resource is then possible whenever UEs are sufficiently far apart. This is equivalent to imposing a minimum reuse distance. The disadvantage of this location-based reuse strategy is that it does not take into account the actual physical propagation of waves (i.e., the wireless channel). For example, whereas two vehicles on the highway may need to be a few miles away to transmit on the same resource with negligible interference, the situation may be very different in an urban environment where buildings shield most interference between nearby parallel streets. Finally, Rel-14 LTE sidelink focuses on broadcast traffic. However, Rel-16 NR sidelink needs to support unicast, multicast/groupcast, and broadcast. While receiver feedback in case of broadcast is not a feasible solution due to potentially large number of receivers, for unicast and broadcast it might provide benefits when it comes to resource selection.

To support Mode 1 resource allocation, a UE (e.g., when requesting resources) may report measurements such as S-RSSI observed in a given resource or set of resources. Alternatively, the UE may report a set of best or preferred resources. Based on this information, the gNB sidelink scheduler can schedule sidelink transmissions in an interference-aware fashion. UEs may report measurements or information derived from such measurements (e.g., preferred resources) to support sidelink scheduler.

Physical sidelink resources can be used more efficiently if interference between nearby UEs can be mitigated. One way to avoid sidelink interference is by using multi-antenna transmission and/or reception techniques at the UEs, when corresponding sidelink measurements can be done by the UEs. In order that the UEs" capability to mitigate sidelink interference can be considered by the gNB scheduler, this information needs to be reported by the UEs to the gNB. Then, the sidelink scheduler can schedule interference-aware sidelink transmissions potentially on the same resources, thus increasing resource reuse.

Figure 20:
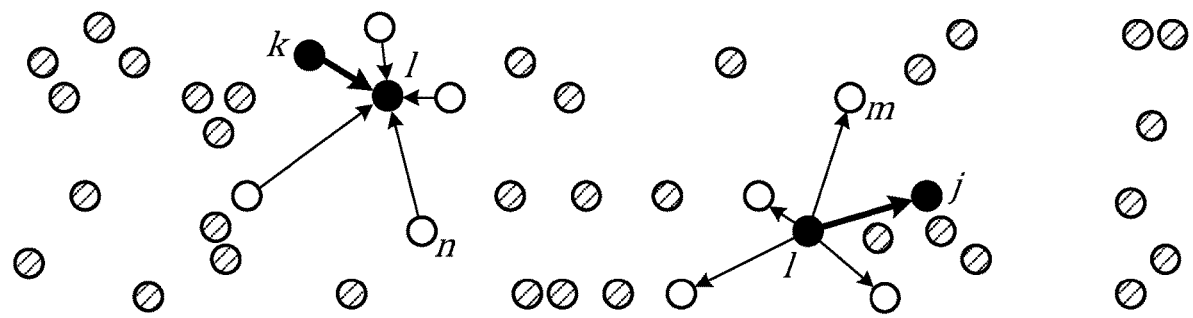
FIG. 20 shows interference suppression by receiving and transmit UE.

As shown in FIG. 20, when UE i requests a sidelink resource for transmission to UE j, it may report to the gNB a list of one or more nearby UEs m toward which it can limit interference e.g. under a certain threshold when transmitting to UE j on the particular resource. Similarly, on the receive side, UE 1 may report a list including one or more nearby UEs n from which it can suppress interference when receiving from UE k on the particular resource. UEs report to the gNB a list of nearby UEs to/from which they can mitigate sidelink interference on particular resources, in order to assist gNB scheduling and resource allocation.

In NR Uu, for the dynamic scheduling of PDSCH, a UE is required to provide HARQ-ACK information in the slot n+k, when the UE finishes PDSCH reception in slot n. The value k, namely the slot offset between PDSCH reception and PUCCH transmission, is provided in high layer parameter dl-DataToUL-ACK and indicated by the PDSCH-to-HARQ-timing-indicator field in DL grant. Moreover, if the same procedure and signaling are reused for sidelink, the k value, i.e., the slot offset, may start from which transmission to PUCCH.

Figure 21:
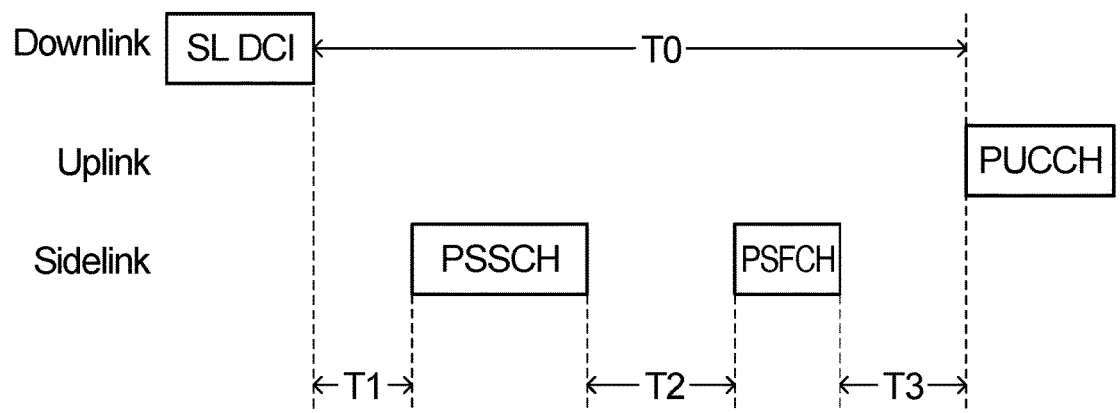
FIG. 21 is a graph illustrating UE's reporting of SL HARQ-ACK information to gNB.

As shown in FIG. 21, option 1 and option 2 can be illustrated as $T_0$ and $T_3$ respectively. Option 1 is simple but very time consuming. It includes the slot offset between DCI and PSSCH/PSCCH, time gap between PSSCH and PSFCH, the Tx UE preparation time to transmit PUCCH and even the length of PSSCH and PSFCH. When the gNB indicate the k using option 1, a large time range is needed to cover which resulting in consuming large number of bits in the DCI. In option 2, the gap $T_1$ between DCI scheduling sidelink transmission and the PSSCH is indicated by DCI, PSFCH feedback timing $T_2$ is derived base on sidelinke k configuration which (pre-)configured per resource pool. Therefore, gNB only needs to indicate a timing from the PSFCH slot, both UE and gNB would figure out the slot to transmit and receive the PUCCH with SL HARQ-ACK. Furthermore, the time range is much smaller than the one in option 1, and much less bits are needed as well.

In case DCI schedules multiple repetitions of a single TB, then each repetition may have its own PSFCH resource. In order to save PUCCH resources for SL feedback reporting to gNB, only one PUCCH resource can be indicated for the multiple repetitions. Then the slot offset indicated in the DCI corresponds to the slot offset between PSFCH of the last repetition and PUCCH.

For configured grant, RRC is used to configure PUCCH offset/resource and format in UL in CG Type 1. Additionally, one PUCCH resource is configured per periodicity. Therefore, the slot offset between the last PSFCH resource corresponds to the last transmission occasion within a periodicity and PUCCH may be indicated. As a result, a slot offset between the transmissions of PSFCH and PUCCH is indicated in DCI to determine the timing for PUCCH used for carrying SL HARQ to gNB. In case of multiple repetitions of a single TB, the slot offset corresponds to the slot offset between the PSFCH resource of the last repetition and PUCCH.

For configured grant, PUCCH resources share the same periodicity as the CG resources and a slot offset between the transmissions of last PSFCH and PUCCH is indicated in RRC for Type 1 CG and activation DCI for Type 2 CG. Besides timing of sidelink HARQ reporting from Tx UE to gNB, the PUCCH resource indicator field in DCI to indicate frequency resource for HARQ feedback in NR Uu can also be reused for sidelink HARQ feedback. DCI contains a field of PUCCH-SL resource indicator to indicate the PUCCH frequency resource for sidelink HARQ feedback.

Considering the uniform design and spectrum efficiency, multiplexing the sidelink HARQ report with Uu link UCI transmission may be supported. Both dedicated resources for SL HARQ feedback, and joint transmission with Uu link UCI transmission need to be supported. Since all of the resources for HARQ feedback are allocated by gNB, no matter for Uu or sidelink, thus gNB can differentiate the PUCCH resource to be used for feedback from Uu and sidelink. For the sidelink HARQ ACK/NACK to report from transmit UE to gNB, both dedicated resources and joint transmission with Uu link UCI transmission need to be supported.

If dedicated resources for sidelink HARQ are supported, then UE may be allowed to transmit PUCCH containing Uu ACK/NACK as well as SL ACK/NACK in the same slot. Otherwise, Uu scheduling may be restricted. However, it is difficult to avoid PUCCH resources colliding between two such PUCCHs depending on gNB scheduling. The UE cannot transmit both if PUCCH resources are in conflict. In order to solve the problem, the UE can either drop one of them or multiplex them together. Dropping PUCCH for sidelink or PUCCH for Uu can depend on the priority of sidelink HARQ feedback, which can be the same as that of the corresponding sidelink data. If the UE multiplexes sidelink HARQ and Uu UCI, then both sidelink HARQ and Uu UCI can be transmitted. For the sidelink PUCCH resource and Uu PUCCH resource collision, dropping rules may be defined depending on the priority of sidelink HARQ.

When reserving periodic resources for a certain resource reselection period, the selected resources may quickly experience higher interference than expected at the time of resource selection. For example, on a two-way street, a fast approaching vehicle may soon (i.e., within the resource reselection period) cause interference at a receiver, which the transmitter could not have predicted at the time of resource selection.

UE motion may adversely impact the performance of sidelink resource allocation. To reduce the impact of high mobility on the performance of sidelink resource allocation, the gNB may configure a set of UE motion vector classes (e.g., velocity vectors) and associated resource pools. Based on this configuration, the UE may determine the class it belongs to by comparing its current state of motion with the configured classes. The UE may then select a resource pool based on the class it belongs to.

Figure 22:
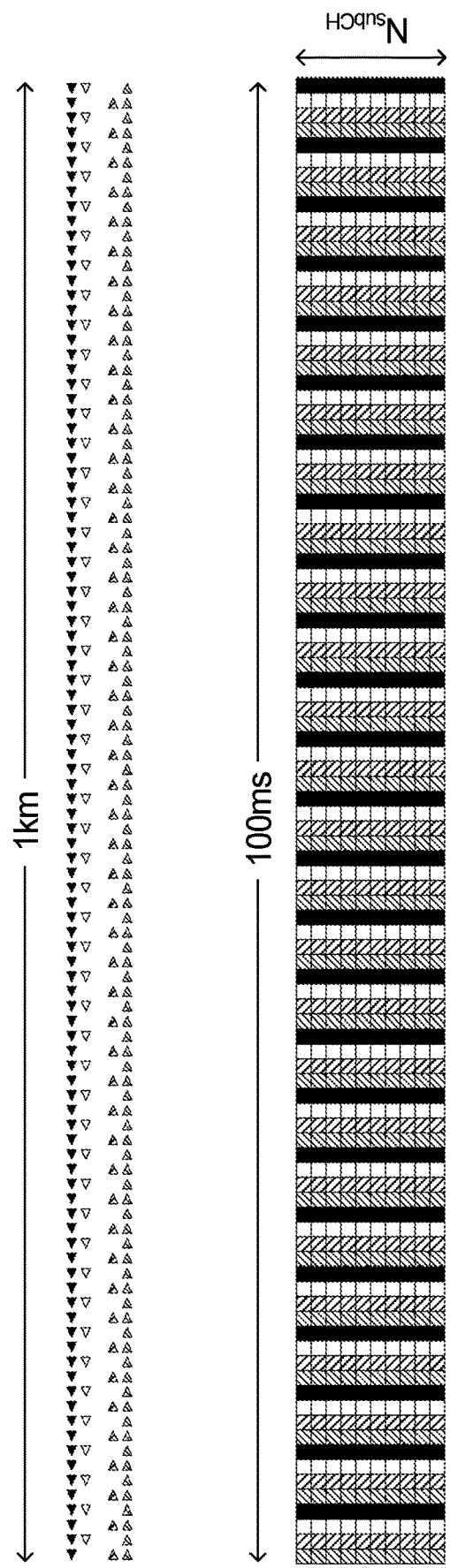
FIG. 22 shows a motion-based resource pool configuration example in a highway scenario.

FIG. 22 shows a motion-based resource pool configuration example in a highway scenario. In this example, the network configures four motion classes (slow and fast lanes in each direction) and allocates orthogonal resource pools to each motion class.

In order to prevent the loss of spectral efficiency as a result of partitioning (i.e., due to pool underutilization), the size of the resource pool(s) assigned to a given class may be adapted based on the number of vehicles in the class and/or their current traffic demand.

In case of GF (type-1 configured grant) transmissions, in a highway scenario, an example of assigning TFRPs inside the resource pools is that odd slots may only be used by eastbound UEs, whereas even slots may only be used by westbound UEs. The TFRPs are then defined so that an "eastbound TFRP" consists only of odd slots, whereas a "westbound TFRP" consists only of even slots. Such a "motion-aware TFRP" may be used for periodic or aperiodic traffic and it can be reconfigured depending on the traffic characteristics in each direction. Configuration of resource pools based on e.g. direction or speed of travel of UEs that use the pool is supported.

When NR sidelink mode-1 is controlled by gNB, dynamic scheduling, and configured grants of type 1 and type 2 are supported. When controlled by eNB, neither dynamic scheduling nor type 2 configured grant are supported, and the support of NR sidelink mode-1 is based on type 1 configured grants with some simplifications.

NR Uu configured grant configuration is used to discuss the details of configuration for NR sidelink mode-1 type 1 by LTE Uu. The configuration for the configured grant is "ConfiguredGrantConfig". The IE ConfiguredGrantConfig is used to configure uplink transmission without dynamic grant according to two possible schemes. The actual uplink grant may either be configured via RRC (type1) or provided via the PDCCH (addressed to CS-RNTI) (type2). ConfiguredGrantConfig information element may be configured in the following manner:

```
-- ASN1START
-- TAG-CONFIGUREDGRANTCONFIG-START
ConfiguredGrantConfig ::=                       SEQUENCE {
    frequencyHopping                            ENUMERATED {intraSlot, interSlot}
OPTIONAL, -- Need S,
    cg-DMRS-Configuration                       DMRS-UplinkConfig,
    mcs-Table                                   ENUMERATED {qam256, qam64LowSE}
OPTIONAL, -- Need S
    mcs-TableTransformPrecoder                  ENUMERATED {qam256, qam64LowSE}
OPTIONAL, -- Need S
    uci-OnPUSCH                                 SetupRelease { CG-UCI-OnPUSCH }
OPTIONAL, -- Need M
    resourceAllocation                          ENUMERATED { resourceAllocationType0,
resourceAllocationType1, dynamicSwitch },
    rbg-Size                                    ENUMERATED {config2}         OPTIONAL, --
Need S
    powerControlLoopToUse                       ENUMERATED {n0, n1},
    p0-PUSCH-Alpha                              P0-PUSCH-AlphaSetId,
    transformPrecoder                           ENUMERATED {enabled, disabled}
OPTIONAL, -- Need S
    nrofHARQ-Processes                          INTEGER(1..16),
    repK                                        ENUMERATED {n1, n2, n4, n8},
    repK-RV                                     ENUMERATED {s1-0231, s2-0303, s3-0000}
OPTIONAL, -- Need R
    periodicity                                 ENUMERATED {
        sym2, sym7, sym1x14, sym2x14, sym4x14, sym5x14,
sym8x14, sym10x14, sym16x14, sym20x14,
        sym32x14, sym40x14, sym64x14, sym80x14, sym128x14,
sym160x14, sym256x14, sym320x14, sym512x14,
        sym640x14, sym1024x14, sym1280x14, sym2560x14,
sym5120x14,
        sym6, sym1x12, sym2x12, sym4x12, sym5x12, sym8x12,
sym10x12, sym16x12, sym20x12, sym32x12,
```

-continued

```
                                 sym40x12, sym64x12, sym80x12, sym128x12, sym160x12,
sym256x12, sym320x12, sym512x12, sym640x12,
                                 sym1280x12, sym2560x12
        },
        configuredGrantTimer                    INTEGER (1..64)                OPTIONAL, --
Need R
     rrc-ConfiguredUplinkGrant                     SEQUENCE {
         timeDomainOffset                          INTEGER (0..5119),
         timeDomainAllocation                      INTEGER (0..15),
         frequencyDomainAllocation                    BIT STRING (SIZE(18)),
         antennaPort                             INTEGER (0..31),
         dmrs-SeqInitialization                    INTEGER (0..1)              OPTIONAL, --
Need R
         precodingAndNumberOfLayers                 INTEGER (0..63),
         srs-ResourceIndicator                     INTEGER (0..15)             OPTIONAL, --
Need R
         mcsAndTBS                     INTEGER (0..31),
         frequencyHoppingOffset                    INTEGER (1.. maxNrofPhysicalResourceBlocks-
1)                                     OPTIONAL, -- Need R
         pathlossReferenceIndex                    INTEGER (0..maxNrofPUSCH-
PathlossReferenceRSs-1),
         ...
      }                                              OPTIONAL, -- Need R
      ...
 }
CG-UCI-OnPUSCH ::= CHOICE {
     dynamic                      SEQUENCE (SIZE (1..4)) OF BetaOffsets,
     semiStatic                   BetaOffsets
}
-- TAG-CONFIGUREDGRANTCONFIG-STOP
-- ASN1STOP
```

The configuration from LTE Uu for NR sidelink mode-1 type 1 is restricted to time/frequency resources and periodicity.

The function LTE Uu configuration of NR sidelink mode-1 type 1 is supported by at least one of the following parameters: resourceAllocation; periodicity; configuredGrantTimer; timeDomainOffset; timeDomainAllocation; frequencyDomainAllocation; frequencyHoppingOffset.

The configuration restricted to time/frequency resources and periodicity aims to simplify/facilitate network management and/or UE implementation, based on an assumption that it is challenging for an eNB to obtain dynamic information about the NR sidelink without introducing new feedback information over LTE Uu and changes in eNB schedulers. Thus, it is assumed that the LTE network provides time and frequency domain resources, and leaves the selection and adaption of transmission schemes and parameters to sidelink transmission UEs, e.g., MCS/TBS, etc., in a way similar to how the LTE sidelink works, even in mode 3.

However, if some parameters such as dmrs-Seqinitialization are up to sidelink transmission UE choice, those parameters need to be indicated dynamically on the NR sidelink, which would unnecessarily increase the size of control information whether carried by SCI or DMRS. Therefore, it would be better to configure such parameters by LTE Uu configuration as well. Parameters to be configured can be determined after the design of NR sidelink configured grant type 1 is complete.

In addition to the parameters related to time/frequency resources & periodicity, some other parameters of NR Uu configured grant are needed for LTE Uu configuration of NR sidelink mode-1 type 1. Parameters to be configured can be determined after the design of NR sidelink configured grant type 1 is complete.

In one example, multiple active configured sidelink grants are supported in NR sidelink mode 1. It is natural that NR sidelink mode 1 operation supports the same number of type 1 configured grants when under LTE Uu control. NR SL mode 1, when controlled by LTE Uu, supports the same number of Type 1 configured sidelink grants as when controlled by NR Uu.

The resources for NR mode-2 SL sensing and resource (re)-selection procedures may be configured by gNB. New system information block may be designed to support NR sidelink Tx and Rx resource pool configuration and it may be defined as a container, and follow what is defined in NR RRC. Hence, for NR V2X mode 2 sidelink resource pool configuration via dedicated signaling, the signaling design may follow what is defined in NR dedicated signaling.

For NR V2X mode 2 sidelink resource pool configuration via dedicated RRC signaling from LTE Uu, information contained in the dedicated signaling may follow what is defined in NR RRC dedicated signaling.

In other embodiments, mode 2 resource allocation for NR V2X sidelink are provided, including resource allocation methods/features for mode 2, and sensing and resource/pattern selection.

Figure 23:
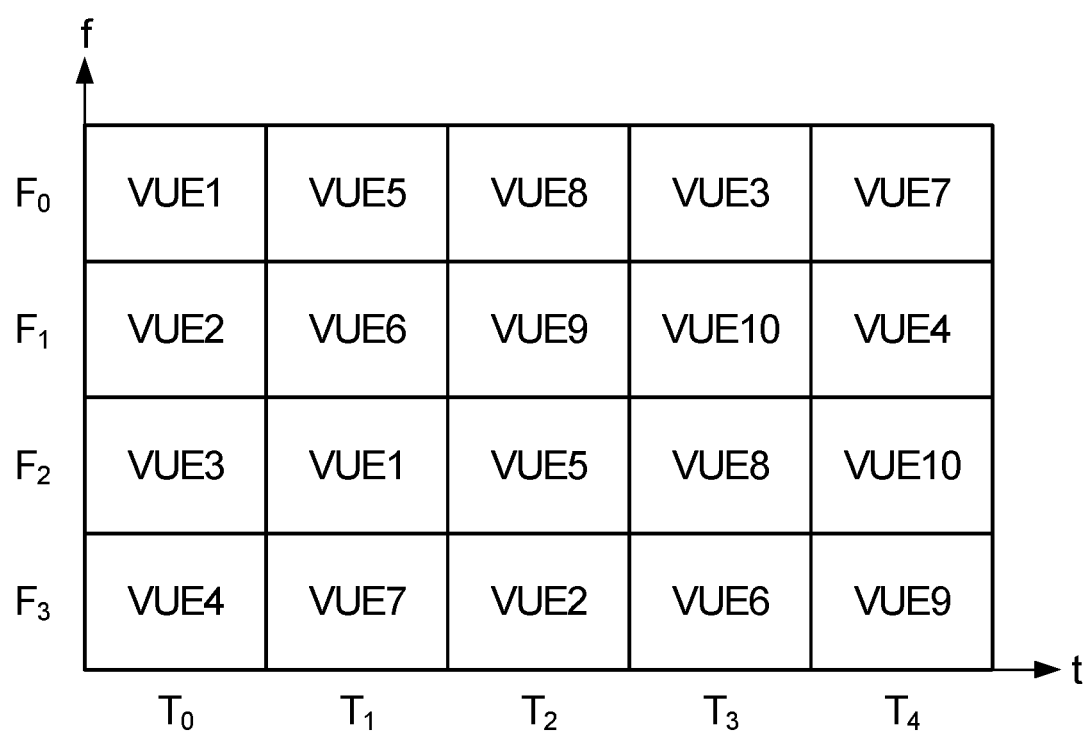
FIG. 23 shows an example of a TFRP pool.

In mode 2, UE may autonomously select sidelink resources for sidelink transmission within the (pre-)configured resource pools (RPs) or within (pre-) configured resources within the RPs. This can be achieved by (pre-)configuring a set of time-frequency resource patterns (TFRP)s within the RP with each TFRP indicating the time and frequency location of each repetition of a TB. An example of a TFRP set is depicted in FIG. 23, where a TFRP includes resources for 2 repetitions of a TB.

The maximum number of HARQ (re-)transmissions (including both blind and feedback-based HARQ (re-)transmission) may be (pre-)configured per priority per CBR range per transmission resource pool, the priority being the one signaled in SCI. The value range may be any value from 1 to 32. If the HARQ (re)transmissions for a TB can have a mixed blind and feedback-based approached, the counter applies to the combined total.

As the maximum number of HARQ retransmission is to be (pre)configured per priority per CBR range within a range of 1 to 32, it is stipulated that a mixed blind and feedback-based approach may be supported. Even in the case where HARQ feedback is enabled, UE can still benefit from blind retransmission which can reduce the latency similar to the repetition that is supported in Uu. However, performing more blind retransmissions than necessary may waste retransmission resources and add more load to the system. Therefore, a mixed approach can be useful. For example, a UE can choose to reserve two blind transmissions of a TB where no feedback is expected for the first transmission, and at the end of the second transmission, UE wait for a feedback and performs another 2 transmissions if a NACK is received after the second transmission.

Advance indication/reservation of initial transmission of a TB induces latency which may prevent meeting the stringent latency requirements of advanced NR V2X use cases. Such advanced indication/reservation requires a dedicated reservation signal/channel to be sent prior to the initial transmission of a TB in order to reserve resources for the initial transmission and potential retransmissions of the TB. In order to send such reservation signals in advance, a SCI transmitted in advance of the PSSCH has to be defined (Alt. 1.2). UEs may have to agree with a certain timing window for the reservation signal/channel in order to make any sensing procedure effective. There are also potential collisions of advanced SCI or reservation signals which affects the reliability of sensing. Standalone PSCCH for the purpose of advanced reservation of initial transmission or retransmission of a TB compounds the half-duplex issue in the sense that a UE transmitting standalone PSCCH may not be able to simultaneously receive PSSCH. As such, standalone PSCCH for the purpose of resource reservation may not be supported.

Similarly, an initial transmission using a single sub-channel PSCCH+PSSCH reserving resources for retransmission(s) of the same TB with a larger number of sub-channels (Alt. 1.1) does not remedy any of the problems identified for standalone SCI and therefore may not be supported either. In addition, as Nmax=3, the first subchannel already occupies one transmission and making only 2 transmissions available with full sub-channel size, which is a significant disadvantage compared to other schemes with the same Nmax. On the other hand, supporting reservation of retransmission of a TB (Alt. 2) can be implemented simply by decoding the SCI that is associated with the initial transmission. If the collision of retransmission is avoided with this retransmission reservation, the additional benefits of explicit advanced reservation for initial transmission is even smaller.

Figure 24:
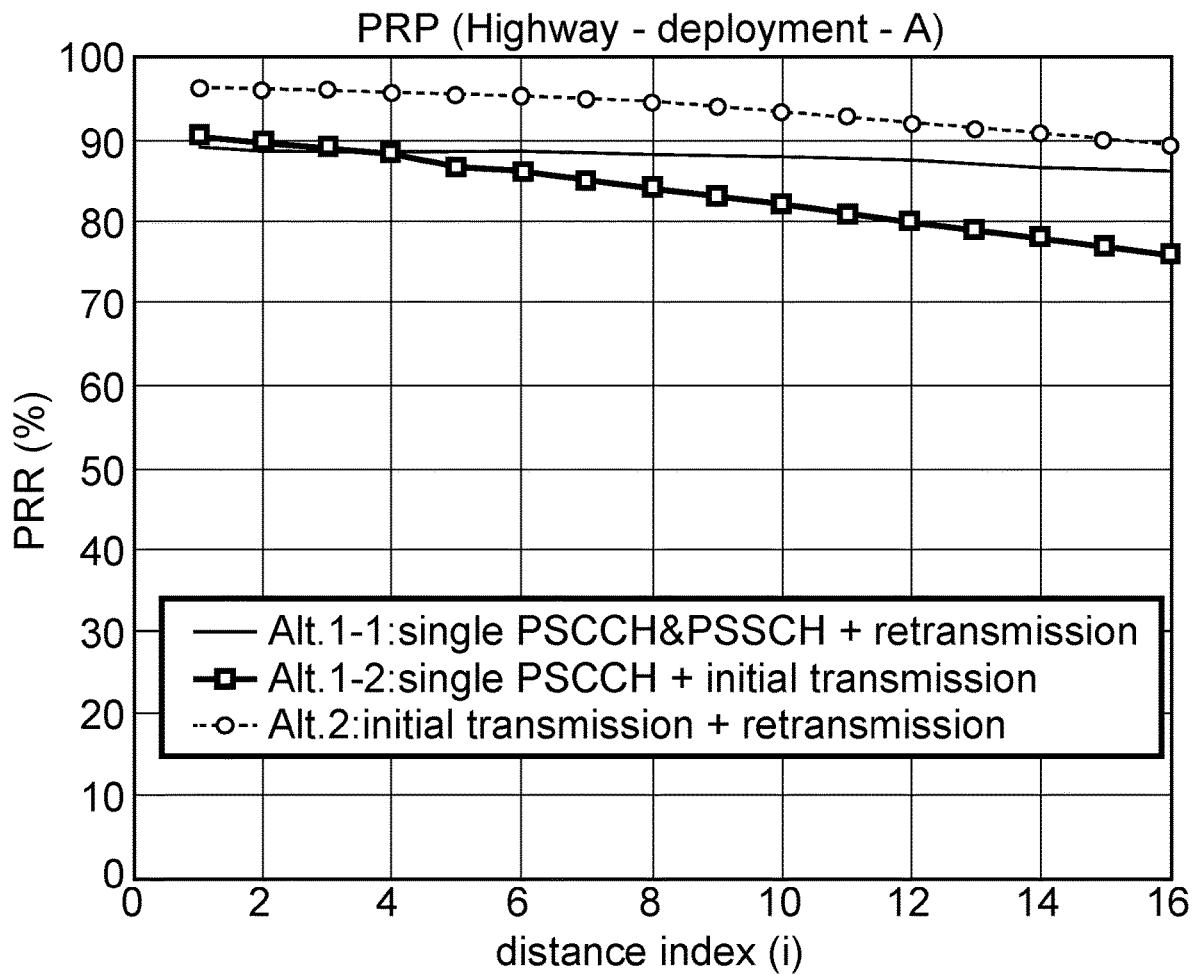
FIG. 24 is a graph showing average PRR for highway-A-Periodic 2.

For the system level assumptions, the PRR results for the three alternatives are shown in FIG. 24. As shown in FIG. 24, the initial transmission is performed by a single sub-channel PSCCH+PSSCH with a relatively high MCS for Alt.1-1, where PSSCH REs are occupied by 2nd stage SCI and by SL-SCH, followed by one possible retransmission depending on HARQ feedback. As for Alt.1-2, the single sub-channel reservation signal only carries 1st stage+2nd stage SCI, and the initial transmission (comprising both SCI stages+PSSCH) is performed in a later slot. In contrast to the above two Alt. 1 options, Alt.2 assumes the non-reservation scenario wherein the initial transmission and the possible retransmission use the same number of sub-channels.

It can be observed that Alt.2 performs better than Alt. 1 options. Compared with Alt.1-1, Alt.2 provides lower MCS owing to the larger number of sub-channels for the initial transmission. Compared with Alt1-2, one more transmission opportunity based HARQ feedback can be obtained for Alt.2. Besides the fact that the initial transmission is useless in Alt. 1.1 because it is often not decodable due to the high coding rate, the RSRP measurement which determines the resource exclusion is inaccurate on the single sub-channel reservation, given that the number of sub-channels and the index of sub-channel between the single sub-channel reservation and the following transmission are different.

In view of the latency implications, additional complexity, overhead and performance degradation induced by the reservation signal for initial transmission, explicit reservation of initial transmission of a TB may not be supported. At least an initial transmission and reservation of the resource(s) for retransmission(s) to have the same number of sub-channels is supported. The different number of sub-channels between initial transmission and reservation of resource(s) for retransmission(s) is not supported. Alt 1 is not supported.

During the resource selection procedure, UE needs to select the initial transmission resource as well as the reserved retransmission resources from the candidate resource pool. UE can either consider each T/F resource separately or consider the combination of initial and retransmission resource by selecting a TFRP among a (pre)configured TFRP pool. The benefits of selecting a TFRP among (pre)configured TFRP pool instead of considering each resource separately are as follows. With (pre)configured TFRP pool, it can design the TFRPs such that for any two different TFRPs, they does not share the same slots on all transmissions/retransmissions of a TB. Such design inherently mitigates the half-duplex issue in SL. However, without pre-configured TFRPs, the half-duplex issue would not be explicitly taken into consideration during the resource selection procedure. Additionally, TFRP pool can be designed such that it allows partial collision between different TFRPs. In high load scenario, such design allows UE to have partial collision without colliding on all transmissions for a TB. Therefore, the performance is still good as demonstrated from our system level simulations. When considering each resource separately, UE either cannot find available resources to transmit, incurs significant delay or disregards the potential collisions, all options leading to poor performance, especially in high load scenarios.

TFRP can further reduce the required number of bits indicated in SCI for reservation and detection. When UE indicates a TFRP among a (pre)configured TFRP pool, the number of choices of TFRP can be significantly reduced. Without such design, UE has to indicate the time/frequency resources of each transmission it reserves (including current transmission), which can significantly increase the number of bits required in the first-stage SCI, and is against the design principle of 2-stage SCI calling for a compact first-stage SCI.

(Pre)-configured resources (e.g. TFRPs) may be supported for mode 2 SL resource allocation in order to meet the latency and reliability requirements of NR V2X advanced use cases.

Mode-2 sensing procedure utilizes L1 SL-RSRP based on sidelink DMRS when the corresponding SCI is decoded. SL-RSRP measurement after decoding SCI is agreed to be used for SL resource (re)selection while SL-RSSI is still under discussion. In one example, SL-RSSI measurement may not be used in NR V2X sensing procedure. In one example, SL-RSRP based on PSSCH DMRS provides much more reliable sensing performance than PSCCH DMRS. PSSCH DMRS has more DMRS resources than PSCCH DMRS.

For Mode 2 sensing and resource selection procedure, SL-RSRP measurement is based on PSSCH DMRS. SL-RSSI measurement for sensing and resource selection is not supported.

At least three types of reservation are supported and the resource (re)selection procedure may take them into account: Reservation of a sidelink resource for a transmission of a TB via signaling associated with a prior transmission of a different TB ("Type a)"); Reservation of a sidelink resource for blind retransmission of a TB via signaling associated with a prior transmission of the same TB ("Type b)"); Reservation of a sidelink resource for HARQ-feedback based retransmission of a TB via signaling associated with a prior transmission of the same TB ("Type c)").

Sensing using Type a) reservation works similar to LTE long term sensing, however, reservation Types b) and c) are newly introduced in NR. Once UE determines the resource selection window, it may select a TFRP within the resource selection window such that it tries to avoid TFRPs reserved through Type a) reservation and TFRPs conflicting with retransmission resources indicated by other UEs using Type b) and Type c) reservations. With the above three reservation types, LBT type of short-term sensing is not needed in NR V2X, as it may further increase the energy consumption and complexity of the sensing procedure.

To indicate the reservation information of different reservation types for the sensing UE to perform resource selection, at least the following signaling may be indicated in SCI: reservation periodicity (RSVP); number of periodic resources explicitly reserved based on RSVP. In an example, 2-stage SCI is available, the above sensing related information may be indicated in the first stage SCI such that the sensing UEs (other than the receive UE) do not need to decode the 2nd stage SCI for sensing purpose. In LTE V2X, there are no fields indicating the number of TBs explicitly reserved based on RSVP. This is because LTE V2X is mainly targeting periodic traffic, and every UE is assumed to perform semi-persistent periodic transmission, for which the reservation can be considered as a long-term reservation or reserving an a priori unknown number of resources as Tx UE may use the periodic resource until a resource reselection is triggered. NR-V2X needs to support aperiodic and bursty traffic, therefore, in some situations, UE may perform a one-time transmission with no intention to further reserve periodic resources. In this case, it is beneficial for UE to indicate this intention such that the sensing UEs do not exclude the resource for resource selection purposes. On the other hand, if UE has a large packet to transmit and can predict that it needs more than one resource, UE can explicitly reserve a fixed number of periodic resources. Therefore, the SCI field indicating the number of explicitly reserved periodic resources can indicate either no periodic reservation, long-term reservation similar to LTE-V, or a specific number of explicitly reserved periodic resources. When reservation of a sidelink resource for an initial transmission of a TB at least by an SCI associated with a different TB is enabled. Reservation of different TBs may be based on periodic reservation to at least support the mechanism that is already supported in LTE-V2X. Although NR supports more diverse applications, including aperiodic traffic, removing the feature of periodic reservation in LTE is not desirable, which may make NR-V less effective than LTE-V in some scenarios. The periodic reservation can be a separate indication from the reservation of the same TB, as they complement each other and work in different time scales.

When reservation of a sidelink resource for an initial transmission of a TB at least by an SCI associated with a different TB is enabled, the preferred option is supported, i.e. a period >W is additionally signaled in SCI and the same reservation is applied with respect to resources indicated within NMAX within window W at subsequent periods; the number of subsequent reservation periods m are indicated in SCI (while m can indicate no periodic reservation, m>=1 periodic reservation(s) or an infinite number of periodic reservations (the latter option is similar to LTE-V2X)); NMAX remains the same regardless (whether the period is additionally indicated or not). For reservation of sidelink resources for retransmission of the same TB, the first-stage SCI may indicate whether the reserved retransmission is a blind retransmission or a HARQ feedback based retransmission A UE is (pre-)configured with a TFRP pool which can be part of the resource pool configuration. The TFRP pool configuration may include at least a periodicity and offset. TFRP pool can repeat itself in a non-overlapping way similar to configuration of a single TFRP in Mode 1. As an example to configure the TFRP, it can simply configure a periodicity, offset (starting slot), and number of repetitions, and the rest of the TFRP pool can be predefined. For example, for the non-overlapping TFRP pool, periodicity is 5 slots, offset is the starting slot number of the TFRP window/period, and repetition number is 2. As the TFRPs in this case are non-overlapped (orthogonal), then in case flexible TFRP starting location is supported, a retransmission index can be included in the SCI to indicate whether the detected PSSCH corresponds to an initial transmission or a retransmission.

Before TFRP selection, UE shall perform sensing based on SCI decoding. The SCI decoding provides the information on the TFRPs used by other UEs during the sensing window.

UE performs sensing via decoding the first stage SCI before the packet arrival. The sensing window is defined as a window of length T preceding the resource (re)selection trigger time (a packet arrives without reserved resource usually triggers resource reselection). The length of the sensing window can be preconfigured for the resource pool, and can be a multiple of the TFRP periodicity.

Based on sensing results obtained during the sensing window, UE performs resource selection within the resource selection window. Since UE needs to select all the transmission resources for a TB in one-shot, UE may select a TFRP within the resource selection window.

There are two ways to determine the resource selection window: In the first approach, the starting location of the TFRP window is fixed. In this case, the resource (re)selection window starts at the first TFRP window that is later than T1>=0 after the resource (re)selection trigger. In the second approach, the selection window may start at any slot, i.e., the selection window starts T1>=0 after the resource (re)selection trigger. The resource selection window length can be equal to the TFRP window length (or the periodicity) or a multiple thereof.

Once UE determines the resource selection window, it may select a TFRP within the resource selection window. In order to select the TFRP, UE first creates a candidate resource pool, which is a TFRP pool including all possible TFRPs within the resource selection window. A TFRP is not considered as a candidate resource if the TFRP is indicated in a received SCI and the associated L1 SL-RSRP measurement is above an SL-RSRP threshold. UE then randomly selects a TFRP among the remaining candidate TFRPs.

If a TFRP can be partially overlapped with another TFRP, then the resource selection can be further optimized. Within the remaining candidate TFRPs, a TFRP may be selected based on the following order of preference: (1) all resources of the TFRP are not overlapping with any reserved resources; (2) initial/first transmission resource of the TFRP does not overlap, but retransmission resources may with reserved resources; (3) initial/first transmission resource of the TFRP is overlapped with reserved resources, but at least one retransmission is not.

The identified candidate resources may be based on the results of SCI decoding and corresponding SL-RSRP measurement, RSSI measurement that used in LTE is not accurate for NR which supports a various type of traffic/applications, including aperiodic traffic. The value of X can be configured per resource pool within a reasonable range. More specifically, the value of X can be associated with the number of SL resources indicated by one SCI for a TB, including current transmission and reserved transmissions. Assuming the number of SL resources indicated by one SCI is relatively large, e.g. 3 (same as the maximum value of N_max), if the value of X remains at 20, then the probability of successfully selecting 3 resources from the identified candidate resources under the constraint of a pre-configured time gap may be decreased. Therefore, the value of X may be (pre-)configured depending on the maximum number of SL resources indicated by one SCI. For example, when the maximum number of SL resources indicated by one SCI is 2 or 3, the value of X can be set accordingly to 20 or 30, respectively.

Before the initial transmission of a TB, UE shall continue sensing based on SCI decoding to further check if the selected TFRP has any conflict with retransmission reservations. If a conflict is found, UE may (re)select a different TFRP within the same (re)selection window.

In some examples, (re)selection and pre-emption mechanisms are available. Resource (re-)selection procedure supports re-evaluation of Step 1 and Step 2 before transmission of SCI with reservation: the re-evaluation of the (re-)selection procedure for a resource reservation signalled in a moment 'm' is not required to be triggered at moment >'m−T3' (i.e. resource reselection processing time needs to be ensured)

Note that the re-evaluation happens after the first selection of resources. The resource reservation signaled at a moment "m" corresponds to the initial transmission resource selected at moment m. Therefore, the sensing that is associated with the re-evaluation may stop at time "m−T3", where T3 is the sensing resource selection processing time. The resource selection for the re-evaluation may be triggered similarly based on the detected SCI where the measured SL RSRP is above a threshold.

For blind and feedback-based retransmission resource, as discussed earlier, UE may adjust the priority of reservation with regards to feedback-based retransmission before using it to find the SL-RSRP threshold to account for the probability that a feedback-based retransmission may not be used based on a HARQ ACK feedback.

In some examples, re-evaluation of the already selected resource is based on sensing results before m−T3, where m is the time of the selected initial transmission. T3 accounts for sensing and resource selection processing time. The re-evaluation is triggered if a SCI is detected which reserves a resource that is in conflict with the initial selected resource and the corresponding SL RSRP is above a threshold. UE handles blind retransmission and feedback based retransmission differently by adjusting the priority of feedback based retransmission before using the priority to find the SL RSRP threshold.

In some examples, support a resource pre-emption mechanism for Mode-2, a UE triggers reselection of already signaled resource(s) as a resource reservation in case of overlap with resource(s) of a higher priority reservation from a different UE and, SL-RSRP measurement associated with the resource reserved by that different UE is larger than an associated SL-RSRP threshold. Only the overlapped resource(s) is/are reselected. This mechanism can be enabled or disabled, per resource pool.

When UE sends an initial transmission that reserves retransmission resources, UE may need to further check if there is a pre-emption signal even after the initial transmission. Therefore, preemption could be triggered before each re-transmission. However, re-selection of resources may cause additional problems: Firstly, the re-selected resources may not be reserved and could be subject to collisions; secondly, UE may need to continue detecting SCI in case a new pre-emption of the reselected resource is detected, which may cause further delays. For the above reason, UE may try to reduce the power instead of a resource reselection to mitigate the potential collision to other UEs. For the timeline of preemption, a preemption sensing window can be defined to reduce the amount of sensing and processing on the UE side. As the preemption only needs to account for the maximum reservation window from another UE, the following proposal on preemption window may be considered:

For each retransmission of a TB at time instance m that is reserved by an initial transmission, UE triggers reselection of that retransmission based on preemption at time instance m−T3 if a SCI satisfies the preemption condition is detected during a preemption sensing window [m−T4, m−T3]. T4 is given by the maximum reservation window size W. In lieu of resource reselection, Tx UE transmit power reduction is additionally supported after a preemption event is detected.

Figure 25:
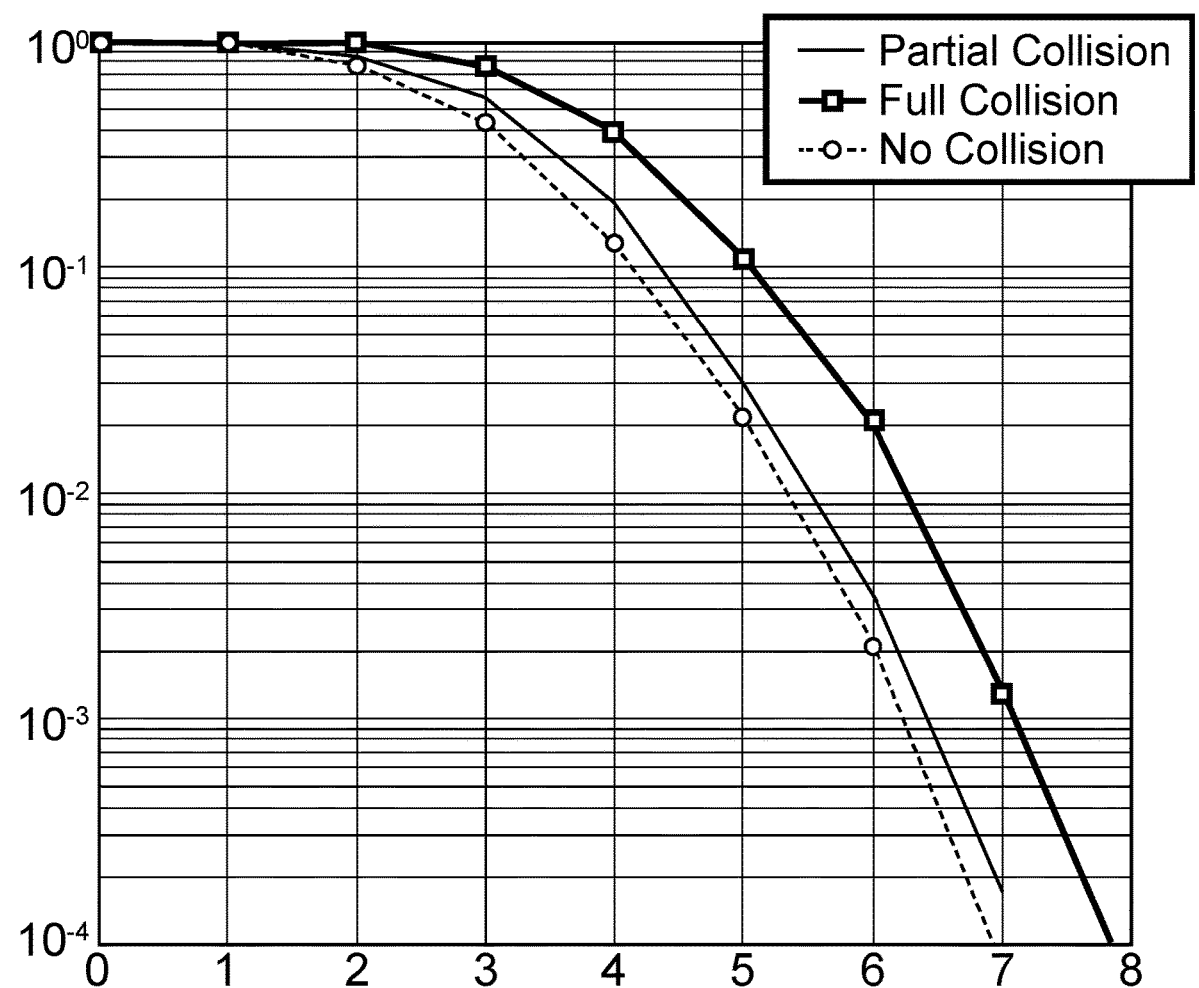
FIG. 25 is a graph illustrating BLER performance of partially colliding TFRPs.

One advantage of TFRP based resource selection is taking into account the combination of different transmission resources for the same TB in the resource selection. In high load scenarios, such design allows UEs to successfully decode a TB in spite of incurring some partial collisions. In comparison, selection based on individual resources may incur severe delays as a sensing UE may keep (re)selecting resources if it fails to find non-conflicted resources for all transmissions of a TB. To further illustrate the benefit of TFRP based resource selection, it is simulated the link level results for full, partial and no-overlap for the case of two transmissions of a single TB. As can be seen from FIG. 25, the performance loss of partial collision is minimal compared to the collision-free case, while partial collision significantly outperforms the full collision case. Therefore, the potential selection of partial collision based on TFRP design can significantly increase the system efficiency and reduce the latency, especially in high load scenarios.

The SL-RSRP threshold is at least a function of the priority of the SL transmission indicated in the received SCI and the priority of the transmission for which resources are being selected by the UE. However, there are different types of reservations and the priority may take these different reservation types into account, which is further discussed below in more detail.

In the reservation signaling, Type a) reservation (i.e. via signaling associated with a prior transmission of a different TB) may further include the following sub-types: Sub-type a1) is the long-term reservation similar to LTE V2X; Sub-type a2) refers to reservation of resources for a fixed number of different TBs; Sub-type a3) refers to no reservation of resources for different TBs.

Note that different reservation types may have different impacts on the resource selection. For example, for Sub-type a1) reservation, the UE that reserves the resources (i.e. TFRP) may not actually use the same resource during the resource selection window of the sensing UE simply because it may not have a packet to transmit or it perform a (re)selection. For Sub-type a3), there is no reservation, therefore, the reserved resource based on RSVP may be ignored. On the other hand, for Type b) reservation (i.e. via signaling associated with a prior transmission of the same TB), the UE which reserves the resources for blind retransmission is highly likely to use the retransmission resource which may impact the sensing UE. Similarly, when UE reserves a fixed number of TBs via Sub-type a2), UE is very likely to use those resources; while for Type c) reservation (i.e. via signaling associated with a prior transmission of the same TB), the UE which makes the reservation for HARQ-feedback based retransmission may release the retransmission resource due to receiving an ACK before the retransmission. Therefore, in general, Type b) and Sub-type a2) reservation may be accounted for by the sensing UE with higher priority compared to Type a) and Type c) reservations. The adjustment of priority can be implemented by applying a reservation type specific coefficient to the packet priority.

At least for unicast, Rx UE can adjust its behavior on whether or not to expect a retransmission based on the HARQ feedback it transmits. For the sensing UE (other UE), their resource selection scheme may lower the priority of a reservation if the reserved resource can be released. This can be achieved by adjusting the priority level by reducing it if there is a chance the reserved resource may be released based on HARQ feedback.

In Step 1, initial L1 SL-RSRP threshold for each combination of pi and pj is (pre-)configured, where pi—priority indication associated with the resource indicated in SCI and pj—priority of the transmission in the UE selecting resources. The feature lead summary also contained proposal on how to handle blind retransmission and HARQ based retransmission for the resource selection that has not been discussed. Based on the above discussion, our view is that if the priority indication pi associated with the resource indicated in the SCI is used for HARQ feedback based retransmission, the sensing UE shall adjust pi by multiplying it with a predefined or (pre)configured priority coefficient associated with the reservation type. Similarly, this can be applied to long-term reservation as well. An alternative solution is that the reservation UE can adjust the priority pi based on the reservation type before putting it in the SCI, this does have some limitation as it assumes only one type of reservation is used.

In Step 1, UE shall adjust pi by multiplying it with a predefined or (pre)configured priority coefficient associated with the reservation type before using it to find the L1 SL-RSRP threshold.

Figure 5:
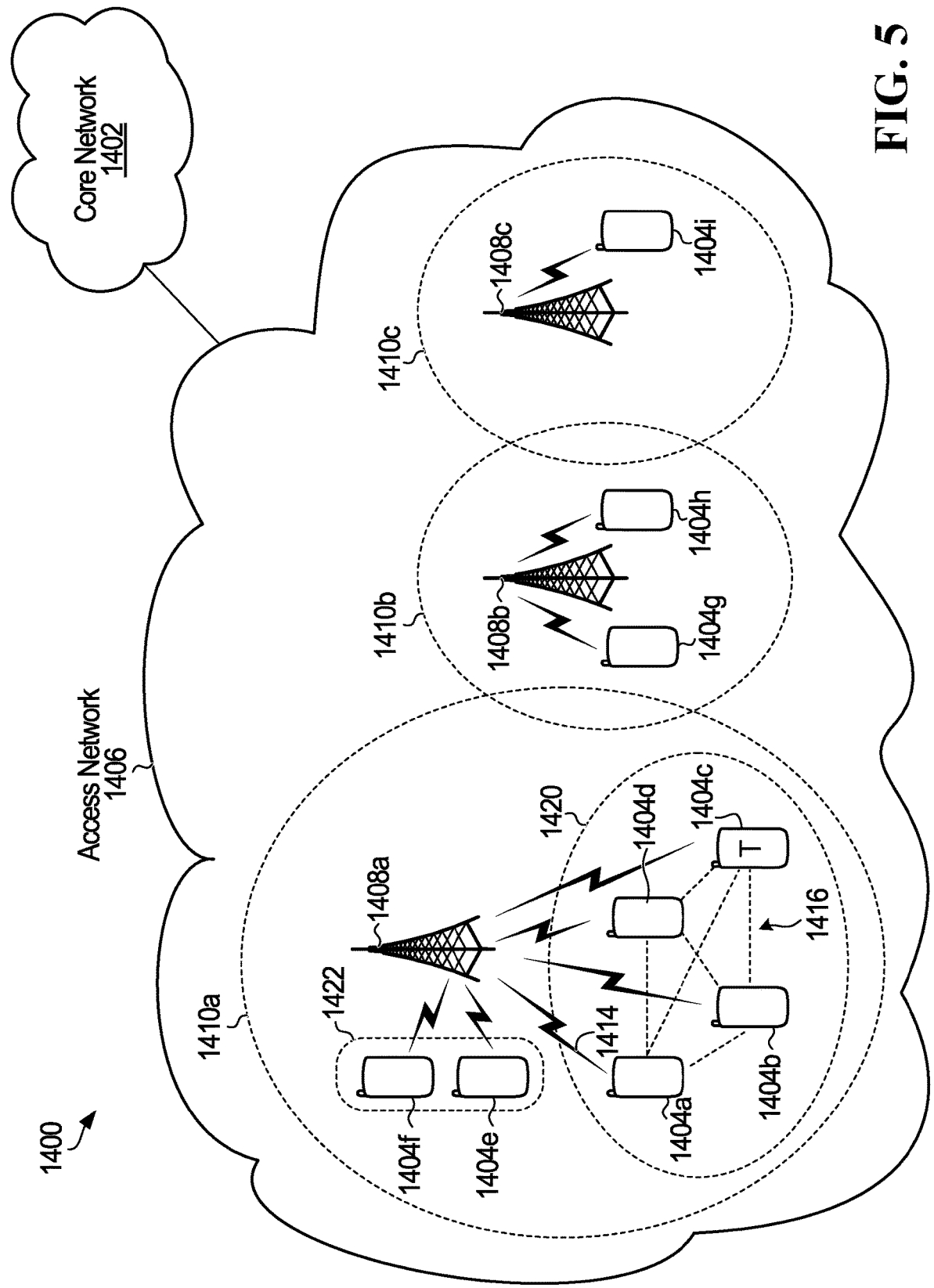
FIG. 5 is a block diagram illustrating an example of a telecommunications network according to one embodiment.

FIG. 5 is a block diagram illustrating an example of a telecommunications network 1400 according to one embodiment, for implementing any one or combination of two or more of the above described methods. The telecommunications network 1400 includes a core network 1402 and an access network 1406. The access network 1406 serves a plurality of UEs 1404a, 1404b, 1404c, 1404d, 1404e, 1404f, 1404g, 1404h, and 1404i. The access network 1406 could be an Evolved Universal Terrestrial Access (E-UTRA) network. As another example, the access network 1406 could be a cloud access network (C-RAN). The access network 1406 includes a plurality of BSs 1408a, 1408b, and 1408c. The BSs 1408a-c each provides a respective wireless coverage area 1410a, 1410b, and 1410c. Each of the BSs 1408a-c could be implemented using a radio transceiver, one or more antennas, and associated processing circuitry, such as antenna radio frequency (RF) circuitry, analog-to-digital/digital-to-analog converters, etc.

Although not illustrated, the BSs 1408a-c are each connected to the core network 1402, either directly or through one or more central processing hubs, such as servers. The BSs 1408a-c could serve as a gateway between the wireline and wireless portion of the access network 1406.

Each one of BSs 1408a-c may instead be referred to as a base transceiver station, a radio BS, a network node, a transmit node, a transmit point, a Node B, an eNode B, or a remote radio head (RRH), depending upon the implementation.

In operation, the plurality of UEs 1404a-i access the telecommunications network 1400 using the access network 1406 by wirelessly communicating with one or more of the BSs 1408a-c.

UEs 1404a-d are in close proximity to each other. Although the UEs 1404a-d can each wirelessly communicate with the BS 1408a, they can also directly communicate with each other, as represented at 1416. The communications represented at 1416 are direct communications between UEs that do not go through an access network component, such as a BS. As shown in FIG. 5, UE to UE communications 1416 are directly between the UEs 1404a-d and are not routed through the BS 1408a, or any other part of the access network 1406. Communications 1416 may also be referred to as lateral communications. In embodiments disclosed herein, UE to UE communications use an SL channel and an SL air interface. On the other hand, a communication between an access network component, such as BS 1408a, and a UE, as in communication 1414, is called an access communication. An access communication occurs over an access channel, which can be a UL or DL channel, and an access communication uses a radio access communication interface, such as a cellular radio access air interface. Access and SL air interfaces may use different transmission formats, such as different waveforms, different multiple access schemes, and/or different radio access technologies. Some examples of radio access technologies that could be used by an access air interface and/or an SL air interface are: Long Term Evolution (LTE), LTE License Assisted Access (LTE-LAA), and Wi-Fi.

By using the SL communications 1416, the UEs 1404a-d may be able to assist with wireless communications between the UEs 1404a-d and the BS 1408a. As one example, if UE 1404c fails to correctly decode a packet received from the BS 1408a, but if UE 1404d is able to receive and correctly decode the packet from the BS 1408a, then UE 1404d could directly transmit the decoded packet to UE 1404c using SL communications 1416. As another example, if UE 1404c moves out of wireless coverage area 1410c, such that UE 1404c can no longer wirelessly communicate with the BS 1408a, then UE 1404b could forward messages between the UE 1404c and the BS 1408a. As another example, UE 1404a and UE 1404c could both receive a signal transmitted from the BS 1408a that carries a packet meant for UE 1404c. UE 1404a may then transmit to UE 1404c, via SL communications 1416, the signal as received by UE 1404a. UE 1404c may then use the information received from UE 1404a to help decode the packet from the BS 1408a. In these examples, capacity and/or coverage may be enhanced through the assistance of UEs 1404*a*, 1404*b*, and/or 1404*d*. V2X communications as referenced herein are an example of SL communications.

The UEs 1404*a-d* form a UE group 1420. The access network 1406 could assign a group identifier (ID) to the UE group 1420. The UE group ID may allow the access network 1406 to address the UE group 1420 as a whole and distinguish the UE group 1420 from other UE groups. The UE group ID may also be used to broadcast information within the UE group, i.e. address all other UEs within the UE group 1420. The UE group 1420 may form a logical or virtual device mesh in which the members of the UE group 1420 communicate amongst themselves using UE communications over an SL air interface, but the UE group 1420 as a whole acts as a single distributed virtual transceiver with respect to the access network 1406. The UE group ID may be a group radio network temporary identifier (G-RNTI), for example.

When a particular UE in the UE group 1420 is being assisted or is to be assisted with wireless communication between that UE and the BS 1408*a*, then that particular UE is referred to as the target UE. In the examples above, UE 1404*c* is being assisted and so is the TUE 1404*c*. The other UEs 1404*a*, 1404*b*, and 1404*d* in the group 1420 form a cooperation candidate set, which is a set of UEs that may cooperate to help the TUE 1404*c*. The subset of UEs in the cooperation candidate set that actually assist the target UE 1404*c* form a cooperation active set. The cooperation active set may be dynamically selected to assist the target UE 1404*c*. The UEs in the cooperation active set are referred to as cooperating UEs (CUEs). In UE group 1420, UEs 1404*a*, 1404*b*, and 1404*d* form the cooperation candidate set. If UEs 1404*a* and 1404*b* actually assist target UE 1404*c*, then UEs 1404*a* and 1404*b* form the cooperation active set and are the CUEs. As UEs 1404*a-d* move around, some may leave the UE group 1420 and/or other UEs may join the UE group 1420. Therefore, the cooperation candidate set may change over time, e.g., the cooperation candidate set may change semi-statically. The UE group 1420 may also be terminated by the network 1406, e.g., if the network determines that there is no longer a need or opportunity for the UE group 1420 to provide assistance in wireless communication between the BS 908*a* and members of the UE group 1420.

There may be more than one UE group. For example, UEs 1404*e* and 1404*f* in FIG. 5 form another UE group 1422.

A UE may perform retransmission based on different configurations. For dynamic scheduling in Mode 1, the resource used for retransmission may be configured in the DCI that is used to schedule a SL transmission. For configured grant, the retransmission may be configured in RRC for Type 1 or RRC plus DCI in configured grant Type 2. For Mode 2 UE, the UE may select the retransmission resource or resource pattern for retransmission.

Figure 6:
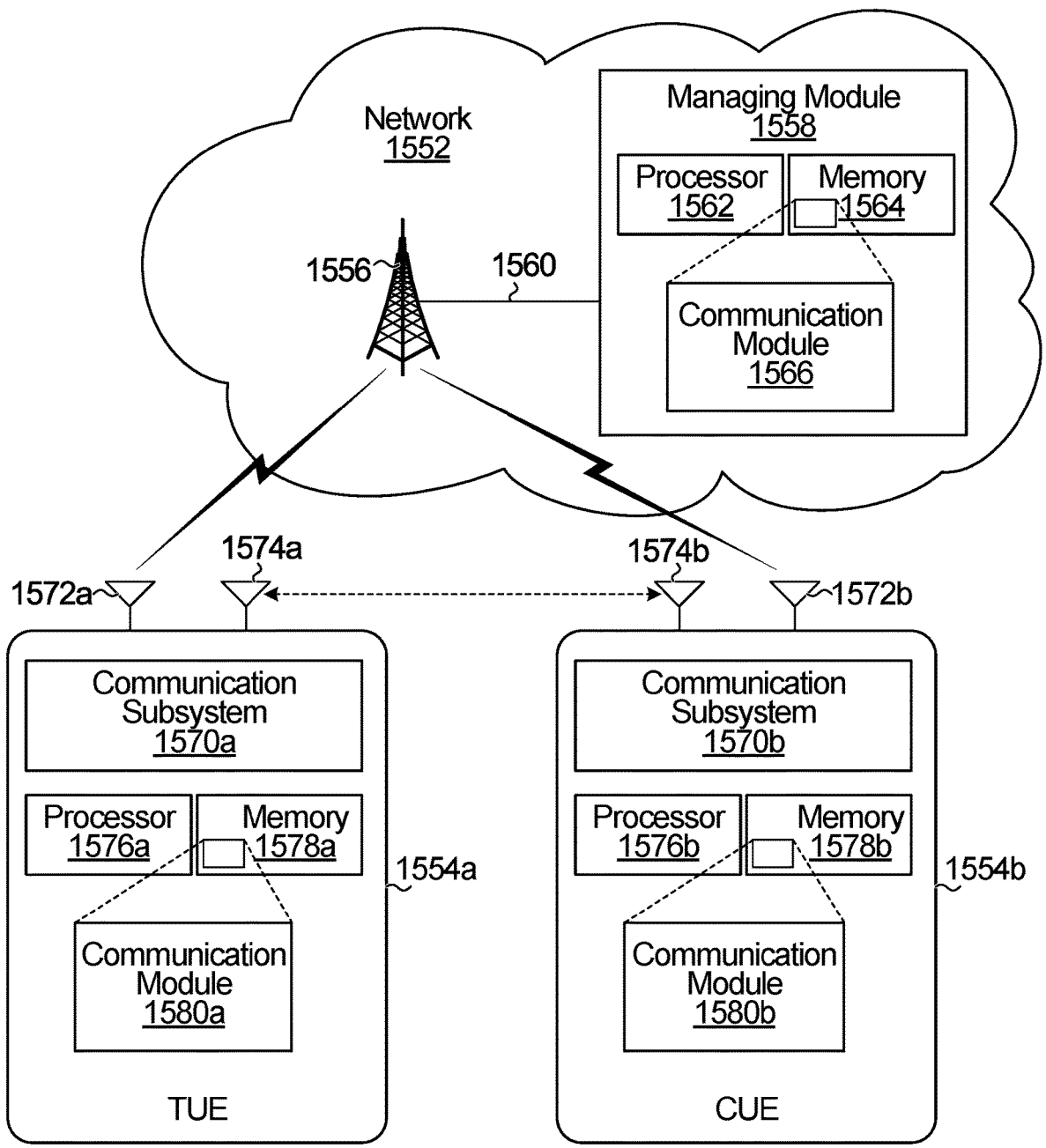
FIG. 6 is a block diagram illustrating an example of a network serving two UEs.

FIG. 6 is a block diagram illustrating an example of a network 1552 serving two UEs 1554*a* and 1554*b*, according to one embodiment. The network 1552 may be the access network 1406 from FIG. 5, and the two UEs 1554*a* and 1554*b* may include the functionality of any of the embodiments described herein. However, more generally this need not be the case, which is why different reference numerals are used in FIG. 6.

The network 1552 includes a BS 1556 and a managing module 1558. The managing module 1558 instructs the BS 856 to perform actions. The managing module 858 is illustrated as physically separate from the BS 1556 and coupled to the BS 1556 via a communication link 1560. For example, the managing module 1558 may be part of a server in the network 1552. Alternatively, the managing module 1558 may be part of the BS 1556.

The managing module 1558 includes a processor 1562, a memory 1564, and a communication module 1566. The communication module 1566 is implemented by the processor 1562 when the processor 1562 accesses and executes a series of instructions stored in the memory 1564, the instructions defining the actions of the communication module 1566. When the instructions are executed, the communication module 1566 causes the BS 1556 to perform the actions described herein so that the network 1552 can establish, coordinate, instruct, and/or control a UE group. Alternatively, the communication module 1566 may be implemented using dedicated circuitry, such as an application specific integrated circuit (ASIC) or a programmed field programmable gate array (FPGA).

The UE 1554*a* includes a communication subsystem 1570*a*, two antennas 1572*a* and 1574*a*, a processor 1576*a*, and a memory 1578*a*. The UE 1554*a* also includes a communication module 1580*a*. The communication module 1580*a* is implemented by the processor 1576*a* when the processor 1576*a* accesses and executes a series of instructions stored in the memory 1578*a*, the instructions defining the actions of the communication module 1580*a*. When the instructions are executed, the communication module 1580*a* causes the UE 1554*a* to perform the actions described herein in relation to establishing and participating in a UE group. Alternatively, the module 1580*a* may be implemented by dedicated circuitry, such as an ASIC or an FPGA.

The communication subsystem 1570*a* includes processing and transmit/receive circuitry for sending messages from and receiving messages at the UE 1554*a*. Although one communication subsystem 1570*a* is illustrated, the communication subsystem 1570*a* may be multiple communication subsystems. Antenna 1572*a* transmits wireless communication signals to, and receives wireless communications signals from, the BS 1556. Antenna 1574*a* transmits SL communication signals to, and receives SL communication signals from, other UEs, including UE 1554*b*. In some implementations there may not be two separate antennas 1572*a* and 1574*a*. A single antenna may be used. Alternatively, there may be several antennas, but not separated into antennas dedicated only to SL communication and antennas dedicated only to communicating with the BS 1556.

SL communications could be over Wi-Fi, in which case the antenna 1574*a* may be a Wi-Fi antenna. Alternatively, the SL communications could be over Bluetooth™, in which case the antenna 1574*a* may be a Bluetooth™ antenna. SL communications could also or instead be over licensed or unlicensed spectrum.

The UE 1554*b* includes the same components described above with respect to the UE 1554*a*. That is, UE 1554*b* includes communication subsystem 1570*b*, antennas 1572*b* and 1574*b*, processor 1576*b*, memory 1578*b*, and communication module 1580*b*.

The UE 1554*a* is designated as a target UE (TUE) and will therefore be called TUE 1554*a*. The UE 1554*b* is a cooperating UE and will therefore be called CUE 254*b*. The CUE 1554*b* may be able to assist with wireless communications between the BS 1556 and TUE 1554*a* if a UE group were to be established that included TUE 1554*a* and CUE 1554*b*. Other communication scenarios are also contemplated, in a V2X application, for example.

UE 1554*a* may be specifically chosen as the target UE by the network 1552. Alternatively, the UE 1554*a* may itself determine that it wants to be a target UE and inform the network 1552 by sending a message to the BS 1556.

Example reasons why UE 1554*a* may choose or be selected by the network 1552 to be a target UE include: low wireless channel quality between the UE 1554*a* and the BS 1556, many packets to be communicated between the BS 1556 and the UE 1554*a*, and/or the presence of a cooperating UE that is a good candidate for helping with communications between the BS 1556 and the UE 1554*a*.

UE 1554*a* need not always stay a target UE. For example, UE 1554*a* may lose its status as a target UE once there is no longer a need or desire for assistance with wireless communications between UE 1554*a* and the BS 1556. UE 1554*a* may assist another target UE that is a cooperating UE at a later time. In general, a particular UE may sometimes be a target UE and other times may be a cooperating UE assisting another target UE. Also, sometimes a particular UE may be both a target UE receiving assistance from one or more cooperating UEs and also a cooperating UE itself assisting another target UE. In the examples below, the UE 1554*a* acts only as a target UE, i.e., TUE 1554*a*, and the UE 1554*b* is a cooperating UE to the TUE 1554*a*, i.e., CUE 1554*b*.

FIGS. 5 and 6 illustrate systems in which embodiments could be implemented. In some embodiments, a UE includes a processor, such as 1576*a*, 1576*b* in FIG. 6, and a non-transitory computer readable storage medium, such as 1578*a*, 1578*b* in FIG. 6, storing programming for execution by the processor. A non-transitory computer readable storage medium could also or instead be provided separately, as a computer program product.

Numerous modifications and variations of the present disclosure are possible in light of the above teachings. It is therefore to be understood that within the scope of the appended claims, the disclosure may be practiced otherwise than as specifically described herein.

The invention claimed is:

1. A method comprising:
a UE receiving a sidelink (SL) configured grant to configure one or more transmission resources available for SL transmissions by the UE that repeats on a periodic basis within each of a plurality of periods;
during one of said periods, the UE transmitting one or more SL transmissions of at least one transport block (TB) using the one or more transmission resources configured by the SL configured grant;
the UE receiving a downlink control information (DCI) to schedule a SL retransmission of a TB;
wherein the TB to be retransmitted corresponds to a TB of the at least one TB transmitted by the UE using the configured transmission resources within the one of the periods;
the UE transmitting a SL transmission containing a retransmission of the transport block of the at least one TB using resources specified in the DCI, and transmitting to at least one other UE, a respective sidelink control information (SCI) associated with each SL transmission, the SCI containing a hybrid automatic repeat request (HARQ) process identifier (ID) for the SL transmission.

2. The method of claim 1 wherein the TB to be retransmitted corresponds to a last TB transmitted by the UE within the one of the periods.

3. The method of claim 1 wherein a maximum of one TB is transmitted by the UE in each period.

4. The method of claim 1 wherein the DCI contains a HARQ process ID that is different from the HARQ process ID contained in the SCI.

5. The method of claim 1 wherein the DCI contains a HARQ process ID, and the HARQ process ID in the DCI is associated with the one of the periods based on a time location of a first SL transmission resource of the one of the periods, a configured maximum HARQ process number and a periodicity of the resources available for SL transmission.

6. The method of claim 1, further comprising retransmitting a TB of the at least one TB transmitted using resources configured for the configured grant in another period other than the one of the periods.

7. The method of claim 1 wherein:
the configured grant includes a physical uplink control channel (PUCCH) resource associated with each period;
the method further comprising:
for each period, transmitting HARQ feedback on the PUCCH resource associated with the period, wherein the PUCCH resource is only used for HARQ feedback associated with the last TB transmitted in the period.

8. A method comprising:
transmitting a sidelink (SL) configured grant (CG) to a UE to configure one or more transmission resources available for SL transmissions by the UE that repeats on a periodic basis within each of a plurality of periods;
transmitting a downlink control information (DCI) to schedule a SL retransmission of a transport block (TB);
wherein the TB to be retransmitted based on the DCI corresponds to a TB of the at least one TB transmitted by the UE using the configured transmission resources within the one of the periods.

9. The method of claim 8 wherein the TB to be retransmitted corresponds to a last TB transmitted by the UE within the one of the periods.

10. The method of claim 8 wherein a maximum of one TB is transmitted by the UE in each period.

11. The method of claim 8 wherein the DCI contains a HARQ process ID, and the HARQ process ID in the DCI is associated with the one of the periods based on a time location of a first SL transmission resource of the one of the periods, a configured maximum HARQ process number and a periodicity of the resources available for SL transmission.

12. The method of claim 8 wherein:
the configured grant includes a physical uplink control channel (PUCCH) resource associated with each period;
the method further comprising:
for each period, receiving HARQ feedback on the PUCCH resource associated with the period, wherein the PUCCH resource is only used for HARQ feedback associated with the last TB transmitted in the period.

13. An apparatus comprising a processor and memory, the apparatus configured to execute a method comprising:
receiving a sidelink (SL) configured grant to configure one or more transmission resources available for SL transmissions by the apparatus that repeats on a periodic basis within each of a plurality of periods;
during one of said periods, transmitting one or more transmissions of at least one transport block (TB) using the one or more transmission resources configured by the SL configured grant;
receiving a downlink control information (DCI) to schedule a SL retransmission of a TB;
wherein the TB to be retransmitted corresponds to a TB of the at least one TB transmitted by the apparatus using the configured transmission resources within the one of the periods;
transmitting a SL transmission containing a retransmission of the transport block of the at least one TB using resources specified in the DCI;

transmitting to at least one other UE a respective sidelink control information (SCI) associated with each SL transmission, the SCI containing a hybrid automatic repeat request (HARQ) process ID for the SL transmission.

14. The apparatus of claim 13 wherein a maximum of one TB is transmitted by the UE in each period.

15. The apparatus of claim 13 wherein the DCI contains a HARQ process ID that is different from the HARQ process ID contained in the SCI.

16. The apparatus of claim 13 wherein the DCI contains a HARQ process ID, and the HARQ process ID in the DCI is associated with the one of the periods based on a time location of a first SL transmission resource of the one of the periods, a configured maximum HARQ process number and a periodicity of the resources available for SL transmission.

17. The apparatus of claim 13, further comprising retransmitting a TB of the at least one TB transmitted using resources configured for the configured grant in another period other than the one of the periods.

18. The apparatus of claim 13 wherein:
the configured grant includes a physical uplink control channel (PUCCH) resource associated with each period;
the apparatus further comprising:
for each period, transmitting HARQ feedback on the PUCCH resource associated with the period, wherein the PUCCH resource is only used for HARQ feedback associated with the last TB transmitted in the period.

19. A network device comprising a processor and memory, the network device configured to execute a method comprising:

transmitting a sidelink (SL) configured grant (CG) to a UE to configure one or more transmission resources available for SL transmissions by the UE that repeats on a periodic basis within each of a plurality of periods;

transmitting a downlink control information (DCI) to schedule a SL retransmission of a transport block (TB);

wherein the TB to be retransmitted based on the DCI corresponds to a TB of the at least one TB transmitted by the UE using the configured transmission resources within the one of the periods.

20. The network device of claim 19 wherein a maximum of one TB is transmitted by the UE in each period.

21. The network device of claim 19 wherein the DCI contains a HARQ process ID, and the HARQ process ID in the DCI is associated with the one of the periods based on a time location of a first SL transmission resource of the one of the periods, a configured maximum HARQ process number and a periodicity of the resources available for SL transmission.

22. The network device of claim 19 wherein:
the configured grant includes a physical uplink control channel (PUCCH) resource associated with each period;
the method further comprising:
for each period, receiving HARQ feedback on the PUCCH resource associated with the period, wherein the PUCCH resource is only used for HARQ feedback associated with the last TB transmitted in the period.

* * * * *